(12) United States Patent
Murakami et al.

(10) Patent No.: US 8,293,864 B2
(45) Date of Patent: Oct. 23, 2012

(54) METAL THIETANE COMPOUND, POLYMERIZABLE COMPOSITION CONTAINING THE COMPOUND, RESIN AND USE OF THE RESIN

(75) Inventors: Masakazu Murakami, Omuta (JP); Tomoyuki Ando, Omuta (JP); Hironori Kuboi, Ogori (JP); Hidetoshi Hayashi, Omuta (JP); Osamu Kohgo, Omuta (JP); Seiichi Kobayashi, Omuta (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 323 days.

(21) Appl. No.: 12/527,845

(22) PCT Filed: Feb. 19, 2008

(86) PCT No.: PCT/JP2008/000264
§ 371 (c)(1),
(2), (4) Date: Aug. 19, 2009

(87) PCT Pub. No.: WO2008/102545
PCT Pub. Date: Aug. 28, 2008

(65) Prior Publication Data
US 2010/0240862 A1 Sep. 23, 2010

(30) Foreign Application Priority Data

Feb. 20, 2007 (JP) ................. 2007-039773
Mar. 29, 2007 (JP) ................. 2007-088389
Jun. 21, 2007 (JP) ................. 2007-163448
Aug. 31, 2007 (JP) ................. 2007-226684

(51) Int. Cl.
*C08G 75/00* (2006.01)

(52) U.S. Cl. ...................... 528/380; 528/375
(58) Field of Classification Search .......... 528/380, 528/375
See application file for complete search history.

(56) References Cited

U.S. PATENT DOCUMENTS
2007/0191615 A1    8/2007   Otsuji et al.

FOREIGN PATENT DOCUMENTS

| JP | 10-130250 A | 5/1998 |
|---|---|---|
| JP | 2003-327583 A | 11/2003 |
| WO | WO 2005/095490 A1 | 10/2005 |
| WO | WO 2007/099702 A1 | 9/2007 |
| WO | WO 2007/125636 A1 | 11/2007 |
| WO | WO 2007/148439 A1 | 12/2007 |

OTHER PUBLICATIONS

International Search Report (Form PCT/ISA/210) of Application No. PCT/JP2008/000264 dated May 27, 2008.
International Search Report (Form PCT/ISA/210) of Application No. PCT/JP2008/000265 dated May 27, 2008.

*Primary Examiner* — Shane Fang
(74) *Attorney, Agent, or Firm* — Buchanan Ingersoll & Rooney PC

(57) ABSTRACT

Disclosed is a metal thietane compound represented by the following general formula (120),

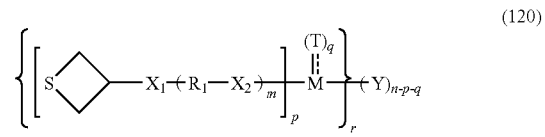

(wherein, in the above general formula (120), M is a member selected from the group consisting of Bi, Sb, Ti, Zr and Ta; $X_1$ and $X_2$ are each independently a sulfur atom or an oxygen atom; $R_1$ is a divalent organic group; the bond between M and T shown by a dotted line and a solid line represents a single or double bond; m is an integer of 0 or 1 or more; n is the number of valence of M; and p is an integer of equal to or more than 1 and equal to or less than n, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing M; when r is 2, n-p-q is 1 or 2 and Y is a divalent group; when r is 2 and n-p-q is 2, two Ys may form a ring together with two Ms; and when r is 2 and q is 2, a plurality of Ts contained are each independently selected from inorganic or organic groups).

17 Claims, No Drawings

METAL THIETANE COMPOUND, POLYMERIZABLE COMPOSITION CONTAINING THE COMPOUND, RESIN AND USE OF THE RESIN

TECHNICAL FIELD

The present invention relates to a metal thietane compound, a polymerizable composition containing the compound, a resin and use of the resin.

BACKGROUND ART

In late years, a transparent organic polymer material has been used as a transparent material in place of an inorganic glass. When such a material is used, for example, for an optical resin, there has been demanded an optical resin having required general properties such as transparency, thermal properties, mechanical properties and the like, while attaining a high refractive index.

A conventional technique concerning such a resin has been disclosed in Patent Document 1. In the Document, a thietane compound containing a metal has been disclosed. Furthermore, an optical resin having a high refractive index exceeding a refractive index (nd) of 1.7 has been disclosed.

Patent Document 1: International Publication Pamphlet No. 2005/095490

Patent Document 2: Japanese Patent Laid-open No. 2003-327583

Patent Document 3: Japanese Patent Laid-open No. 1998-130250

DISCLOSURE OF THE INVENTION

Problem to be Solved by the Invention

The present invention is to provide a novel compound for producing a transparent resin having a high refractive index.

Means for Solving Problem

The present invention relates to:

[1] a metal thietane compound represented by the following general formula (120),

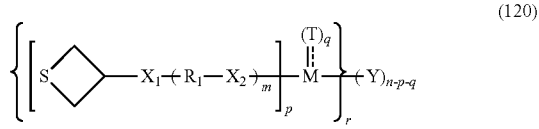

(120)

(wherein, in the above general formula (120), M is one metal atom selected from the group consisting of Bi, Sb, Ti, Zr and Ta; $X_1$ and $X_2$ are each independently a sulfur atom or an oxygen atom; $R_1$ is a divalent organic group; the bond between M and T shown by a dotted line and a solid line represents a single or double bond, provided that when the bond between M and T shown by a dotted line and a solid line is a single bond, T is a monovalent inorganic or organic group, q is an integer of 0 or equal to or more than 1 and equal to or less than n−2 and r is 1 or 2; and when the bond between M and T shown by a dotted line and a solid line is a double bond, T is an oxygen atom or a sulfur atom, q is 1 and r is 1; m is an integer of 0 or 1 or more; n is the number of valence of M; and p is an integer of equal to or more than 1 and equal to or less than n, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing M; when r is 2, n-p-q is 1 or 2 and Y is a divalent group; when r is 2 and n-p-q is 2, two Ys may form a ring together with two Ms; and when r is 2 and q is 2, a plurality of Ts contained are each independently selected from inorganic or organic groups);

[2] a metal thietane compound represented by the following general formula (110),

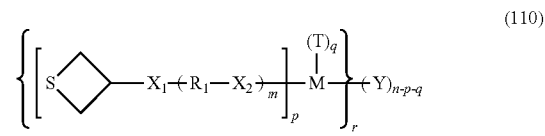

(110)

(wherein, in the above general formula (110), M is one metal atom selected from the group consisting of Bi, Sb, Ti, Zr and Ta; $X_1$ and $X_2$ are each independently a sulfur atom or an oxygen atom; $R_1$ is a divalent organic group; m is an integer of 0 or 1 or more; n is the number of valence of M; p is an integer of equal to or more than 1 and equal to or less than n; q is an integer of 0 or equal to or more than 1 and equal to or less than n−2; Y is a monovalent or divalent group; T is an inorganic or organic group; and r is 1 or 2, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing a metal atom M; when r is 2, n-p-q is 1 or 2 and Y is a divalent group; when r is 2 and n-p-q is 2, two Ys may form a ring together with two metal atoms Ms; and when r is 2 and q is 2, a plurality of Ts contained are each independently selected from inorganic or organic groups);

[3] a metal thietane compound represented by the following general formula (100),

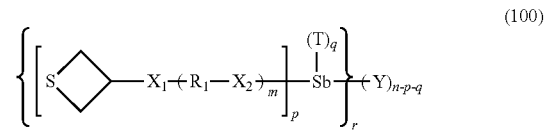

(100)

(wherein, in the above general formula (100), $X_1$ and $X_2$ are each independently a sulfur atom or an oxygen atom; $R_1$ is a divalent organic group; m is an integer of 0 or 1 or more; n is 3 or 5, provided that when n is 3, p is an integer of equal to or more than 1 and equal to or less than 3; and when n is 5, p is an integer of equal to or more than 1 and equal to or less than 5; q is an integer of 0 or equal to or more than 1 and equal to or less than n−2; Y is a monovalent or divalent group; T is an inorganic or organic group; and r is 1 or 2, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing a Sb atom; when r is 2, n-p-q is 1 or 2 and Y is a divalent group; when r is 2 and n-p-q is 2, two Ys may form a ring together with two Sb atoms; and when r is 2 and q is 2, a plurality of Ts contained are each independently selected from inorganic or organic groups);

[4] a metal thietane compound represented by the following general formula (1),

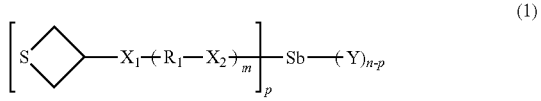

(wherein, in the above general formula (1), $X_1$ and $X_2$ are each independently a sulfur atom or an oxygen atom; $R_1$ is a divalent organic group; m is an integer of 0 or 1 or more; n is 3 or 5, provided that when n is 3, p is an integer of equal to or more than 1 and equal to or less than 3; and when n is 5, p is an integer of equal to or more than 1 and equal to or less than 5; and Y is a monovalent inorganic or organic group, provided that when n-p is 2 or more, a plurality of Ys contained are each independently selected from monovalent inorganic or organic groups; and when n-p is 2 or more, a plurality of Ys may be bonded to each other to form a ring containing a Sb atom);

[5] the metal thietane compound as set forth in any one of [2] to [4], wherein m is 0;

[6] the metal thietane compound as set forth in any one of [2] to [5], wherein $X_1$ is a sulfur atom;

[7] the metal thietane compound as set forth in [4], represented by the following general formula (3),

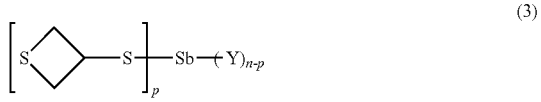

wherein, in the above general formula (3), Y, n and p are each the same as Y, n and p in the aforementioned general formula (1);

[8] the metal thietane compound as set forth in any one of [2] to [7], wherein n and p are each 3;

[9] the metal thietane compound as set forth in [8], represented by the following formula (4);

[10] the metal thietane compound as set forth in any one of [2] to [7], wherein n and p are each 5;

[11] the metal thietane compound as set forth in [10], represented by the following formula (5);

[12] a polymerizable composition comprising at least one metal thietane compound as set forth in any one of [2] to [11];

[13] the polymerizable composition as set forth in [12], further containing at least one of a thiol compound, an epoxy compound, an epithio compound or a non-metal thietane compound free from a metal atom in a molecular structure;

[14] the polymerizable composition as set forth in [13], wherein the thiol compound is one or more compounds selected from the group consisting of 3-mercaptothietane, 1,2-ethanedithiol, 4-mercaptomethyl-1,8-dimercapto-3,6-dithiaoctane, 4,8-dimercaptomethyl-1,11-dimercapto-3,6,9-trithiaundecane and 2,5-bis(mercaptomethyl)-1,4-dithiane;

the epoxy compound is one or more compounds selected from the group consisting of bis(2,3-epoxypropyl)disulfide, ethylene glycol diglycidyl ether, triglycidyl ether isocyanurate, neopentyl glycol diglycidyl ether, 1,4-cyclohexane dimethanol diglycidyl ether, trimethylolpropane triglycidyl ether, bisphenol F diglycidyl ether, bisphenol A diglycidyl ether and 3,4-epoxycyclohexylmethyl-3',4'-epoxycyclohexane carboxylate;

the epithio compound is one or more compounds selected from the group consisting of bis(2,3-epithiopropyl)sulfide and bis(2,3-epithiopropyl)disulfide; and the non-metal thietane compound is one or more compounds selected from the group consisting of bisthietanyl disulfide, bisthietanyl tetrasulfide, bis(thietanylthio)methane and 3-(((thietanylthio)methylthio)methylthio)thietane;

[15] the polymerizable composition as set forth in [12], further containing a non-metal thietane compound represented by the following formula (130);

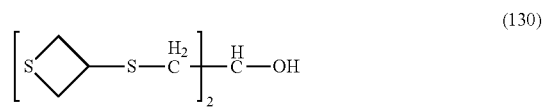

[16] the polymerizable composition as set forth in [12], wherein the metal thietane compound is represented by the following formula (4),

further includes a compound represented by the following formula (12);

[17] the polymerizable composition as set forth in [16], further containing at least one of a thiol compound, an epoxy compound, an epithio compound or a non-metal thietane compound free from a metal atom in a molecular structure;

[18] the polymerizable composition as set forth in [16], further containing a non-metal thietane compound represented by the following formula (130);

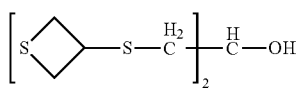

(130)

[19] the polymerizable composition as set forth in any one of [12] to [18], wherein the polymerizable composition contains a metal thietane compound represented by the general formula (110), and the content of the compound represented by the general formula (110) is not less than 50 weight % based on the total weight of the polymerizable compound;

[20] the polymerizable composition as set forth in any one of [12] to [19], further containing a bluing agent;

[21] a method for producing a resin, including a step of cast-polymerizing the polymerizable composition as set forth in any one of [12] to [20];

[22] a resin obtained by polymerizing the polymerizable composition as set forth in any one of [12] to [20];

[23] an optical component containing the resin as set forth in [22];

[24] use of the polymerizable composition as set forth in any one of [12] to [20] as an optical component;

[25] use of the resin obtained by polymerizing the polymerizable composition as set forth in any one of [12] to [20] as an optical component;

[26] a thietane compound represented by the following general formula (201),

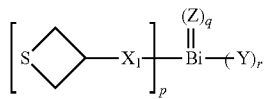

(201)

(wherein, in the above general formula (201), $X_1$ represents a sulfur atom or an oxygen atom; Z represents a sulfur atom or an oxygen atom; p represents an integer of equal to or more than 1 and equal to or less than 5; q is an integer of equal to or more than 0 and equal to or less than 2; r represents an integer of equal to or more than 0 and equal to or less than 4; and p+r+2q is 5 or 3, provided that when r is an integer of 2 or more, a plurality of Ys contained are each independently selected from monovalent inorganic or organic residues, or a plurality of Ys may be bonded to each other to form a ring containing a Bi atom);

[27] the thietane compound as set forth in [26], wherein, in the general formula (201), q is 0;

[28] the thietane compound as set forth in [26] or [27], wherein, in the general formula (201), p is 3, q is 0 and r is 0;

[28] the thietane compound as set forth in [26], wherein, in the general formula (201), q is 1;

[30] the thietane compound as set forth in [29], wherein, in the general formula (201), Z is an oxygen atom;

[31] the thietane compound as set forth in any one of [26] to [30], wherein, in the general formula (201), $X_1$ is a sulfur atom;

[32] a polymerizable composition containing the thietane compound as set forth in any one of [26] to [31];

[33] the polymerizable composition asset forth in [32], further containing a thiol compound;

[34] the polymerizable composition asset forth in [33], wherein the thiol compound is one or more compounds selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane and 2,5-bis(mercaptomethyl)-1,4-dithiane;

[35] the polymerizable composition as set forth in any one of [32] to [34], wherein the content of the compound represented by the general formula (201) is not less than 50 weight % based on the total weight of the polymerizable compound;

[36] a method for producing a resin, including a step of cast-polymerizing the polymerizable composition as set forth in any one of [32] to [35];

[37] a resin obtained by polymerizing the polymerizable composition as set forth in any one of [32] to [35];

[38] an optical component composed of the resin as set forth in [37];

[39] use of the polymerizable composition as set forth in any one of [32] to [35] as an optical component; and

[40] use of the resin obtained by polymerizing the polymerizable composition as set forth in any one of [32] to [35] as an optical component.

Advantage of the Invention

According to the present invention, a novel thietane compound containing a metal atom as a constituent element is provided.

BEST MODE FOR CARRYING OUT THE INVENTION

The present invention will be described with reference to concrete examples below. However, the present invention is not restricted to these concrete examples. Furthermore, in the present invention, as for respective components and groups, exemplified components and groups may be used singly or in combination of a plurality of kinds.

First, the metal thietane compound of the present invention will be described.

The metal thietane compound of the present invention is a compound containing a thietane group and a specific metal atom in a molecule, and is represented by the following general formula (120),

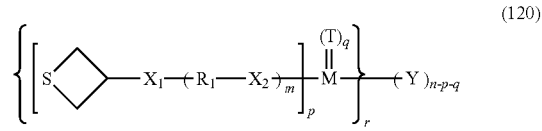

(120)

(wherein, in the above general formula (120), M is one metal atom selected from the group consisting of Bi, Sb, Ti, Zr and Ta; $X_1$ and $X_2$ are each independently a sulfur atom or an oxygen atom; $R_1$ is a divalent organic group; the bond between M and T shown by a dotted line and a solid line represents a single or double bond, provided that when the bond between M and T shown by a dotted line and a solid line is a single bond, T is a monovalent inorganic or organic group, q is an integer of 0 or equal to or more than 1 and equal to or less than n−2 and r is 1 or 2; and when the bond between M and T shown by a dotted line and a solid line is a double bond, T is an oxygen atom or a sulfur atom, q is 1 and r is 1; m is an integer of 0 or 1 or more; n is the number of valence of M; and p is an integer of equal to or more than 1 and equal to or less than n, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing M; when r is 2, n-p-q is 1 or 2 and Y is a divalent group; when r is 2 and n-p-q is 2, two Ys may form a ring together with two Ms; and when r is 2 and q is 2, a plurality of Ts contained are each independently selected from inorganic or organic groups).

Concrete examples of the compound represented by the above general formula (120) include a compound represented by the following general formula (110) and a compound represented by the following general formula (201) (to be described below). Hereinafter, each compound will be described in detail.

Firstly, the compound represented by the following general formula (110) is described,

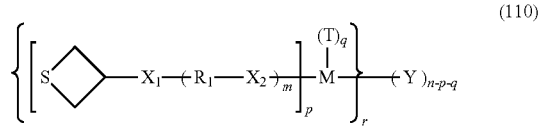

(110)

(wherein, in the above general formula (110), M is a metal atom; $X_1$ and $X_2$ are each independently a sulfur atom or an oxygen atom; $R_1$ is a divalent organic group; m is an integer of 0 or 1 or more; n is the number of valence of M; p is an integer of equal to or more than 1 and equal to or less than n; q is an integer of 0 or equal to or more than 1 and equal to or less than n−2; Y is a monovalent or divalent group; T is an inorganic or organic group; and r is 1 or 2, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing a metal atom M; when r is 2, n-p-q is 1 or 2 and Y is a divalent group; when r is 2 and n-p-q is 2, two Ys may form a ring together with two metal atoms Ms; and when r is 2 and q is 2, a plurality of Ts contained are each independently selected from inorganic or organic groups).

Hereinafter, a concrete construction of the metal thietane compound of the present invention when it is a compound represented by the above general formula (110) will be described in more detail mainly with reference to a case in which a metal atom M is a Sb atom.

When M is a Sb atom, the metal thietane compound of the present invention is a compound containing a thietane group and a Sb atom in a molecule, and is represented by the following general formula (100),

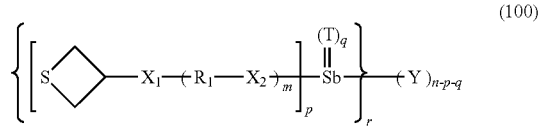

(100)

(wherein, in the above general formula (100), $X_1$ and $X_2$ are each independently a sulfur atom or an oxygen atom; $R_1$ is a divalent organic group; m is an integer of 0 or 1 or more; n is 3 or 5, provided that when n is 3, p is an integer of equal to or more than 1 and equal to or less than 3; and when n is 5, p is an integer of equal to or more than 1 and equal to or less than 5; q is an integer of 0 or equal to or more than 1 and equal to or less than n−2; Y is a monovalent or divalent group; T is an inorganic or organic group; and r is 1 or 2, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing a Sb atom; when r is 2, n-p-q is 1 or 2 and Y is a divalent group; when r is 2 and n-p-q is 2, two Ys may form a ring together with two Sb atoms; and when r is 2 and q is 2, a plurality of Ts contained are each independently selected from inorganic or organic groups).

Hereinafter, the above general formula (100) will be described in detail.

Firstly, a case in which, in the above general formula (100), r is 1 will be described. When r is 1, q is 0 and the metal thietane compound of the present invention is a compound represented by the following general formula (1),

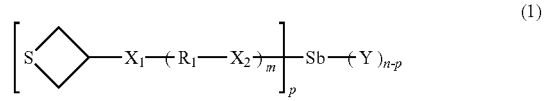

(1)

(wherein, in the above general formula (1), $X_1$ and $X_2$ are each independently a sulfur atom or an oxygen atom; $R_1$ is a divalent organic group; m is an integer of 0 or 1 or more; n is 3 or 5, provided that when n is 3, p is an integer of equal to or more than 1 and equal to or less than 3; and when n is 5, p is an integer of equal to or more than 1 and equal to or less than 5; and Y is a monovalent inorganic or organic group, provided that when n-p is 2 or more, a plurality of Ys contained are each independently selected from monovalent inorganic or organic groups; and when n-p is 2 or more, a plurality of Ys may be bonded to each other to form a ring containing a Sb atom).

Hereinafter, the above general formula (1) will be described in detail.

Firstly, in the above general formula (1), $X_1$ and $X_2$ each independently represent a sulfur atom or an oxygen atom. Considering that high refractive index is the desired effect of the present invention, $X_1$ and $X_2$ are each more preferably a sulfur atom.

In the above general formula (1), $R_1$ represents a divalent organic group.

Examples of the divalent organic group include a chained or cyclic aliphatic group, an aromatic group and an aromatic-aliphatic group. The divalent organic group is preferably a chained aliphatic group having equal to or more than 1 and equal to or less than 20 carbon atoms, a cyclic aliphatic group having equal to or more than 3 and equal to or less than 20 carbon atoms, an aromatic group having equal to or more than 5 and equal to or less than 20 carbon atoms and an aromatic-aliphatic group having equal to or more than 6 and equal to or less than 20 carbon atoms.

More specifically, in $R_1$, the divalent organic group is a chained or cyclic aliphatic group, an aromatic group or an aromatic-aliphatic group, and is preferably a substituted or unsubstituted chained or cyclic aliphatic group having equal to or more than 1 and equal to or less than 20 carbon atoms such as a methylene group, an ethylene group, a 1,2-dichloroethylene group, a trimethylene group, a tetramethylene group, a pentamethylene group, a cyclopentylene group, a hexamethylene group, a cyclohexylene group, a heptamethylene group, an octamethylene group, a nonamethylene group, a decamethylene group, a undecamethylene group, a dodecamethylene group, a tridecamethylene group, a tetradecamethylene group, a pentadecamethylene group and the like;

a substituted or unsubstituted aromatic group having equal to or more than 5 and equal to or less than 20 carbon atoms such as a phenylene group, a chlorophenylene group, a naphthylene group, an indenylene group, an anthracenylene group, a fluorenylene group and the like; or a substituted or unsubstituted aromatic-aliphatic group having equal to or more than 6 and equal to or less than 20 carbon atoms such as a —$C_6H_4$—$CH_2$— group, a —$CH_2$—$C_6H_4$—$CH_2$— group, a —$CH_2$—$C_6H_3$(Cl)—$CH_2$— group, a —$C_{10}H_6$—$CH_2$— group, a —$CH_2$—$C_{10}H_6$—$CH_2$— group, a —$CH_2CH_2$—$C_6H_4$—$CH_2CH_2$— group and the like.

$R_1$ is more preferably a substituted or unsubstituted chained or cyclic aliphatic group having equal to or more than 1 and equal to or less than 6 carbon atoms such as a methylene group, an ethylene group, a 1,2-dichloroethylene group, a trimethylene group, a cyclopentylene group, a cyclohexylene group and the like;

a substituted or unsubstituted aromatic group having equal to or more than 5 to 15 and equal to or less than carbon atoms such as a phenylene group, a chlorophenylene group, a naphthylene group, an indenylene group, an anthracenylene group, a fluorenylene group and the like; or a substituted or unsubstituted aromatic-aliphatic group having equal to or more than 6 to 15 and equal to or less than carbon atoms such as a —$C_6H_4$—$CH_2$— group, a —$CH_2$—$C_6H_4$—$CH_2$— group, a —$CH_2$—$C_6H_3$(Cl)—$CH_2$— group, a —$C_{10}H_6$—$CH_2$— group, a —$CH_2$—$C_{10}H_6$—$CH_2$— group, a —$CH_2CH_2$—$C_6H_4$—$CH_2CH_2$— group and the like.

These divalent organic groups may contain a hetero atom as well as a carbon atom or a hydrogen atom in the group. Examples of the hetero atom include an oxygen atom and a sulfur atom. In consideration of the desired effect of the present invention, a sulfur atom is preferable.

In the above general formula (1), m represents an integer of 0 or 1 or more. m is preferably an integer of equal to or more than 0 to 4 and equal to or less than, more preferably an integer of equal to or more than 0 to 2 and equal to or less than and further preferably an integer of 0 or 1.

When m is 0, the above general formula (1) becomes the following general formula (2),

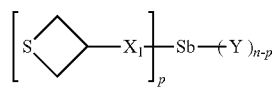

(2)

(wherein, in the above general formula (2), $X_1$, Y, n and p are each the same as $X_1$, Y, n and p in the above general formula (1)).

Meanwhile, in the above general formula (1), for a group to be bonded to a Sb atom including a thietanyl group, it is furthermore preferable that m is 0 and $X_1$ is a sulfur atom. At this time, the above general formula (1) is represented by the following general formula (3),

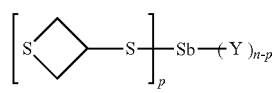

(3)

(wherein, in the above general formula (3), Y, n and p are each the same as Y, n and p in the above general formula (1)).

Further, in the above general formula (3), n is preferably p.

Hereinafter, n and p in the above general formula (1) will be described.

n is the number of valence of a Sb atom, that is, 5 or 3. n is preferably 3 from the viewpoint of increase of the content of the metal for attaining a high refractive index when the compound is used as a polymerizable compound in the polymerizable composition to be described later.

Meanwhile, p is a positive integer of the number of valence of the Sb atom or less. Accordingly, when the number of valence n of the Sb atom is 3, p is a positive integer of equal to or more than 1 and equal to or less than 3, while when the number of valence n of the Sb atom is 5, p is a positive integer of equal to or more than 1 and equal to or less than 5. p is preferably n, n−1 or n−2 and more preferably n or n−1.

In the above general formula (1), specifically, p is 3, and further specifically, $X_1$ is a sulfur atom, and n and p are each 3. At this time, the compound represented by the above general formula (1) is a compound represented by the following formula (4).

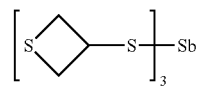

(4)

Further, in the above general formula (1), specifically, p is 5, and further specifically, $X_l$ is a sulfur atom, and n and p are each 5. At this time, the compound represented by the above general formula (1) is a compound represented by the following formula (5),

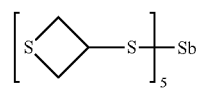

(5)

In the above general formula (1), Y represents a monovalent inorganic or organic group. Hereinafter, concrete examples of Y will be described.

Firstly, when n-p is 1, Y represents a monovalent inorganic or organic group. When n-p is an integer of 2 or more, a plurality of Ys contained are each independently selected from monovalent inorganic or organic groups. A plurality of Ys may be the same group, or may be groups, a part or all of which are different. Further, a plurality of Ys may be bonded to each other to form a ring containing a Sb atom.

Y is not particularly limited, and examples thereof include a hydrogen atom, a halogen atom, a hydroxyl group, a thiol group, a substituted or unsubstituted alkyl group, a substituted or unsubstituted aryl group, a substituted or unsubstituted aralkyl group, a substituted or unsubstituted alkoxy group, a substituted or unsubstituted alkylthio group, a substituted or unsubstituted aryloxy group, and a substituted or unsubstituted arylthio group.

Of these, the halogen atom, the substituted or unsubstituted alkyl group, the substituted or unsubstituted aryl group, the substituted or unsubstituted aralkyl group, the substituted or unsubstituted alkoxy (alkyloxy) group, the substituted or unsubstituted alkylthio group, the substituted or unsubstituted aryloxy group, and the substituted or unsubstituted arylthio group will be described below.

Concrete examples of the halogen atom include a fluorine atom, a chlorine atom, a bromine atom and an iodine atom.

Concrete examples of the substituted or unsubstituted alkyl group include a straight chained alkyl group having equal to or more than 1 and equal to or less than 10 carbon atoms in total such as a methyl group, an ethyl group, an n-propyl group, an n-butyl group, an n-pentyl group, an n-hexyl group and the like;

a branched alkyl group having equal to or more than 3 and equal to or less than 10 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 1-n-propylbutyl group, a 1-iso-propylbutyl group, a 1-iso-propyl-2-methylpropyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexyl group, a 3-ethylhexyl group, a 4-ethylhexyl group, a 1-n-propylpentyl group, a 2-n-propylpentyl group, a 1-iso-propylpentyl group, a 2-iso-propylpentyl group, a 1-n-butylbutyl group, a 1-iso-butylbutyl group, a 1-sec-butylbutyl group, a 1-tert-butylbutyl group, a 2-tert-butylbutyl group, a tert-butyl group, a tert-pentyl group, a 1,1-dimethylbutyl group, a 1,2-dimethylbutyl group, a 1,3-dimethylbutyl group, a 2,3-dimethylbutyl group, a 1-ethyl-2-methylpropyl group, a 1,1-dimethylpentyl group, a 1,2-dimethylpentyl group, a 1,3-dimethylpentyl group, a 1,4-dimethylpentyl group, a 2,2-dimethylpentyl group, a 2,3-dimethylpentyl group, a 2,4-dimethylpentyl group, a 3,3-dimethylpentyl group, a 3,4-dimethylpentyl group, a 1-ethyl-1-methylbutyl group, a 1-ethyl-2-methylbutyl group, a 1-ethyl-3-methylbutyl group, a 2-ethyl-1-methylbutyl group, a 2-ethyl-3-methylbutyl group, a 1,1-dimethylhexyl group, a 1,2-dimethylhexyl group, a 1,3-dimethylhexyl group, a 1,4-dimethylhexyl group, a 1,5-dimethylhexyl group, a 2,2-dimethylhexyl group, a 2,3-dimethylhexyl group, a 2,4-dimethylhexyl group, a 2,5-dimethylhexyl group, a 3,3-dimethylhexyl group, a 3,4-dimethylhexyl group, a 3,5-dimethylhexyl group, a 4,4-dimethylhexyl group, a 4,5-dimethylhexyl group, a 1-ethyl-2-methylpentyl group, a 1-ethyl-3-methylpentyl group, a 1-ethyl-4-methylpentyl group, a 2-ethyl-1-methylpentyl group, a 2-ethyl-2-methylpentyl group, a 2-ethyl-3-methylpentyl group, a 2-ethyl-4-methylpentyl group, a 3-ethyl-1-methylpentyl group, a 3-ethyl-2-methylpentyl group, a 3-ethyl-3-methylpentyl group, a 3-ethyl-4-methylpentyl group, a 1-n-propyl--1-methylbutyl group, a 1-n-propyl-2-methylbutyl group, a 1-n-propyl-3-methylbutyl group, a 1-iso-propyl-1-methylbutyl group, a 1-iso-propyl-2-methylbutyl group, a 1-iso-propyl-3-methylbutyl group, a 1,1-diethylbutyl group, a 1,2-diethylbutyl group, a 1,1,2-trimethylpropyl group, a 1,2,2-trimethylpropyl group, a 1,1,2-trimethylbutyl group, a 1,1,3-trimethylbutyl group, a 1,2,3-trimethylbutyl group, a 1,2,2-trimethylbutyl group, a 1,3,3-trimethylbutyl group, a 2,3,3-trimethylbutyl group, a 1,1,2-trimethylpentyl group, a 1,1,3-trimethylpentyl group, a 1,1,4-trimethylpentyl group, a 1,2,2-trimethylpentyl group, a 1,2,3-trimethylpentyl group, a 1,2,4-trimethylpentyl group, a 1,3,4-trimethylpentyl group, a 2,2,3-trimethylpentyl group, a 2,2,4-trimethylpentyl group, a 2,3,4-trimethylpentyl group, a 1,3,3-trimethylpentyl group, a 2,3,3-trimethylpentyl group, a 3,3,4-trimethylpentyl group, a 1,4,4-trimethylpentyl group, a 2,4,4-trimethylpentyl group, a 3,4,4-trimethylpentyl group, a 1-ethyl-1,2-dimethylbutyl group, a 1-ethyl-1,3-dimethylbutyl group, a 1-ethyl-2,3-dimethylbutyl group, a 2-ethyl-1,1-dimethylbutyl group, a 2-ethyl-1,2-dimethylbutyl group, a 2-ethyl-1,3-dimethylbutyl group, a 2-ethyl-2,3-dimethylbutyl group and the like; and a saturated cyclic alkyl group having equal to or more than 5 and equal to or less than 10 carbon atoms in total such as a cyclopentyl group, a cyclohexyl group, a methylcyclopentyl group, a methoxycyclopentyl group, a methoxycyclohexyl group, a methylcyclohexyl group, a 1,2-dimethylcyclohexyl group, a 1,3-dimethylcyclohexyl group, a 1,4-dimethylcyclohexyl group, an ethylcyclohexyl group and the like.

Concrete examples of the substituted or unsubstituted aryl group include aromatic hydrocarbons having not more than 20 carbon atoms in total such as a phenyl group, a naphthyl group, an anthranyl group, a cyclopentadienyl group and the like;

an alkyl-substituted aryl group having not more than 20 carbon atoms in total such as a 2-methylphenyl group, a 3-methylphenyl group, a 4-methylphenyl group, a 2-ethylphenyl group, a propylphenyl group, a butylphenyl group, a hexylphenyl group, a cyclohexylphenyl group, an octylphenyl group, a 2-methyl-l-naphthyl group, a 3-methyl-l-naphthyl group, a 4-methyl-l-naphthyl group, a 5-methyl-l-naphthyl group, a 6-methyl-l-naphthyl group, a 7-methyl-l-naphthyl group, a 8-methyl-l-naphthyl group, a 1-methyl-2-naphthyl group, a 3-methyl-2-naphthyl group, a 4-methyl-2-naphthyl group, a 5-methyl-2-naphthyl group, a 6-methyl-2-naphthyl group, a 7-methyl-2-naphthyl group, a 8-methyl-2-naphthyl group, a 2-ethyl-l-naphthyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 20 carbon atoms in total wherein a substituted or unsubstituted alkyloxy group having not more than 10 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group, a hexyloxyphenyl group, a cyclohexyloxyphenyl group, an octyloxyphenyl group, a 2-methoxy-1-naphthyl group, a 3-methoxy-1-naphthyl group, a 4-methoxy-1-naphthyl group, a 5-methoxy-1-naphthyl group, a 6-methoxy-1-naphthyl group, a 7-methoxy-1-naphthyl group, a 8-methoxy-1-naphthyl group, a 1-methoxy-2-naphthyl group, a 3-methoxy-2-naphthyl group, a 4-methoxy-2-naphthyl group, a 5-methoxy-2-naphthyl group, a 6-methoxy-2-naphthyl group, a 7-methoxy-2-naphthyl group, a 8-methoxy-2-naphthyl group, a 2-ethoxy-1-naphthyl group and the like;

a dialkoxyaryl group having not more than 20 carbon atoms in total wherein a substituted or unsubstituted alkyloxy group having not more than 10 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 4,5-dimethoxy-1-naphthyl group, a 4,7-dimethoxy-1-naphthyl group, a 4,8-dimethoxy-1-naphthyl group, a 5,8-dimethoxy-1-naphthyl group, a 5,8-dimethoxy-2-naphthyl group and the like;

a trialkoxyaryl group having not more than 20 carbon atoms in total wherein a substituted or unsubstituted alkyloxy group having not more than 10 carbon atoms is substituted, such as a 2,3,4-trimethoxyphenyl group, a 2,3,5-trimethoxyphenyl group, a 2,3,6-trimethoxyphenyl group, a 2,4,5-trimethoxyphenyl group, a 2,4,6-trimethoxyphenyl group, a 3,4,5-trimethoxyphenyl group and the like; and an aryl group having not more than 20 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Concrete examples of the substituted or unsubstituted aralkyl group include an aralkyl group having not more than 12 carbon atoms in total such as a benzyl group, a phenethyl group, a phenylpropyl group, a naphthylethyl group and the like. In addition, examples thereof include a methyl group, an ethyl group and a propyl group each having an aryl group specifically mentioned as concrete examples of the substituted or unsubstituted aryl group beforehand in a side chain.

Concrete examples of the substituted or unsubstituted alkyloxy group include a straight chained or branched alkoxy group having equal to or more than 1 and equal to or less than 10 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, an n-nonyloxy group and the like;

a cycloalkoxy group having equal to or more than 5 and equal to or less than 10 carbon atoms in total such as a cyclopentyloxy group, a cyclohexyloxy group and the like;

an alkoxyalkoxy group having equal to or more than 2 and equal to or less than 10 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group, an n-pentyloxyethoxy group, an iso-pentyloxyethoxy group, an n-hexyloxyethoxy group, an iso-hexyloxyethoxy group, an n-heptyloxyethoxy group and the like; and an aralkyloxy group such as a benzyloxy group and the like.

Concrete examples of the substituted or unsubstituted alkylthio group include a straight chained or branched alkylthio group having equal to or more than 1 and equal to or less than 10 carbon atoms in total such as a methylthio group, an ethylthio group, an n-propylthio group, an iso-propylthio group, an n-butylthio group, an iso-butylthio group, a sec-butylthio group, a t-butylthio group, an n-pentylthio group, an iso-pentylthio group, an n-hexylthio group, an iso-hexylthio group, a 2-ethylhexylthio group, a 3,5,5-trimethylhexylthio group, an n-heptylthio group, an n-octylthio group, an n-nonylthio group and the like;

a cycloalkylthio group having equal to or more than 5 and equal to or less than 10 carbon atoms in total such as a cyclopentylthio group, a cyclohexylthio group and the like;

an alkoxyalkylthio group having equal to or more than 2 and equal to or less than 10 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group, an n-pentyloxyethylthio group, an iso-pentyloxyethylthio group, an n-hexyloxyethylthio group, an iso-hexyloxyethylthio group, an n-heptyloxyethylthio group and the like;

an aralkylthio group such as a benzylthio group and the like; and an alkylthioalkylthio group having equal to or more than 2 and equal to or less than 10 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group, an n-pentylthioethylthio group, an iso-pentylthioethylthio group, an n-hexylthioethylthio group, an iso-hexylthioethylthio group, an n-heptylthioethylthio group and the like.

Concrete examples of the substituted or unsubstituted aryloxy group include an unsubstituted or alkyl-substituted aryloxy group having not more than 20 carbon atoms in total such as a phenyloxy group, a naphthyloxy group, an anthranyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, an octylphenyloxy group, a 2-methyl-1-naphthyloxy group, a 3-methyl-1-naphthyloxy group, a 4-methyl-1-naphthyloxy group, a 5-methyl-1-naphthyloxy group, a 6-methyl-1-naphthyloxy group, a 7-methyl-1-naphthyloxy group, a 8-methyl-1-naphthyloxy group, a 1-methyl-2-naphthyloxy group, a 3-methyl-2-naphthyloxy group, a 4-methyl-2-naphthyloxy group, a 5-methyl-2-naphthyloxy group, a 6-methyl-2-naphthyloxy group, a 7-methyl-2-naphthyloxy group, a 8-methyl-2-naphthyloxy group, a 2-ethyl-1-naphthyloxy group, a 2,3-dimethylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;

a monoalkoxyaryloxy group having not more than 20 carbon atoms in total wherein a substituted or unsubstituted alkyloxy group having not more than 10 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group, an octyloxyphenyloxy group, a 2-methoxy-1-naphthyloxy group, a 3-methoxy-1-naphthyloxy group, a 4-methoxy-1-naphthyloxy group, a 5-methoxy-1-naphthyloxy group, a 6-methoxy-1-naphthyloxy group, a 7-methoxy-1-naphthyloxy group, a 8-methoxy-1-naphthyloxy group, a 1-methoxy-2-naphthyloxy group, a 3-methoxy-2-naphthyloxy group, a 4-methoxy-2-naphthyloxy group, a 5-methoxy-2-naphthyloxy group, a 6-methoxy-2-naphthyloxy group, a 7-methoxy-2-naphthyloxy group, a 8-methoxy-2-naphthyloxy group, a 2-ethoxy-1-naphthyloxy group and the like;

a dialkoxyaryloxy group having not more than 20 carbon atoms in total wherein a substituted or unsubstituted alkyloxy group having not more than 10 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group, a 4,5-dimethoxy-1-naphthyloxy group, a 4,7-dimethoxy-1-naphthyloxy group, a 4,8-dimethoxy-1- naphthyloxy group, a 5,8-dimethoxy-1-naphthyloxy group, a 5,8-dimethoxy-2-naphthyloxy group and the like;

a trialkoxyaryloxy group having not more than 20 carbon atoms in total wherein a substituted or unsubstituted alkyloxy group having not more than 10 carbon atoms is substituted, such as a 2,3,4-trimethoxyphenyloxy group, a 2,3,5-trimethoxyphenyloxy group, a 2,3,6-trimethoxyphenyloxy group, a 2,4,5-trimethoxyphenyloxy group, a 2,4,6-trimethoxyphenyloxy group, a 3,4,5-trimethoxyphenyloxy group and the like; and an aryloxy group having not more than 20 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Concrete examples of the substituted or unsubstituted arylthio group include an unsubstituted or alkyl-substituted arylthio group having not more than 20 carbon atoms in total such as a phenylthio group, a naphthylthio group, an anthranylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, an octylphenylthio group, a 2-methyl-1-naphthylthio group, a 3-methyl-1-naphthylthio group, a 4-methyl-1-naphthylthio group, a 5-methyl-1-naphthylthio group, a 6-methyl-1-naphthylthio group, a 7-methyl-1-naphthylthio group, a 8-methyl-1-naphthylthio group, a 1-methyl-2-naphthylthio group, a 3-methyl-2-naphthylthio group, a 4-methyl-2-naphthylthio group, a 5-methyl-2-naphthylthio group, a 6-methyl-2-naphthylthio group, a 7-methyl-2-naphthylthio group, a 8-methyl-2-naphthylthio group, a 2-ethyl-1-naphthylthio group, a 2,3-dimethylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;

a monoalkoxyarylthio group having not more than 20 carbon atoms in total wherein a substituted or unsubstituted alkyloxy group having not more than 10 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group, an octyloxyphenylthio group, a 2-methoxy-1-naphthylthio group, a 3-methoxy-1-naphthylthio group, a 4-methoxy-1-naphthylthio group, a 5-methoxy-1-naphthylthio group, a 6-methoxy-1-naphthylthio group, a 7-methoxy-1-naphthylthio group, a 8-methoxy-1-naphthylthio group, a 1-methoxy-2-naphthylthio group, a 3-methoxy-2-naphthylthio group, a 4-methoxy-2-naphthylthio group, a 5-methoxy-2-naphthylthio group, a 6-methoxy-2-naphthylthio group, a 7-methoxy-2-naphthylthio group, a 8-methoxy-2-naphthylthio group, a 2-ethoxy-1-naphthylthio group and the like;

a dialkoxyarylthio group having not more than 20 carbon atoms in total wherein a substituted or unsubstituted alkyloxy group having not more than 10 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like;

a trialkoxyarylthio group having not more than 20 carbon atoms in total wherein a substituted or unsubstituted alkyloxy group having not more than 10 carbon atoms is substituted, such as a 2,3,4-trimethoxyphenylthio group, a 2,3,5-trimethoxyphenylthio group, a 2,3,6-trimethoxyphenylthio group, a 2,4,5-trimethoxyphenylthio group, a 2,4,6-trimethoxyphenylthio group, a 3,4,5-trimethoxyphenylthio group and the like; and an arylthio group having not more than 20 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like. Ys are not restricted thereto.

Preferable examples of Y are as follows.

A preferable example includes a hydrogen atom.

Furthermore, of preferable examples of Y, examples of the halogen atom include a chlorine atom, a bromine atom and an iodine atom.

Preferable examples of the substituted or unsubstituted alkyl group include a straight chained alkyl group having equal to or more than 1 and equal to or less than 6 carbon atoms in total such as a methyl group, an ethyl group, an n-propyl group, an n-butyl group, an n-pentyl group, an n-hexyl group and the like;

a branched alkyl group having equal to or more than 3 and equal to or less than 6 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a tert-butyl group, a tert-pentyl group, a 1,1-dimethylbutyl group, a 1,2-dimethylbutyl group, a 1,3-dimethylbutyl group, a 2,3-dimethylbutyl group and the like; and a saturated cyclic alkyl group having 5 or 6 carbon atoms in total such as a cyclopentyl group, a cyclohexyl group and the like.

Preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 12 carbon atoms in total such as a 2-methylphenyl group, a 3-methylphenyl group, a 4-methylphenyl group, a 2-ethylphenyl group, a propylphenyl group, a butylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 12 carbon atoms in total wherein a substituted or unsubstituted alkyloxy group having not more than 6 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group and the like;

a dialkoxyaryl group having not more than 12 carbon atoms in total wherein a substituted or unsubstituted alkyloxy group having not more than 6 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trichlorophenyl group, a tetrafluorophenyl group, a pentafluorophenyl group and the like.

Preferable examples of the substituted or unsubstituted aralkyl group include an aralkyl group having not more than 12 carbon atoms in total such as a benzyl group, a phenethyl group, a phenylpropyl group and the like.

Preferable examples of the substituted or unsubstituted alkyloxy group include a straight chained or branched alkoxy group having equal to or more than 1 and equal to or less than 6 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group and the like;

a cycloalkoxy group having 5 or 6 carbon atoms in total such as a cyclopentyloxy group, a cyclohexyloxy group and the like; and an alkoxyalkoxy group having equal to or more than 2 and equal to or less than 6 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group and the like.

Preferable examples of the substituted or unsubstituted alkylthio group include a straight chained or branched alkylthio group having equal to or more than 1 and equal to or less than 6 carbon atoms in total such as a methylthio group, an ethylthio group, an n-propylthio group, an iso-propylthio group, an n-butylthio group, an iso-butylthio group, a sec-butylthio group, a t-butylthio group, an n-pentylthio group, an iso-pentylthio group, an n-hexylthio group, an iso-hexylthio group and the like;

a cycloalkylthio group having 5 or 6 carbon atoms in total such as a cyclopentylthio group, a cyclohexylthio group and the like;

an alkoxyalkylthio group having equal to or more than 2 and equal to or less than 6 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group and the like; and an alkylthioalkylthio group having equal to or more than 2 and equal to or less than 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

Preferable examples of the substituted or unsubstituted aryloxy group include an unsubstituted or alkyl-substituted aryloxy group having not more than 12 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;

a monoalkoxyaryloxy group having not more than 12 carbon atoms in total wherein a substituted or unsubstituted alkyloxy group having not more than 6 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group and the like;

a dialkoxyaryloxy group having not more than 12 carbon atoms in total wherein a substituted or unsubstituted alkyloxy group having not more than 6 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Preferable examples of the substituted or unsubstituted arylthio group include an unsubstituted or alkyl-substituted arylthio group having not more than 12 carbon atoms in total such as a phenylthio group, a naphthylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;

a monoalkoxyarylthio group having not more than 12 carbon atoms in total wherein a substituted or unsubstituted alkyloxy group having not more than 6 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group and the like;

a dialkoxyarylthio group having not more than 12 carbon atoms in total wherein a substituted or unsubstituted alkyloxy group having not more than 6 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1- naphthylthio group, a 5,8-dimethoxy-1-naphthylthio group, a 5,8-dimethoxy-2-naphthylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like.

More preferable examples of Y are as follows.

A more preferable example of Y includes a hydrogen atom.

Furthermore, more preferable examples of the halogen atom include a chlorine atom and a bromine atom.

More preferable examples of the substituted or unsubstituted alkyl group include a straight chained or branched alkyl group having equal to or more than 1 and equal to or less than 3 carbon atoms in total such as a methyl group, an ethyl group, an iso-propyl group and the like.

More preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 9 carbon atoms in total such as a 2-methylphenyl group, a 3-methylphenyl group, a 4-methylphenyl group, a 2-ethylphenyl group, a propylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3, 5-dimethylphenyl group, a 3, 6-dimethylphenyl group and the like;

a monoalkoxyaryl group having not more than 9 carbon atoms in total wherein a substituted or unsubstituted alkyloxy group having not more than 3 carbon atoms is substituted, such as a 2-methoxyphenyl group, a 3-methoxyphenyl group, a 4-methoxyphenyl group, a 2-ethoxyphenyl group, a propoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, a chloronaphthyl group, a bromonaphthyl group and the like.

More preferable examples of the substituted or unsubstituted aralkyl group include an aralkyl group having not more than 9 carbon atoms in total such as a benzyl group, a phenethyl group, a phenylpropyl group and the like.

More preferable examples of the substituted or unsubstituted alkyloxy group include a straight chained or branched alkoxy group having equal to or more than 1 and equal to or less than 3 carbon atoms in total such as a methoxy group, an ethoxy group, an iso-propoxy group and the like; and a cycloalkoxy group having 5 or 6 carbon atoms in total such as a cyclopentyloxy group, a cyclohexyloxy group and the like.

More preferable examples of the substituted or unsubstituted alkylthio group include a straight chained or branched alkylthio group having equal to or more than 1 and equal to or less than 3 carbon atoms in total such as a methylthio group, an ethylthio group, an n-propylthio group, an iso-propylthio group and the like;

a cycloalkylthio group having 5 or 6 carbon atoms in total such as a cyclopentylthio group, a cyclohexylthio group and the like; and an alkylthioalkylthio group having equal to or more than 2 and equal to or less than 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

More preferable examples of the substituted or unsubstituted aryloxy group include an unsubstituted or alkyl-substituted aryloxy group having not more than 9 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group and the like;

a monoalkoxyaryloxy group having not more than 9 carbon atoms in total wherein a substituted or unsubstituted alkyloxy group having not more than 3 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, a chloronaphthyloxy group, a bromonaphthyloxy group and the like.

More preferable examples of the substituted or unsubstituted arylthio group include an unsubstituted or alkyl-substituted arylthio group having not more than 9 carbon atoms in total such as a phenylthio group, a 2-methylphenylthio group, a 3-methylphenylthio group, a 4-methylphenylthio group, a 2-ethylphenylthio group, a propylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group and the like;

a monoalkoxyarylthio group having not more than 9 carbon atoms in total wherein a substituted or unsubstituted alkyloxy group having not more than 3 carbon atoms is substituted, such as a 2-methoxyphenylthio group, a 3-methoxyphenylthio group, a 4-methoxyphenylthio group, a 2-ethoxyphenylthio group, a propoxyphenylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, a chloronaphthylthio group, a bromonaphthylthio group and the like.

When Ys do not form a ring, further concrete examples of Y include an alkyl group having equal to or more than 1 and equal to or less than 3 carbon atoms such as a methyl group, an ethyl group, a propyl group, an isopropyl group and the like;

a straight chained or branched alkylthio group having equal to or more than 1 and equal to or less than 3 carbon atoms in total containing a sulfur atom to be directly bonded to a Sb atom such as a methylthio group, an ethylthio group, an n-propylthio group, iso-propylthio group and the like; and a thietanylthioalkylthio group such as 2-(3-thietanylthio) ethylthio and the like. In addition, When Y is a thietanylthioalkylthio group, Y is a group which is different from the group in [ ] to be bonded to Sb in the above general formula (1). An example of the compound having such Y includes (3-thietanylthio)bis[2-(3-thietanylthio)ethylthio]antimony(III). Furthermore, when Y is a thietanylthioalkylthio group, in the above general formulae (120) and (110), it is a group which is different from the group in [ ] to be bonded to M.

When Y is an alkyl group, in the above general formula (1), Y is preferably a methyl group.

Further, when Y is an alkyl group and n-p is an integer of 2 or more, Ys may be bonded to each other to form a cyclic structure through a Sb atom. Namely, a plurality of Ys may be bonded to form a ring containing a Sb atom.

When a ring is formed, examples of an alkyl chain forming a ring include a methylene group, an ethylene group and a propylene group, that is, an alkylene group having equal to or more than 1 and equal to or less than 3 carbon atoms. The alkyl chain forming a ring is preferably an ethylene group. Incidentally, a ring containing a Sb atom is specifically a 4-membered ring to a 6-membered ring, and an atom constituting a ring may contain, for example, S as described below in addition to Sb and C (carbon).

When Y is a thioalkyl group containing a sulfur atom to be directly bonded to a Sb atom, the compound represented by the above general formula (1) includes, for example, a compound represented by the following general formula (6),

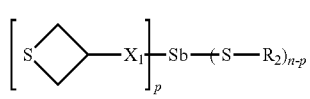

(6)

(wherein, in the above general formula (6), $X_1$ and n are each the same as $X_1$ and n in the above general formula (1); and p is an integer of equal to or more than 2 and equal to or less than (n−1), provided that when n-p is 1, $R_2$ represents an alkyl group having a straight chain or a branched chain of equal to or more than 1 and equal to or less than 3 carbon atoms which may have a substituent; and when n-p is 2 or more, a plurality of $R_2$s contained are each independently selected from alkyl groups having a straight chain or a branched chain of equal to or more than 1 and equal to or less than 3 carbon atoms which may have a substituent or a single bond. Or, a plurality of $R_2$s may be bonded to each other to form a ring containing a Sb atom. At this time, the alkyl chain forming a ring has equal to or more than 1 and equal to or less than 3 carbon atoms, and a portion constituting the ring does not contain a sulfur atom).

In the above general formula (6), $X_1$ is preferably a sulfur atom from the viewpoint of improvement of the refractive index of the resin. At this time, the above general formula (6) becomes the following general formula (7),

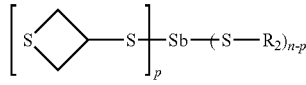

(7)

(wherein, in the above general formula (7), p, n and $R_2$ are each the same as p, n and $R_2$ in the above general formula (6)), In the above general formulae (6) and (7), n is the number of valence of a Sb atom; and p is a positive integer of (the number of valence of a Sb atom−1) or less, that is, p is an integer of equal to or more than 2 and equal to or less than (n−1).

In the above general formulae (6) and (7), $R_2$ represents an alkyl group having a straight chain or a branched chain of equal to or more than 1 and equal to or less than 3 carbon atoms which may have a substituent.

When n-p is 2 or more, $R_2$s each independently represent an alkyl group having a straight chain or a branched chain of equal to or more than 1 and equal to or less than 3 carbon atoms which may have a substituent. A plurality of $R_2$s may be the same group, or may be groups, a part or all of which are different. Furthermore, a plurality of $R_2$s may be bonded to each other to form a ring containing atom group-S—Sb—S—. In this case, the alkyl chain forming a ring has equal to or more than 1 and equal to or less than 3 carbon atoms, while a sulfur atom is merely what is directly bonded to a Sb atom. Namely, of $R_2$s, a portion constituting the ring does not contain a sulfur atom.

One of preferable examples of the compound represented by the above general formulae (6) and (7) include the following aspect. That is, when $R_2$s do not form a ring, concrete examples of $R_2$ include a methyl group, an ethyl group, a propyl group and an isopropyl group, that is, an alkyl group having equal to or more than 1 and equal to or less than 3 carbon atoms.

Furthermore, other preferable examples of the compound represented by the above general formulae (6) and (7) include compounds in which n-p is 2, two —S—$R_2$ groups form a ring containing atom group-S—Sb—S— together with a Sb atom adjacent to S, and an alkyl chain forming a ring is a methylene group, an ethylene group and a propylene group, that is, an alkylene group having equal to or more than 1 and equal to or less than 3 carbon atoms. A ring containing a Sb atom is specifically a 4-membered ring to a 6-membered ring. Incidentally, when the ring containing a Sb atom is a 4-membered ring, one of the two $R_2$s is specifically a single bond.

Further specifically, when a ring is not formed, $R_2$ is a methyl group, while when a ring is formed, an alkyl chain forming a ring is an ethylene group.

Hereinafter, a case in which, in the above general formula (100), r is 2 will be described by focusing on different points from the case in which r is 1. Groups or symbols that are not particularly described below are the same as those aforementioned with reference to the general formula (1) when r is 1.

When r is 2, n-p-q is 1 or 2, Y is a divalent group to be bonded with its both ends to Sb atoms which are different from each other.

Y is preferably an organic group, and concrete examples thereof include divalent organic groups exemplified as $R_1$. In addition, Y includes an —S—$R_3$—S— group. In the above group, $R_3$ is a methylene group or an alkylene group having equal to or more than 2 and equal to or less than 5 carbon atoms. Incidentally, when r is 2 and n-p-q is 2, two 2 Ys may be the same group or may be different groups. When r is 2 and n-p-q is 2, Ys may form a ring along with two Sb atoms.

When r is 2, in the above general formula (100), T represents an inorganic or organic group. When r is 2 and q is 2, a plurality of Ts contained are each independently selected from inorganic or organic groups. A plurality of Ts may be the same group or may be different groups.

T is preferably an organic group, and concrete examples thereof include monovalent groups exemplified in Y when r is 1.

Incidentally, when r is 2, m is preferably 0. At this time, the above general formula (100) is represented by the following general formula (101),

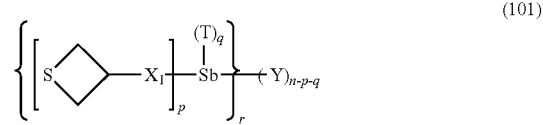

(101)

(wherein, in the above general formula (101), $X_1$, Y, T, n, p, q and r are each the same as $X_1$, Y, T, n, p, q and r in the above general formula (100)).

Furthermore, when r is 2, it is further preferable that m is 0 and $X_1$ is a sulfur atom. At this time, the above general formula (100) is represented by the following general formula (102),

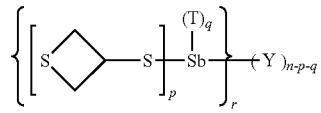
(102)

(wherein, in the above general formula (102), Y, T, n, p, q and r are each the same as Y, T, n, p, q and r in the above general formula (100)).

Concrete examples of the compound represented by the above general formula (100) include the following compounds. Firstly, in the above general formula (100), when r is 1, the following compounds are exemplified in addition to compounds represented by the above formulae (4) and (5).

n = 5

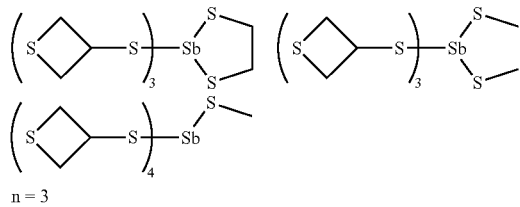

n = 3

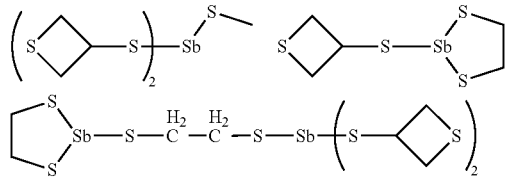

When r is 2, the following compounds are exemplified.

n = 3

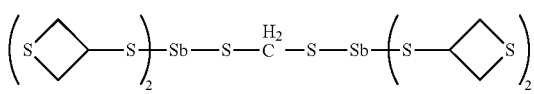

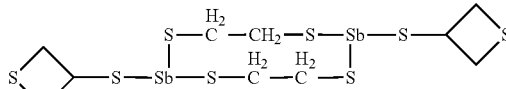

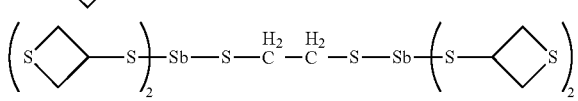

As described above, a case in which M is a Sb atom is described as an example, and in the above general formulae (110) and (120), each substituent or the like is selected in accordance with the case in which M is a Sb atom.

Further, the above general formulae (101) and (102) can be generalized as illustrated below corresponding to the above general formula (110).

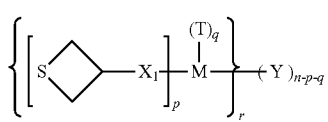
(111)

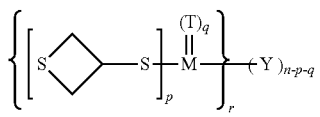
(112)

Examples of the compound represented by the above general formula (111) include the following compounds.

|  | n − p = 0 | n − p > 0, q > 0 | n − p > 0, q = 0 |
|---|---|---|---|
| r = 1 | | | |
| n = 2 | $[S\diamondsuit{-}X_1]_2{-}M$ | | $S\diamondsuit{-}X_1{-}M{-}T$ |
| n = 3 | $[S\diamondsuit{-}X_1]_3{-}M$ | $[S\diamondsuit{-}X_1]_p{-}M{-}(T)_{3-p}$ | $S\diamondsuit{-}X_1{-}M{-}(Y)_2$ |
| n = 4 | $[S\diamondsuit{-}X_1]_4{-}M$ | $[S\diamondsuit{-}X_1]_p{-}M{-}(T)_{4-p}$ | $[S\diamondsuit{-}X_1]_2{-}M{-}(Y)_2$ |
| n = 5 | $[S\diamondsuit{-}X_1]_5{-}M$ | $[S\diamondsuit{-}X_1]_p{-}M{-}(T)_{5-p}$ | $[S\diamondsuit{-}X_1]_p{-}M{-}(Y)_{5-p}$ |

-continued

| | n − p = 0 | n − p > 0, q > 0 | n − p > 0, q = 0 |
|---|---|---|---|
| r = 2 | | | S◇—X₁—M—Y—M—X₁—◇S <br><br> [◇—X₁]ₚ—M—(Y)₃₋ₚ—M—[X₁—◇]ₚ |

Incidentally, in the above general formulae (110) to (112) and (120), the number of valence n of the metal atom M is specifically equal to or more than 2 and equal to or less than 5.

When n is 2, one example of the metal atom M includes Ti (titanium).

When n is 3, examples of M include Ti, Ta (tantalum), Sb (antimony) and Bi (bismuth), and preferable examples include Sb and Bi.

When n is 4, examples of M include Ti, Zr (zirconium) and Ta, and preferable examples include Ti and Zr.

Furthermore, when n is 5, examples of M include Ta and Sb.

When n is equal to or more than 2 and equal to or less than 5, concrete examples of the metal thietane compound in the present invention include the following compounds.

| r = 1  n − p = 0 | n − p > 0, q = 0 |
|---|---|
| n = 2 | |
| n = 3 | |
| n = 4 | |
| n = 5 | |

| r = 2  n − p > 0, q = 0 |
|---|
| n = 2 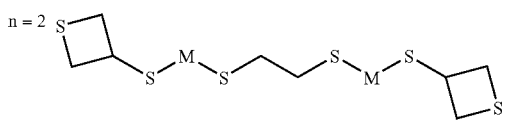 | n = 3

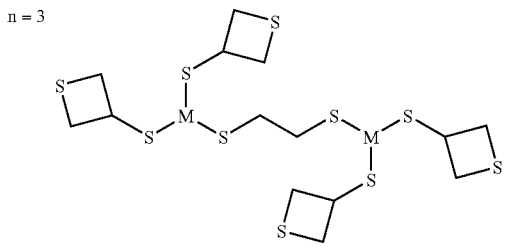

Incidentally, as another embodiment of the metal thietane compound in the present invention, a ligand is coordinated to a metal atom M. Namely, the metal thietane compound represented by the above general formulae (110) and (120) may further contain a coordination compound to be bonded to a metal atom by a coordinate bond.

The coordination compound contains a coordinating functional group to be coordinated to one or more metals in a molecule. Further, as the coordination compound, any compound having a structure can be used as long as it is coordinated to the compound represented by the above general formula (110) or (120), but the coordination compound is preferably a compound to be coordinated to a metal with a hetero atom such as a nitrogen atom, an oxygen atom, a phosphorus atom, a sulfur atom or the like.

Concrete examples of a ligand to be coordinated with a nitrogen atom include ammonia and amine compounds such as ammonia, methylamine, ethylamine, propylamine, isopropylamine, dimethylamine, diethylamine, di-propylamine, di-isopropylamine, trimethylamine, triethylamine, ethylenediamine, propylenediamine, dimethylethylenediamine, tetramethylethylenediamine, hydrazine, methylhydrazine, dimethylhydrazine, aniline, phenylhydrazine, o-phenylenediamine, hydroxylamine, cysteamine, aminoethanol, glycine and the like;

pyridine compounds such as pyridine, 2,2'-bipyridine, 1,10-phenanthroline and the like;

heterocyclic nitrogen compounds such as pyridazine, pyrimidine, purine, pyrazine, 1,8-naphthyridine, pyrazole, imidazole and the like;

amide compounds such as dimethylformamide, dimethylimidazolidinone and the like; and nitrile compounds such as acetonitrile, propionitrile and the like.

Concrete examples of a ligand to be coordinated with a phosphorus atom include phosphine compounds such as triphenylphosphine, trimethylphosphine, triethylphosphine, 1,2-bis(dimethylphosphino)ethane, bis(dimethylphosphino)methane and the like.

Concrete examples of a ligand to be coordinated with an oxygen atom include water and alcohol compounds such as water, methanol, ethanol, propanol, isopropanol, ethylene glycol, propylene glycol, 1,3-propanediol and the like;

ether compounds such as tetrahydrofuran, 1,4-dioxane, dimethoxyethane, ethylene glycol monomethyl ether and the like;

ketone compounds such as acetone, methyl ethyl ketone and the like;

ester compounds such as ethyl acetate, methyl acetate, methyl formate, ethyl formate and the like; and sulfoxide compounds and sulfone compounds such as dimethyl sulfoxide, sulfolane and the like.

Concrete examples of a ligand to be coordinated with a sulfur atom include sulfide compounds such as dimethyl sulfide, diethyl sulfide, tetrahydrothiophene and the like, but are not restricted to these exemplified compounds alone.

Of these exemplified coordination compounds, preferable examples include ammonia and amine compounds such as ammonia, ethylenediamine, tetramethylethylenediamine, hydroxylamine and the like; pyridine compounds such as pyridine, 2,2'-bipyridine and the like; and ether compounds such as tetrahydrofuran, dimethoxyethane and the like.

More preferably used are ammonia and ethylenediamine.

Hereinafter, a case in which M in the above general formula (120) is Bi will be described. At this time, the thietane compound of the present invention is a compound having a thietane group and a Bi atom in a molecule, and is specifically represented by the following general formula (201),

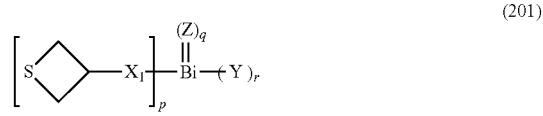

(201)

(wherein, in the above general formula (201), $X_1$ represents a sulfur atom or an oxygen atom; Z represents a sulfur atom or an oxygen atom; p represents an integer of equal to or more than 1 and equal to or less than 5; q is an integer of equal to or more than 0 and equal to or less than 2; r represents an integer of equal to or more than 0 and equal to or less than 4; and p+r+2q is 5 or 3, provided that when r is an integer of 2 or more, a plurality of Ys contained are each independently selected from inorganic or organic (residue) groups, or a plurality of Ys may be bonded to each other to form a ring containing a Bi atom).

In the above general formula (201), $X_1$ is a sulfur atom or an oxygen atom. From the viewpoint of further improvement of the refractive index of the resin obtained by polymerizing the polymerizable composition containing a thietane compound represented by the above general formula (201), $X_1$ is preferably a sulfur atom.

In the above general formula (201), p is a positive integer of the number of valance of Bi or less, and the number of valance of Bi is 3 or 5. That is, p is an integer of equal to or more than 1 and equal to or less than 5.

Furthermore, q is an integer of equal to or more than 0 and equal to or less than 2, and further specifically 0 or 1. Incidentally, when q is 2, two Zs may be the same or different.

r is an integer of equal to or more than 0 and equal to or less than 4.

p+r+2q is the number of valance of Bi, that is, 5 or 3. From the viewpoint of increase of the number of functional groups participating in polymerization when used as a polymerizable compound in the polymerizable composition to be described below, p+r+2q is preferably 5.

In the above general formula (201), specifically, p is 3, and further specifically, $X_1$ is a sulfur atom, p is 3, q is 0, and r is 0. At this time, the compound represented by the above general formula (201) becomes a compound represented by the following formula.

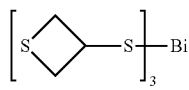

In the above general formula (201), Ys each independently represent an inorganic or organic group. Hereinafter, concrete examples of Y will be described.

Firstly, when r is 1, Y represents an inorganic or organic group. When r is an integer of 2 or more, a plurality of Ys contained are each independently selected from inorganic or organic groups. A plurality of Ys may be the same group, or may be groups, a part or all of which are different. Furthermore, a plurality of Ys may be bonded to each other to form a ring containing a Bi atom.

Y is not particularly limited, and examples thereof include a hydrogen atom, a halogen atom, a hydroxyl group, a thiol group, a substituted or unsubstituted alkyl group, a substituted or unsubstituted aryl group, a substituted or unsubstituted aralkyl group, a substituted or unsubstituted alkoxy group, a substituted or unsubstituted alkylthio group, a substituted or unsubstituted aryloxy group and a substituted or unsubstituted arylthio group.

Of these, the halogen atom, the substituted or unsubstituted alkyl group, the substituted or unsubstituted aryl group, the substituted or unsubstituted aralkyl group, the substituted or unsubstituted alkoxy (alkyloxy) group, the substituted or unsubstituted alkylthio group, the substituted or unsubstituted aryloxy group, and the substituted or unsubstituted arylthio group will be described below.

Concrete examples of the halogen atom include a fluorine atom, a chlorine atom, a bromine atom and an iodine atom.

Concrete examples of the substituted or unsubstituted alkyl group include a straight chained alkyl group having equal to or more than 1 and equal to or less than 10 carbon atoms in total such as a methyl group, an ethyl group, an n-propyl group, an n-butyl group, an n-pentyl group, an n-hexyl group and the like; a branched alkyl group having equal to or more than 3 and equal to or less than 10 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 1-n-propylbutyl group, a 1-iso-propylbutyl group, a 1-iso-propyl--2-methylpropyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexyl group, a 3-ethylhexyl group, a 4-ethylhexyl group, a 1-n-propylpentyl group, a 2-n-propylpentyl group, a 1-iso-propylpentyl group, a 2-iso-propylpentyl group, a 1-n-butylbutyl group, a 1-iso-butylbutyl group, a 1-sec-butylbutyl group, a 1-tert-butylbutyl group, a 2-tert-butylbutyl group, a tert-butyl group, a tert-pentyl group, a 1,1-dimethylbutyl group, a 1,2-dimethylbutyl group, a 1,3-dimethylbutyl group, a 2,3-dimethylbutyl group, a 1-ethyl-2-methylpropyl group, a 1,1-dimethylpentyl group, a 1,2-dimethylpentyl group, a 1,3-dimethylpentyl group, a 1,4-dimethylpentyl group, a 2,2-dimethylpentyl group, a 2,3-dimethylpentyl group, a 2,4-dimethylpentyl group, a 3,3-dimethylpentyl group, a 3,4-dimethylpentyl group, a 1-ethyl-1-methylbutyl group, a 1-ethyl-2-methylbutyl group, a 1-ethyl-3-methylbutyl group, a 2-ethyl-1-methylbutyl group, a 2-ethyl-3-methylbutyl group, a 1,1-dimethylhexyl group, a 1,2-dimethylhexyl group, a 1,3-dimethylhexyl group, a 1,4-dimethylhexyl group, a 1,5-dimethylhexyl group, a 2,2-dimethylhexyl group, a 2,3-dimethylhexyl group, a 2,4-dimethylhexyl group, a 2,5-dimethylhexyl group, a 3,3-dimethylhexyl group, a 3,4-dimethylhexyl group, a 3,5-dimethylhexyl group, a 4,4-dimethylhexyl group, a 4,5-dimethylhexyl group, a 1-ethyl-2-methylpentyl group, a 1-ethyl-3-methylpentyl group, a 1-ethyl-4-methylpentyl group, a 2-ethyl-1-methylpentyl group, a 2-ethyl-2-methylpentyl group, a 2-ethyl-3-methylpentyl group, a 2-ethyl-4-methylpentyl group, a 3-ethyl-1-methylpentyl group, a 3-ethyl-2-methylpentyl group, a 3-ethyl-3-methylpentyl group, a 3-ethyl-4-methylpentyl group, a 1-n-propyl-1-methylbutyl group, a 1-n-propyl-2-methylbutyl group, a 1-n-propyl-3-methylbutyl group, a 1-iso-propyl-1-methylbutyl group, a 1-iso-propyl-2-methylbutyl group, a 1-iso-propyl-3-methylbutyl group, a 1,1-diethylbutyl group, a 1,2-diethylbutyl group, a 1,1,2-trimethylpropyl group, a 1,2,2-trimethylpropyl group, a 1,1,2-trimethylbutyl group, a 1,1,3-trimethylbutyl group, a 1,2,3-trimethylbutyl group, a 1,2,2-trimethylbutyl group, a 1,3,3-trimethylbutyl group, a 2,3,3-trimethylbutyl group, a 1,1,2-trimethylpentyl group, a 1,1,3-trimethylpentyl group, a 1,1,4-trimethylpentyl group, a 1,2,2-trimethylpentyl group, a 1,2,3-trimethylpentyl group, a 1,2,4-trimethylpentyl group, a 1,3,4-trimethylpentyl group, a 2,2,3-trimethylpentyl group, a 2,2,4-trimethylpentyl group, a 2,3,4-trimethylpentyl group, a 1,3,3-trimethylpentyl group, a 2,3,3-trimethylpentyl group, a 3,3,4-trimethylpentyl group, a 1,4,4-trimethylpentyl group, a 2,4,4-trimethylpentyl group, a 3,4,4-trimethylpentyl group, a 1-ethyl-1,2-dimethylbutyl group, a 1-ethyl-1,3-dimethylbutyl group, a 1-ethyl-2,3-dimethylbutyl group, a 2-ethyl-1,1-dimethylbutyl group, a 2-ethyl-1,2-dimethylbutyl group, a 2-ethyl-1,3-dimethylbutyl group, a 2-ethyl-2,3-dimethylbutyl group and the like; and a saturated cyclic alkyl group having equal to or more than 5 and equal to or less than 10 carbon atoms in total such as a cyclopentyl group, a cyclohexyl group, a methylcyclopentyl group, a methoxycyclopentyl group, a methoxycyclohexyl group, a methylcyclohexyl group, a 1,2-dimethylcyclohexyl group, a 1,3-dimethylcyclohexyl group, a 1,4-dimethylcyclohexyl group, an ethylcyclohexyl group and the like.

Concrete examples of the substituted or unsubstituted aryl group include aromatic hydrocarbons having not more than 20 carbon atoms in total such as a phenyl group, a naphthyl group, an anthranyl group, a cyclopentadienyl group and the like;

an alkyl-substituted aryl group having not more than 20 carbon atoms in total such as a 2-methylphenyl group, a 3-methylphenyl group, a 4-methylphenyl group, a 2-ethylphenyl group, a propylphenyl group, a butylphenyl group, a hexylphenyl group, a cyclohexylphenyl group, an octylphenyl group, a 2-methyl-1-naphthyl group, a 3-methyl-1-naphthyl group, a 4-methyl-1-naphthyl group, a 5-methyl-1-naphthyl group, a 6-methyl-1-naphthyl group, a 7-methyl-1-naphthyl group, a 8-methyl-1-naphthyl group, a 1-methyl-2-naphthyl group, a 3-methyl-2-naphthyl group, a 4-methyl-2-naphthyl group, a 5-methyl-2-naphthyl group, a 6-methyl-2-naphthyl group, a 7-methyl-2-naphthyl group, a 8-methyl-2- naphthyl group, a 2-ethyl-1-naphthyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 20 carbon atoms in total wherein a substituted or unsubstituted alkyloxy group having not more than 10 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group, a hexyloxyphenyl group, a cyclohexyloxyphenyl group, an octyloxyphenyl group, a 2-methoxy-1-naphthyl group, a 3-methoxy-1-naphthyl group, a 4-methoxy-1-naphthyl group, a 5-methoxy-1-naphthyl group, a 6-methoxy-1-naphthyl group, a 7-methoxy-1-naphthyl group, a 8-methoxy-1-naphthyl group, a 1-methoxy-2-naphthyl group, a 3-methoxy-2-naphthyl group, a 4-methoxy-2-naphthyl group, a 5-methoxy-2-naphthyl group, a 6-methoxy-2-naphthyl group, a 7-methoxy-2-naphthyl group, a 8-methoxy-2-naphthyl group, a 2-ethoxy-1-naphthyl group and the like;

a dialkoxyaryl group having not more than 20 carbon atoms in total wherein a substituted or unsubstituted alkyloxy group having not more than 10 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 4,5-dimethoxy-1-naphthyl group, a 4,7-dimethoxy-1-naphthyl group, a 4,8-dimethoxy-1-naphthyl group, a 5,8-dimethoxy-1-naphthyl group, a 5,8-dimethoxy-2-naphthyl group and the like;

a trialkoxyaryl group having not more than 20 carbon atoms in total wherein a substituted or unsubstituted alkyloxy group having not more than 10 carbon atoms is substituted, such as a 2,3,4-trimethoxyphenyl group, a 2,3,5-trimethoxyphenyl group, a 2,3,6-trimethoxyphenyl group, a 2,4,5-trimethoxyphenyl group, a 2,4,6-trimethoxyphenyl group, a 3,4,5-trimethoxyphenyl group and the like; and an aryl group having not more than 20 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Concrete examples of the substituted or unsubstituted aralkyl group include a benzyl group, a phenethyl group, a phenylpropyl group, a naphthylethyl group, or a methyl group, an ethyl group and a propyl group having an aryl group specifically mentioned as examples of the substituted or unsubstituted aryl group beforehand in a side chain.

Concrete examples of the substituted or unsubstituted alkyloxy group include a straight chained or branched alkoxy group having equal to or more than 1 and equal to or less than 10 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, an n-nonyloxy group and the like;

a cycloalkoxy group having equal to or more than 5 and equal to or less than 10 carbon atoms in total such as a cyclopentyloxy group, a cyclohexyloxy group and the like;

an alkoxyalkoxy group having equal to or more than 2 and equal to or less than 10 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group, an n-pentyloxyethoxy group, an iso-pentyloxyethoxy group, an n-hexyloxyethoxy group, an iso-hexyloxyethoxy group, an n-heptyloxyethoxy group and the like; and an aralkyloxy group such as a benzyloxy group.

Concrete examples of the substituted or unsubstituted alkylthio group include a straight chained or branched alkylthio group having equal to or more than 1 and equal to or less than 10 carbon atoms in total such as a methylthio group, an ethylthio group, an n-propylthio group, an iso-propylthio group, an n-butylthio group, an iso-butylthio group, a sec-butylthio group, a t-butylthio group, an n-pentylthio group, an iso-pentylthio group, an n-hexylthio group, an iso-hexylthio group, a 2-ethylhexylthio group, a 3,5,5-trimethylhexylthio group, an n-heptylthio group, an n-octylthio group, an n-nonylthio group and the like;

a cycloalkylthio group having equal to or more than 5 and equal to or less than 10 carbon atoms in total such as a cyclopentylthio group, a cyclohexylthio group and the like;

an alkoxyalkylthio group having equal to or more than 2 and equal to or less than 10 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group, an n-pentyloxyethylthio group, an iso-pentyloxyethylthio group, an n-hexyloxyethylthio group, an iso-hexyloxyethylthio group, an n-heptyloxyethylthio group and the like;

an aralkylthio group such as a benzylthio group and the like; and an alkylthioalkylthio group having equal to or more than 2 and equal to or less than 10 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group, an n-pentylthioethylthio group, an iso-pentylthioethylthio group, an n-hexylthioethylthio group, an iso-hexylthioethylthio group, an n-heptylthioethylthio group and the like.

Concrete examples of the substituted or unsubstituted aryloxy group include an unsubstituted or alkyl-substituted aryloxy group having not more than 20 carbon atoms in total such as a phenyloxy group, a naphthyloxy group, an anthranyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, an octylphenyloxy group, a 2-methyl-1-naphthyloxy group, a 3-methyl-1-naphthyloxy group, a 4-methyl-1-naphthyloxy group, a 5-methyl-1-naphthyloxy group, a 6-methyl-1-naphthyloxy group, a 7-methyl-1-naphthyloxy group, a 8-methyl-1-naphthyloxy group, a 1-methyl-2-naphthyloxy group, a 3-methyl-2-naphthyloxy group, a 4-methyl-2-naphthyloxy group, a 5-methyl-2-naphthyloxy group, a 6-methyl-2-naphthyloxy group, a 7-methyl-2-naphthyloxy group, a 8-methyl-2-naphthyloxy group, a 2-ethyl-1-naphthyloxy group, a 2,3-dimethylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;

a monoalkoxyaryloxy group having not more than 20 carbon atoms in total wherein a substituted or unsubstituted alkyloxy group having not more than 10 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group, an octyloxyphenyloxy group, a 2-methoxy-1-naphthyloxy group, a 3-methoxy-1-naphthyloxy group, a 4-methoxy-1-naphthyloxy group, a 5-methoxy-1-naphthyloxy group, a 6-methoxy-1-naphthyloxy group, a 7-methoxy-1-naphthyloxy group, a 8-methoxy-1-naphthyloxy group, a 1-methoxy-2-naphthyloxy group, a 3-methoxy-2-naphthyloxy group, a 4-methoxy-2-naphthyloxy group, a 5-methoxy-2-naphthyloxy group, a 6-methoxy-2-naphthyloxy group, a 7-methoxy-2-naphthyloxy group, a 8-methoxy-2-naphthyloxy group, a 2-ethoxy-1-naphthyloxy group and the like;

a dialkoxyaryloxy group having not more than 20 carbon atoms in total wherein a substituted or unsubstituted alkyloxy group having not more than 10 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group, a 4,5-dimethoxy-1-naphthyloxy group, a 4,7-dimethoxy-1-naphthyloxy group, a 4,8-dimethoxy-1-naphthyloxy group, a 5,8-dimethoxy-1-naphthyloxy group, a 5,8-dimethoxy-2-naphthyloxy group and the like;

a trialkoxyaryloxy group having not more than 20 carbon atoms in total wherein a substituted or unsubstituted alkyloxy group having not more than 10 carbon atoms is substituted, such as a 2,3,4-trimethoxyphenyloxy group, a 2,3,5-trimethoxyphenyloxy group, a 2,3,6-trimethoxyphenyloxy group, a 2,4,5-trimethoxyphenyloxy group, a 2,4,6-trimethoxyphenyloxy group, a 3,4,5-trimethoxyphenyloxy group and the like; and an aryloxy group having not more than 20 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Concrete examples of the substituted or unsubstituted arylthio group include an unsubstituted or alkyl-substituted arylthio group having not more than 20 carbon atoms in total such as a phenylthio group, a naphthylthio group, an anthranylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, an octylphenylthio group, a 2-methyl-1-naphthylthio group, a 3-methyl-1-naphthylthio group, a 4-methyl-1-naphthylthio group, a 5-methyl-1-naphthylthio group, a 6-methyl-1-naphthylthio group, a 7-methyl-1-naphthylthio group, a 8-methyl-1-naphthylthio group, a 1-methyl-2-naphthylthio group, a 3-methyl-2-naphthylthio group, a 4-methyl-2-naphthylthio group, a 5-methyl-2-naphthylthio group, a 6-methyl-2-naphthylthio group, a 7-methyl-2-naphthylthio group, a 8-methyl-2-naphthylthio group, a 2-ethyl-1-naphthylthio group, a 2,3-dimethylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;

a monoalkoxyarylthio group having not more than 20 carbon atoms in total wherein a substituted or unsubstituted alkyloxy group having not more than 10 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group, an octyloxyphenylthio group, a 2-methoxy-1-naphthylthio group, a 3-methoxy-1-naphthylthio group, a 4-methoxy-1-naphthylthio group, a 5-methoxy-1-naphthylthio group, a 6-methoxy-1-naphthylthio group, a 7-methoxy-1-naphthylthio group, a 8-methoxy-1-naphthylthio group, a 1-methoxy-2-naphthylthio group, a 3-methoxy-2-naphthylthio group, a 4-methoxy-2-naphthylthio group, a 5-methoxy-2-naphthylthio group, a 6-methoxy-2-naphthylthio group, a 7-methoxy-2-naphthylthio group, a 8-methoxy-2-naphthylthio group, a 2-ethoxy-1-naphthylthio group and the like;

a dialkoxyarylthio group having not more than 20 carbon atoms in total wherein a substituted or unsubstituted alkyloxy group having not more than 10 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like;

a trialkoxyarylthio group having not more than 20 carbon atoms in total wherein a substituted or unsubstituted alkyloxy group having not more than 10 carbon atoms is substituted, such as a 2,3,4-trimethoxyphenylthio group, a 2,3,5-trimethoxyphenylthio group, a 2,3,6-trimethoxyphenylthio group, a 2,4,5-trimethoxyphenylthio group, a 2,4,6-trimethoxyphenylthio group, a 3,4,5-trimethoxyphenylthio group and the like; and an arylthio group having not more than 20 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like. Ys are not restricted thereto.

Preferable examples of Y are as follows.

A preferable example includes a hydrogen atom.

Furthermore, of preferable examples of Y, examples of the halogen atom include a chlorine atom, a bromine atom and an iodine atom.

Preferable examples of the substituted or unsubstituted alkyl group include a straight chained alkyl group having equal to or more than 1 and equal to or less than 6 carbon atoms in total such as a methyl group, an ethyl group, an n-propyl group, an n-butyl group, an n-pentyl group, an n-hexyl group and the like;

a branched alkyl group having equal to or more than 3 and equal to or less than 6 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a tert-butyl group, a tert-pentyl group, a 1,1-dimethylbutyl group, a 1,2-dimethylbutyl group, a 1,3-dimethylbutyl group, a 2,3-dimethylbutyl group and the like; and a saturated cyclic alkyl group having equal to or more than 5 and equal to or less than 6 carbon atoms in total such as a cyclopentyl group, a cyclohexyl group and the like.

Preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 12 carbon atoms in total such as a 2-methylphenyl group, a 3-methylphenyl group, a 4-methylphenyl group, a 2-ethylphenyl group, a propylphenyl group, a butylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 12 carbon atoms in total wherein a substituted or unsubstituted alkyloxy group having not more than 6 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group and the like;

a dialkoxyaryl group having not more than 12 carbon atoms in total wherein a substituted or unsubstituted alkyloxy group having not more than 6 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Preferable examples of the substituted or unsubstituted aralkyl group include an aralkyl group having not more than 12 carbon atoms in total such as a benzyl group, a phenethyl group, a phenylpropyl group and the like.

Preferable examples of the substituted or unsubstituted alkyloxy group include a straight chained or branched alkoxy group having equal to or more than 1 and equal to or less than 6 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group and the like;

a cycloalkoxy group having 5 or 6 carbon atoms in total such as a cyclopentyloxy group, a cyclohexyloxy group and the like; and an alkoxyalkoxy group having equal to or more than 2 and equal to or less than 6 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group and the like.

Preferable examples of the substituted or unsubstituted alkylthio group include a straight chained or branched alkylthio group having equal to or more than 1 and equal to or less than 6 carbon atoms in total such as a methylthio group, an ethylthio group, an n-propylthio group, an iso-propylthio group, an n-butylthio group, an iso-butylthio group, a sec-butylthio group, a t-butylthio group, an n-pentylthio group, an iso-pentylthio group, an n-hexylthio group, an iso-hexylthio group and the like;

a cycloalkylthio group having 5 or 6 carbon atoms in total such as a cyclopentylthio group, a cyclohexylthio group and the like;

an alkoxyalkylthio group having equal to or more than 2 and equal to or less than 6 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group and the like; and an alkylthioalkylthio group having equal to or more than 2 and equal to or less than 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

Preferable examples of the substituted or unsubstituted aryloxy group include an unsubstituted or alkyl-substituted aryloxy group having not more than 12 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;

a monoalkoxyaryloxy group having not more than 12 carbon atoms in total wherein a substituted or unsubstituted alkyloxy group having not more than 6 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group and the like;

a dialkoxyaryloxy group having not more than 12 carbon atoms in total wherein a substituted or unsubstituted alkyloxy group having not more than 6 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Preferable examples of the substituted or unsubstituted arylthio group include an unsubstituted or alkyl-substituted arylthio group having not more than 12 carbon atoms in total such as a phenylthio group, a naphthylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;

a monoalkoxyarylthio group having not more than 12 carbon atoms in total wherein a substituted or unsubstituted alkyloxy group having not more than 6 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group and the like;

a dialkoxyarylthio group having not more than 12 carbon atoms in total wherein a substituted or unsubstituted alkyloxy group having not more than 6 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like.

More preferable examples of Y are as follows.

A preferable example of Y includes a hydrogen atom.

Furthermore, examples of the halogen atom include a chlorine atom and a bromine atom.

More preferable examples of the substituted or unsubstituted alkyl group include a straight chained or branched alkyl group having equal to or more than 1 and equal to or less than 3 carbon atoms in total such as a methyl group, an ethyl group, an iso-propyl group and the like.

More preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 9 carbon atoms in total such as a 2-methylphenyl group, a 3-methylphenyl group, a 4-methylphenyl group, a 2-ethylphenyl group, a propylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group and the like;

a monoalkoxyaryl group having not more than 9 carbon atoms in total wherein a substituted or unsubstituted alkyloxy group having not more than 3 carbon atoms is substituted, such as a 2-methoxyphenyl group, a 3-methoxyphenyl group, a 4-methoxyphenyl group, a 2-ethoxyphenyl group, a propoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, a chloronaphthyl group, a bromonaphthyl group and the like.

More preferable examples of the substituted or unsubstituted aralkyl group include an aralkyl group having not more than 9 carbon atoms in total such as a benzyl group, a phenethyl group, a phenylpropyl group and the like.

More preferable examples of the substituted or unsubstituted alkyloxy group include a straight chained or branched alkoxy group having equal to or more than 1 and equal to or less than 3 carbon atoms in total such as a methoxy group, an ethoxy group, an iso-propoxy group and the like; and a cycloalkoxy group having 5 or 6 carbon atoms in total such as a cyclopentyloxy group, a cyclohexyloxy group and the like.

More preferable examples of the substituted or unsubstituted alkylthio group include a straight chained or branched alkylthio group having equal to or more than 1 and equal to or less than 3 carbon atoms in total such as a methylthio group, an ethylthio group, an n-propylthio group, an iso-propylthio group and the like;

a cycloalkylthio group having 5 or 6 carbon atoms in total such as a cyclopentylthio group, a cyclohexylthio group and the like; and an alkylthioalkylthio group having equal to or more than 2 and equal to or less than 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

More preferable examples of the substituted or unsubstituted aryloxy group include an unsubstituted or alkyl-substituted aryloxy group having not more than 9 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group and the like;

a monoalkoxyaryloxy group having not more than 9 carbon atoms in total wherein a substituted or unsubstituted alkyloxy group having not more than 3 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, a chloronaphthyloxy group, a bromonaphthyloxy group and the like.

More preferable examples of the substituted or unsubstituted arylthio group include an unsubstituted or alkyl-substituted arylthio group having not more than 9 carbon atoms in total such as a phenylthio group, a 2-methylphenylthio group, a 3-methylphenylthio group, a 4-methylphenylthio group, a 2-ethylphenylthio group, a propylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group and the like;

a monoalkoxyarylthio group having not more than 9 carbon atoms in total wherein a substituted or unsubstituted alkyloxy group having not more than 3 carbon atoms is substituted, such as a 2-methoxyphenylthio group, a 3-methoxyphenylthio group, a 4-methoxyphenylthio group, a 2-ethoxyphenylthio group, a propoxyphenylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, a chloronaphthylthio group, a bromonaphthylthio group and the like.

When Ys do not form a ring, concrete examples of Y include a methyl group, an ethyl group, a propyl group and an isopropyl group, that is, an alkyl group having equal to or more than 1 and equal to or less than 3 carbon atoms.

When a ring is formed, examples of the alkyl chain forming a ring include a methylene group, an ethylene group and a propylene group, that is, an alkylene group having equal to or more than 1 and equal to or less than 3 carbon atoms. A ring containing Bi is specifically equal to or more than 4-membered and equal to or less than 6-membered.

Further specifically, when a ring is not formed, Y is a methyl group, while when a ring is formed, an alkyl chain forming a ring is an ethylene group.

Hereinafter, Z will be described. Z is an oxygen atom or a sulfur atom. Incidentally, when q is 2, two Zs are each independently an oxygen atom or a sulfur atom.

For example, when q is 1, further specifically, Z is an oxygen atom.

Of these, when Bi is trivalent, the compound represented by the above general formula (201) becomes a compound represented by the following formula.

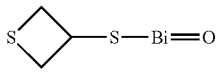

Further, when Bi is pentavalent, the compound represented by the above general formula (201) becomes a compound represented by the following formula.

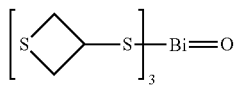

Next, a method for producing the metal thietane compound of the present invention will be described with reference to a method for producing the metal thietane compound represented by the above general formulae (100) or (201).

Firstly, a case in which r is 1 in the above general formula (100) will be described. At this time, the above general formula (100) becomes the above general formula (1).

The metal thietane compound represented by the above general formula (1) is typically produced by the reaction of a halide containing a Sb atom represented by the following general formula (8) with a hydroxy or thiol compound having a thietane group represented by the following general formula (9),

(wherein, in the above general formula (8), n, p and Y are each the same as n, p and Y in the above general formula (1); and W represents a halogen atom),

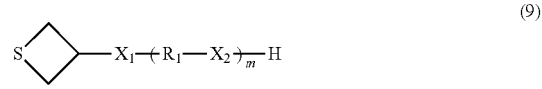

(wherein, in the above general formula (9), $X_1$, $X_2$, $R_1$ and m are each the same as $X_1$, $X_2$, $R_1$ and m in the above general formula (1)).

Furthermore, the compound represented by the above general formula (6) can also be produced in accordance with the method for producing the compound represented by the above general formula (1).

For example, it can be produced by the reaction of a halide represented by the following general formula (10) with a hydroxy or thiol compound having a thietane group represented by the above general formula (9),

(wherein, in the above general formula (10), p, n and $R_2$ are each the same as p, n and $R_2$ in the above general formula (6); and W represents a halogen atom).

It is also produced by mixing a halide in which, in the above general formula (10), n is p, a hydroxy or thiol compound having a thietane group represented by the above general formula (9) and a thiol compound represented by the following general formula (11) together, and reacting these compounds at the same time, $$R_2\text{—SH} \tag{11}$$

(wherein, in the above general formula (11), $R_2$ is the same as $R_2$ in the above general formula (6)).

It is also produced by reacting a compound obtained by reacting a halide in which, in the above general formula (10), n is p, with a hydroxy or thiol compound having a thietane group represented by the above general formula (9) in advance, with a thiol compound represented by the above general formula (11).

Incidentally, the metal thietane compound represented by the above general formula (1) can also be produced by a method other than the method using a metal halide. For example, the metal thietane compound represented by the above general formula (1) can also be produced by reacting the compound represented by the above general formula (9) using a metal oxide or a metal amide as a raw material.

The compounds represented by the above general formulae (8), (10) and (11) are available as an industrial raw material or a reagent for research purpose.

Furthermore, the compound represented by the above general formula (9) is a known compound and is produced, for example, by the method as described in Patent Document 2 (Japanese Patent Laid-open No. 2003-327583).

The reaction of a halide containing Sb represented by the above general formula (8) with a hydroxy or thiol compound having a thietane group represented by the above general formula (9) may be carried out in the absence of a solvent, or may be carried out in the presence of a solvent which is inactive to the reaction.

The solvents are not particularly limited as long as they are inactive to the reaction, and examples thereof include hydrocarbon solvents such as petroleum ether, hexane, benzene, toluene, xylene, mesitylene and the like;
ether solvents such as diethyl ether, tetrahydrofuran, diethylene glycol dimethyl ether and the like;
ketone solvents such as acetone, methyl ethyl ketone, methyl isobutyl ketone and the like;
ester solvents such as ethyl acetate, butyl acetate, amyl acetate and the like;
chlorine-containing solvents such as methylene chloride, chloroform, chlorobenzene, dichlorobenzene and the like;
polar aprotic solvents such as N,N-dimethylformamide, N,N-dimethylacetamide, N,N-dimethylimidazolidinone, dimethyl sulfoxide and the like;
sulfur-containing solvents such as tetrahydrothiophene, thiophene, sulfolane, trimethylene sulfide, diethyl sulfide, di-n-propyl sulfide, di-t-butyl sulfide, 3-mercaptothietane, bis(2-mercaptoethyl)sulfide and the like; and
water and the like.

The reaction temperature of the compound represented by the above general formula (8) and the compound represented by the above general formula (9) is not particularly limited, and it is usually in the range of equal to or higher than −78 degrees centigrade and equal to or lower than 200 degrees centigrade and preferably equal to or higher than −78 degrees centigrade and equal to or lower than 100 degrees centigrade.

Furthermore, the reaction time is affected by the reaction temperature, and it is usually from several minutes to 100 hours.

In the reaction of the compound represented by the above general formula (8) with the compound represented by the above general formula (9), the amount of the compound represented by the above general formula (8) and the compound represented by the above general formula (9) used is not particularly limited. The amount of the compound represented by the above general formula (9) is usually equal to or more than 0.01 moles and equal to or less than 100 moles, preferably equal to or more than 0.1 moles and equal to or less than 50 moles and more preferably equal to or more than 0.5 moles and equal to or less than 20 moles based on 1 mole of the halogen atom contained in the compound represented by the above general formula (8).

When the reaction of the compound represented by the above general formula (8) with the compound represented by the above general formula (9) is carried out, it is preferable to use a basic compound as a capturing agent of the formed hydrogen halide in order to effectively carry out the reaction.

Examples of the basic compound include inorganic bases such as sodium hydroxide, potassium hydroxide, lithium hydroxide, sodium carbonate, potassium carbonate, lithium carbonate, sodium bicarbonate, potassium bicarbonate, lithium bicarbonate, magnesium hydroxide, calcium hydroxide and the like; and organic bases such as pyridine, triethylamine, dimethylaniline, diethylaniline, 1,8-diazabicyclo[5,4,0]-7-undecene and the like.

In the above general formula (100), the compound in which r is 2 can be obtained by the aforementioned method for the compound in which r is 1.

In the above general formula (120), a compound in which the bond between M and T shown by a dotted line and a solid line is a double bond, n-p-q is 0, Z is an oxygen atom and M is Sb is obtained, for example, by adjusting to an alkaline value by adding an aqueous solution of sodium hydroxide to a mixture of the compound represented by the above general formula (9) and water, and then reacting by the addition of antimony oxychloride. For example, to synthesize (3-thietanylthio)oxy antimony(III), 3-mercaptothietane may be used as the compound represented by the above general formula (9).

As described above, a case in which a metal atom M is a Sb atom was described, but in the present invention, the metal thietane compound containing other metal atoms can also be produced in accordance with the aforementioned method.

For example, when M is Bi, the compound may be produced in the following manner. Hereinafter, a method for producing the thietane compound represented by the above general formula (201) will be exemplified.

The thietane compound represented by the above general formula (201) is typically produced by the reaction of a Bi halide represented by the following general formula (202) with a hydroxy or thiol compound having a thietane group represented by the following general formula (203),

(202)

(wherein, in the above general formula (202), p, q, r, Y and Z are each the same as p, q, r, Y and Z in the above general formula (201); and W represents a halogen atom),

(203)

(wherein, in the above general formula (203), $X_1$ is the same as $X_1$ in the above general formula (201)).

The compound represented by the above general formula (202) is available as an industrial raw material or a reagent for research purpose.

The compound represented by the above general formula (203) is a known compound and is produced, for example, by the method as described in Patent Document 2 (Japanese Patent Laid-open No. 2003-327583).

The reaction of a Bi halide represented by the above general formula (202) with a hydroxy or thiol compound having a thietane group represented by the above general formula (203) may be carried out in the absence of a solvent, or may be carried out in the presence of a solvent which is inactive to the reaction.

The solvents are not particularly limited as long as they are inactive to the reaction, and examples thereof include hydrocarbon solvents such as petroleum ether, hexane, benzene, toluene, xylene, mesitylene and the like;
ether solvents such as diethyl ether, tetrahydrofuran, diethylene glycol dimethyl ether and the like;
ketone solvents such as acetone, methyl ethyl ketone, methyl isobutyl ketone and the like;
ester solvents such as ethyl acetate, butyl acetate, amyl acetate and the like;
chlorine-containing solvents such as methylene chloride, chloroform, chlorobenzene, dichlorobenzene and the like;
polar aprotic solvents such as N,N-dimethylformamide, N,N-dimethylacetamide, N,N-dimethylimidazolidinone, dimethyl sulfoxide and the like;
sulfur-containing solvents such as tetrahydrothiophene, thiophene, sulfolane, trimethylene sulfide, diethyl sulfide, di-n-propyl sulfide, di-t-butyl sulfide, 3-mercaptothietane, bis(2-mercaptoethyl)sulfide and the like; and water and the like.

The reaction temperature of the compound represented by the above general formula (202) and the compound represented by the above general formula (203) is not particularly limited, and it is usually in the range of equal to or higher than −78 degrees centigrade and equal to or lower than 200 degrees centigrade and preferably equal to or higher than −78 degrees centigrade and equal to or lower than 100 degrees centigrade.

Furthermore, the reaction time is affected by the reaction temperature, and it is usually from several minutes to 100 hours.

In the reaction of the compound represented by the above general formula (202) with the compound represented by the above general formula (203), the amount of the compound represented by the above general formula (202) and the compound represented by the above general formula (203) used is not particularly limited. The amount of the compound represented by the above general formula (203) used is usually equal to or more than 0.01 moles and equal to or less than 100 moles, preferably equal to or more than 0.1 moles and equal to or less than 50 moles and more preferably equal to or more than 0.5 moles and equal to or less than 20 moles, based on 1 mole of the halogen atom contained in the compound represented by the above general formula (202).

When the reaction of the compound represented by the above general formula (202) with the compound represented by the above general formula (203) is carried out, it is preferable to use a basic compound as a capturing agent of the formed hydrogen halide in order to effectively carry out the reaction.

Examples of the basic compound include inorganic bases such as sodium hydroxide, potassium hydroxide, lithium hydroxide, sodium carbonate, potassium carbonate, lithium carbonate, sodium bicarbonate, potassium bicarbonate, lithium bicarbonate, magnesium hydroxide, calcium hydroxide and the like; and organic bases such as pyridine, triethylamine, dimethylaniline, diethylaniline, 1,8-diazabicyclo[5,4,0]-7-undecene and the like.

In the above general formula (201), the compound in which q is 1, r is 0 and Z is an oxygen atom can be obtained, for example, by adjusting to an alkaline value by adding an aqueous solution of sodium hydroxide to a mixture of the compound represented by the above general formula (203) and water, and then reacting by the addition of bismuth oxychloride. For example, to synthesize (3-thietanylthio)oxy bismuth (III), 3-mercaptothietane may be used as the compound represented by the above general formula (203).

Next, the polymerizable composition of the present invention will be described.

The polymerizable composition of the present invention contains at least one metal thietane compound. This polymerizable composition specifically contains the metal thietane compound represented by the above general formula (120). More specifically, the polymerizable composition of the present invention contains the metal thietane compound represented by the above general formula (110) or the above general formula (201), and further specifically, contains the metal thietane compound represented by the above general formula (100). The polymerizable composition is used, for example, as a material of an optical component.

Hereinafter, the polymerizable composition of the present invention containing the metal thietane compound represented by the above general formula (110) or the above general formula (201) will be exemplified.

The polymerizable composition of the present invention may contain one compound as the metal thietane compound represented by the above general formula (110), or may contain a plurality of different compounds. For example, it may contain a plurality of compounds in which metal atoms Ms are different as the metal thietane compound.

Furthermore, the polymerizable composition of the present invention may contain the metal thietane compound represented by the above general formula (110) and other metal thietane compounds. At this time, the polymerizable composition contains a compound in which M is Sb in the above general formula (110) as the metal thietane compound in the present invention, and further preferably contains a compound in which M is Zn or Sn in the above general formula (110) as other metal thietane compound.

As described below, the polymerizable composition of the present invention may contain a plurality of compounds in which metal atoms Ms are different and a thietane compound free from a metal atom in a molecular structure (a non-metal thietane compound).

Furthermore, the polymerizable composition of the present invention may contain one compound as the metal thietane compound represented by the above general formula (100), or may contain a plurality of different compounds.

Further, the polymerizable composition of the present invention may contain one compound as the thietane compound represented by the above general formula (201), or may contain a plurality of different compounds.

Meanwhile, the metal thietane compounds represented by the above general formula (110) and the above general formula (201) are all polymerizable compounds. Therefore, the polymerizable compound in the polymerizable composition of the present invention may be composed of the metal thietane compound represented by the above general formula (110). For example, the polymerizable compound in the polymerizable composition of the present invention may be composed of the metal thietane compound represented by the above general formula (100). Furthermore, the polymerizable compound in the polymerizable composition of the present invention may be composed of the thietane compound represented by the above general formula (201).

When the polymerizable compound in the polymerizable composition of the present invention contains the metal thietane compound represented by the above general formula (110), it may contain other polymerizable compounds in addition to the metal thietane compound represented by the above general formula (110). For example, the polymerizable compound in the polymerizable composition of the present invention may contain other polymerizable compounds in addition to the metal thietane compound represented by the above general formula (100).

The content of the compound represented by the above general formula (100) occupied in the total weight of the polymerizable compound contained in the polymerizable composition of the present invention is not particularly limited, and it is usually not less than 10 weight %, preferably not less than 30 weight %, more preferably not less than 50 weight % and further preferably not less than 70 weight % from the viewpoint of achieving a high refractive index.

Furthermore, since a component other than the compound represented by the above general formula (110) (for example, the above general formula (100)) causes reduction of the refractive index of the resin using the polymerizable composition in many cases, the content of the compound represented by the general formula (110) (for example, the above general formula (100)) occupied in the total weight of the polymerizable compound is preferably not less than 50 weight % from the viewpoint of obtaining a resin having a high refractive index.

When the polymerizable compound in the polymerizable composition of the present invention contains the thietane compound represented by the above general formula (201), it may contain other polymerizable compounds in addition to the thietane compound represented by the above general formula (201).

Examples of other polymerizable compounds include various polymerizable monomers or polymerizable oligomers known in the art. Examples thereof include a (meth)acrylic acid ester compound, a vinyl compound, an epoxy compound, an episulfide compound, an oxetane compound, a thietane compound and the like.

The content of the compound represented by the above general formula (201) occupied in the total weight of the polymerizable compound contained in the polymerizable composition of the present invention is not particularly limited, and is usually not less than 10 weight %, preferably not less than 30 weight %, more preferably not less than 50 weight % and further preferably not less than 70 weight % from the viewpoint of attaining a high refractive index.

Furthermore, since a component other than the compound represented by the general formula (201) causes reduction of the refractive index of the resin using the polymerizable composition in many cases, the content of the compound represented by the above general formula (201) occupied in the total weight of the polymerizable compound is preferably not less than 50 weight % from the viewpoint of obtaining a resin having a high refractive index.

Meanwhile, the polymerizable composition of the present invention may contain at least one of a thiol compound, an epoxy compound, an epithio compound or a thietane compound other than the metal thietane compound in the present invention among other polymerizable compounds. The thietane compound other than the metal thietane compound in present invention is specifically a non-metal thietane compound free from a metal atom in a molecular structure, and is a compound in which M in the above general formula (120) is a metal other than Bi, Sb, Ti, Zr and Ta.

Hereinafter, concrete examples of the thiol compound, the epoxy compound, the epithio compound and the non-metal thietane compound will each be described. Incidentally, in the following description, when the component of the polymerizable composition in the present invention has a plurality of functional groups, the priority of the functional groups is as follows.

(i) thiol group
(ii) epoxy group
(iii) epithio group
(iv) thietanyl group

For example, in the following, a compound having a thiol group and a thietanyl group will be described in the thiol compound item.

When the polymerizable composition contains the compound represented by the above general formula (110) (for example, the above general formula (100)) and the thiol compound, the epoxy compound, the epithio compound or the thietane compound, the mechanical properties and hue of the obtained resin can be much further improved in some cases.

Initially, the thiol compound will be described.

The thiol compound used for the polymerizable composition is a compound containing one or more thiol groups (SH groups) in a molecule.

When the polymerizable composition contains the compound represented by the above general formula (110), as the thiol compound, there can also be used any compound having a structure as long as it is compatible with, for example, the compound represented by the above general formula (110) (further specifically, the above general formula (100)).

Furthermore, when the polymerizable composition contains the compound represented by the above general formula (201), as the thiol compound, there can also be used any compound having a structure as long as it is compatible with, for example, the compound represented by the above general formula (201).

As the thiol compound, concrete examples of the monovalent thiol xz compound include aliphatic mercaptan compounds such as methyl mercaptan, ethyl mercaptan, propyl mercaptan, butyl mercaptan, octyl mercaptan, dodecyl mercaptan, tert-dodecyl mercaptan, hexadecyl mercaptan, octadecyl mercaptan, cyclohexyl mercaptan, benzyl mercaptan, ethylphenyl mercaptan, 2-mercaptomethyl-1,3-dithiolane, 2-mercaptomethyl-1,4-dithiane, 1-mercapto-2,3-epithiopropane, 1-mercaptomethylthio-2,3-epithiopropane, 1-mercaptoethylthio-2,3-epithiopropane, 3-mercaptothietane, 2-mercaptothietane, 3-mercaptomethylthiothietane, 2-mercaptomethylthiothietane, 3-mercaptoethylthiothietane, 2-mercaptoethylthiothietane and the like; aromatic mercaptan compounds such as thiophenol, mercaptotoluene and the like; and compounds each containing a hydroxy group in addition to the mercapto group such as 2-mercaptoethanol, 3-mercapto-1,2-propanediol and the like.

Furthermore, examples of the polyvalent thiol (polythiol) compound include aliphatic polythiol compounds such as 1,1-methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, thiomalic acid bis(2-mercaptoethyl ester), 2,3-dimercapto-1-propanol(2-mercaptoacetate), 2,3-dimercapto-1-propanol(3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), tetrakis(mercaptomethyl)methane, 1,1,1,1-tetrakis(mercaptomethyl)methane and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and the like;

aromatic polythiol compounds each containing a sulfur atom in addition to the mercapto group such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, and core alkylated compounds thereof;

aliphatic polythiol compounds each containing a sulfur atom in addition to the mercapto group such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-bis(mercaptomethyl)-1,4-dithiane, 2,5-dimercaptomethyl-2,5-dimethyl-1,4-dithiane, bis(mercaptomethyl)disulfide, bis(mercaptoethyl)disulfide, bis(mercaptopropyl)disulfide, 4-mercaptomethyl-1,8-dimercapto-3,6-dithiaoctane and the like, and thioglycolates and mercaptopropionates thereof;

aliphatic polythiol compounds each having an ester bond and a sulfur atom in addition to the mercapto group such as hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutylic acid bis(2-mercaptoethyl ester), dithiodiglycolic acid bis(2-mercaptoethyl ester), dithiodipropionic acid bis(2-mercaptoethyl ester), 4,4-dithiodibutylic acid bis(2-mercaptoethyl ester), thiodiglycolic acid bis(2,3-dimercaptopropyl ester), thiodipropionic acid bis(2,3-dimercaptopropyl ester), dithioglycolic acid bis(2,3-dimercaptopropyl ester), dithiodipropionic acid bis(2,3-dimercaptopropyl ester) and the like;

heterocyclic compounds each containing a sulfur atom in addition to the mercapto group such as 3,4-thiophenedithiol, 2,5-dimercapto-1,3,4-thiadiazole and the like;

compounds each having a hydroxy group in addition to the mercapto group such as glycerine di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), dipentaerythritol pentakis(3-mercaptopropionate), hydroxymethyl-tris(mercaptoethylthiomethyl)methane, 1-hydroxyethylthio-3-mercaptoethylthiobenzene and the like;

compounds having dithioacetal or dithioketal skeleton such as 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,2-bis(mercaptomethyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 4,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithietane, 1,1,9,9-tetrakis(mercaptomethylthio)-5-(3,3-bis(mercaptomethylthio)-1-thiapropyl)3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-{bis(mercaptomethylthio)methyl}-3,4,12,13-tetrakis(mercaptomethylthio)-1,15-dimercapto-2,5,7,9,11,14-hexathiapentadecane, 4,6-bis{3,5-bis(mercaptomethylthio)-7-mercapto-2,6-dithiaheptylthio}-1,3-dithiane, 4-{3,5-bis(mercaptomethylthio)-7-mercapto-2,6-dithiaheptylthio}-6-mercaptomethylthio-1,3-dithiane, 1,1-bis{4-(6-mercaptomethylthio)-1,3-dithianylthio}-3,3-bis(mercaptomethylthio)propane, 1,3-bis{4-(6-mercaptomethylthio)-1,3-dithianylthio}-1,3-bis(mercaptomethylthio)propane, 1-{4-(6-mercaptomethylthio)-1,3-dithianylthio}-3-{2,2-bis(mercaptomethylthio)ethyl}-7,9-bis(mercaptomethylthio)-2,4,6,10-tetrathiaundecane, 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-dithietanyl)}methyl-2,4-dithiapentane, 4,6-bis[3-{2-(1,3-dithietanyl)}methyl-5-mercapto-2,4-dithiapentylthio]-1,3-dithiane, 4,6-bis{4-(6-mercaptomethylthio)-1,3-dithianylthio}-1,3-dithiane, 4-{4-(6-mercaptomethylthio)-1,3-dithianylthio}-6-{4-(6-mercaptomethylthio)-1,3-dithianylthio}-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl)}methyl-1,9-dimercapto-2,4,6,8-tetrathianonane, 4-{3,4,8, 9-tetrakis(mercaptomethylthio)-11-mercapto-2,5,7,10-tetrathiaundecyl}-5-mercaptomethylthio-1,3-dithiolane, 4,5-bis{3,4-bis(mercaptomethylthio)-6-mercapto-2,5-dithiahexylthio}-1,3-dithiolane, 4-{3,4-bis(mercaptomethylthio)-6-mercapto-2,5-dithiahexylthio}-5-mercaptomethylthio-1,3-dithiolane, 4-{3-bis(mercaptomethylthio)methyl-5,6-bis(mercaptomethylthio)-8-mercapto-2,4,7-trithiaoctyl}-5-mercaptomethylthio-1,3-dithiolane, 2-[bis{3,4-bis(mercaptomethylthio)-6-mercapto-2,5-dithiahexylthio}methyl]-1,3-dithietane, 2-{3,4-bis(mercaptomethylthio)-6-mercapto-2,5-dithiahexylthio}mercaptomethylthiomethyl-1,3-dithietane, 2-{3,4,8,9-tetrakis(mercaptomethylthio)-11-mercapto-2,5,7,10-tetrathiaundecylthio}mercaptomethylthiomethyl-1,3-dithietane, 2-{3-bis(mercaptomethylthio)methyl-5,6-bis(mercaptomethylthio)-8-mercapto-2,4,7-trithiaoctyl}mercaptomethylthiomethyl-1,3-dithietane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 2-[bis{4-(5-mercaptomethylthio-1,3-dithioranyl)thio}]methyl-1,3-dithietane, 4-{4-(5-mercaptomethylthio-1,3-dithioranyl)thio}-5-[1-{2-(1,3-dithietanyl)}-3-mercapto-2-thiapropylthio]-1,3-dithiolane, and their oligomer and the like;

compounds having trithioorthoformamte ester skeleton such as tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl](mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-1-thiaethyl]methane, tris[3,3-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane and their oligomer, and the like; and compounds each having tetrathioorthocarbonate ester skeleton such as 3,3'-di(mercaptomethylthio)-1,5-dimercapto-2,4-dithiapentane, 2,2'-di(mercaptomethylthio)-1,3-dithiacyclopentane, 2,7-di(mercaptomethyl)-1,4,5,9-tetrathiaspiro[4,4]nonane, 3,9-dimercapto-1,5,7,11-tetrathiaspiro[5,5]undecane, and their oligomer and the like, but are not restricted to these exemplified compounds alone. These exemplified compounds may be used singly or two or more compounds may be used in combination.

Of these thiol compounds, in consideration of the optical properties, particularly Abbe's number, of the obtained resin, it is preferable to select an aliphatic thiol compound rather than an aromatic thiol compound. Furthermore, in consideration of requirements of optical properties, particularly refractive index, it is much further preferable to select a compound having a sulfur group in addition to the thiol group such as a sulfide bond and/or a disulfide bond. From the viewpoint of enhancement of 3-dimensional crosslinkability considering the heat resistance of the obtained resin, it is particularly preferable to select one or more thiol compounds having a polymerizable group such as an epithio group, a thietanyl group or the like, or one or more compounds having three or more thiol groups.

From the above viewpoint, preferable examples of thiol include 3-mercaptothietane, 1-mercapto-2,3-epithiopropane, 1-mercaptomethylthio-2,3-epithiopropane, 1-mercaptoethylthio-2,3-epithiopropane, 3-mercaptothietane, 2-mercaptothietane, 3-mercaptomethylthiothietane, 2-mercaptomethylthiothietane, 3-mercaptoethylthiothietane, 2-mercaptoethylthiothietane, 2,5-bis(mercaptomethyl)-1,4-dithiane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptomethylthio)ethyl)-1,3-dithietane.

Further preferable examples thereof include 3-mercaptothietane, 4-mercaptomethyl-1,8-dimercapto-3,6-dithiaoctane, 2,5-bis(mercaptomethyl)-1,4-dithiane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptomethylthio)ethyl)-1,3-dithietane. Furthermore, when a divalent thiol compound is selected, it is preferable that a thiol compound having a polymerizable group and/or a tri- or higher valent thiol compound are mixed together prior to use.

When the polymerizable composition contains the compound represented by the above general formula (110), the thiol compound is further specifically one or more compounds selected from the group consisting of 3-mercaptothietane, 1,2-ethanedithiol, 4-mercaptomethyl-1,8-dimercapto-3,6-dithiaoctane, 4,8-dimercaptomethyl-1,11-dimercapto-3,6,9-trithiaundecane and 2,5-bis(mercaptomethyl)-1,4-dithiane.

When the total amount of the compound represented by the above general formula (110) (for example, the above general formula (100)) and the thiol compound is 100 weight parts, and the amount of the thiol compound used is excessively low, effects of improvement of hue and enhancement of mechanical strength are small in some cases; therefore, it is not preferable. Furthermore, when the total amount of the compound represented by the above general formula (110) (for example, the above general formula (100)) and the thiol compound is 100 weight parts, and the amount of the thiol compound used is excessively high, the heat resistance is remarkably lowered in some cases; therefore, it is not preferable.

Accordingly, when the total amount of the compound represented by the above general formula (110) (for example, the above general formula (100)) and the thiol compound is 100 weight parts, the amount of the thiol compound used is preferably equal to or more than 1 weight part and equal to or less than 50 weight parts. When the total amount of the compound represented by the above general formula (110) (for example, the above general formula (100)) and the thiol compound is 100 weight parts, the amount of the thiol compound used is more preferably from 1 weight part and equal to or less than 25 weight parts.

Meanwhile, when the polymerizable composition contains the compound represented by the above general formula (201), the thiol compound is further specifically one or more compounds selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane and 2,5-bis(mercaptomethyl)-1,4-dithiane.

When the total amount of the compound represented by the above general formula (201) and the thiol compound is 100 weight parts, and the amount of the thiol compound used is excessively small, effects of improvement of hue and enhancement of mechanical strength are small in some cases; therefore, it is not preferable. Furthermore, when the total amount of the compound represented by the above general formula (201) and the thiol compound is 100 weight parts, and the amount of the thiol compound used is excessively high, the heat resistance is remarkably lowered in some cases; therefore, it is not preferable.

Accordingly, when the total amount of the compound represented by the above general formula (201) and the thiol compound is 100 weight parts, the amount of the thiol compound used is preferably equal to or more than 1 weight part and equal to or less than 50 weight parts. When the total amount of the compound represented by the above general formula (201) and the thiol compound is 100 weight parts, the amount of the thiol compound used is more preferably equal to or more than 1 weight part and equal to or less than 25 weight parts.

When the polymerizable composition contains the compound represented by the above general formula (201) and the thiol compound, the mechanical properties and hue of the obtained resin can be much further improved.

In the polymerizable composition, an isocyanate compound may be further combined in addition to the thiol compound. By adding the isocyanate compound, the mechanical properties or the like are further improved in some cases.

The isocyanate compound to be used herein is not particularly limited, and it is preferably a polyisocyanate compound having a plurality of isocyanate groups, and further preferably a diisocyanate compound. Concrete suitable examples thereof include hexamethylene diisocyanate, bis(isocyanatomethyl)cyclohexane, xylene diisocyanate, dicyclohexylmethane diisocyanate, toluene diisocyanate, 2,5-bis(isocyanatomethyl)bicyclo-[2,2,1]-heptane, 2,6-bis(isocyanatomethyl)bicyclo-[2,2,1]-heptane, isophorone diisocyanate and the like.

Further, a reactant obtained by reacting the thiol compound and the isocyanate compound in advance may be added to the polymerization product.

Hereinafter, the epoxy compound and the epithio compound will be described.

The polymerizable composition of the present invention may contain an epoxy compound and/or an epithio compound. At this time, in the compound represented by the above general formula (110), m may be 0 and $X_1$ may be a sulfur atom. Furthermore, in the compound represented by the above general formula (100), m may be 0 and $X_1$ may be a sulfur atom.

The epoxy compound and the epithio compound, respectively, contain one or more epoxy groups and one or more epithio groups in a molecule. The epoxy compound and the epithio compound may be used for any compound having a structure as long as it is compatible with, for example, the compound represented by the above general formula (110) (specifically, the above general formula (100)), and is preferably a compound containing two or more epoxy groups and/or epithio groups in total.

Concrete examples of the epoxy compound include phenolic epoxy compounds each obtained by a condensation reaction of an epihalohydrin compound and a polyvalent phenol compound such as bisphenol A, bisphenol F or the like (for example, bisphenol A glycidyl ether, bisphenol F glycidyl ether); alcoholic epoxy compounds each obtained by condensation of an epihalohydrin compound and a polyvalent alcohol compound such as hydrogenated bisphenol A, hydrogenated bisphenol F, cyclohexane dimethanol or the like (for example, hydrogenated bisphenol A glycidyl ether, hydrogenated bisphenol F glycidyl ether), and other alcoholic epoxy compounds such as ethylene glycol diglycidyl ether, neopentyl glycol diglycidyl ether, 1,4-cyclohexane dimethanol diglycidyl ether, trimethylolpropane triglycidyl ether or the like; glycidyl ester type epoxy compounds such as 3,4-epoxycyclohexylmethyl-3',4'-epoxycyclohexane carboxylate, 1,2-hexahydrophthalic acid diglycidyl ester or the like; and amine type epoxy compounds each obtained by condensation of an epihalohydrin compound and primary and secondary amine compounds (for example, triglycidyl ether isocyanurate). In addition, further examples include aliphatic polyvalent epoxy compounds such as vinylcyclohexene diepoxide including 4-vinyl-1-cyclohexane diepoxide and the like.

Concrete examples of the sulfide group-containing epoxy compound and the ether group-containing epoxy compound include chained aliphatic 2,3-epoxypropylthio compounds such as bis(2,3-epoxypropyl)sulfide, bis(2,3-epoxypropyl) disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)propane, 2,2-bis(2,3-epoxypropylthiomethyl)-1-(2,3-epoxypropylthio)butane, 1,5-bis(2,3-epoxypropylthio)-2-(2,3-epoxypropylthiomethyl)-3-thiapentane, 1,5-bis(2,3-epoxypropylthio)-2,4-bis(2,3-epoxypropylthiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxypropylthiomethyl)-3,6-dithiaoctane, 1,1,1-tris[[2-(2,3-epoxypropylthio)ethyl]thiomethyl]-2-(2,3-epoxypropylthio)ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, 1,11-bis(2,3-epoxypropylthio)-5,7-bis(2,3-epoxypropylthiomethyl)-3,6,9-trithiaundecane and the like;

cyclic aliphatic 2,3-epoxypropylthio compounds such as 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, 2,5-bis(2,3-epoxypropylthiomethyl)-2,5-dimethyl-1,4-dithiane, 3-(2,3-epoxypropylthio)thietane and the like;

aromatic 2,3-epoxypropylthio compounds such as 1,2-bis(2,3-epoxypropylthio)benzene, 1,3-bis(2,3-epoxypropylthio)benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl]methane, 2,2-bis[4-(2,3-epoxypropylthio)phenyl]propane, bis[4-(2,3-epoxypropylthio)phenyl]sulfide, bis[4-(2,3-epoxypropylthio)phenyl]sulfone, 4,4'-bis(2,3-epoxypropylthio)biphenyl and the like;

monofunctional epoxy compounds such as ethylene oxide, propylene oxide, glycidol, epichlorohydrin and the like;

chained aliphatic 2,3-epoxypropyloxy compounds such as bis(2,3-epoxypropyl)ether, bis(2,3-epoxypropyloxy)methane, 1,2-bis(2,3-epoxypropyloxy)ethane, 1,2-bis(2,3-epoxypropyloxy)propane, 1,3-bis(2,3-epoxypropyloxy)propane, 1,3-bis(2,3-epoxypropyloxy)-2-methylpropane, 1,4-bis(2,3-epoxypropyloxy)butane, 1,4-bis(2,3-epoxypropyloxy)-2-methylbutane, 1,3-bis(2,3-epoxypropyloxy)butane, 1,5-bis(2,3-epoxypropyloxy)pentane, 1,5-bis(2,3-epoxypropyloxy)-2-methylpentane, 1,5-bis(2,3-epoxypropyloxy)-3-thiapentane, 1,6-bis(2,3-epoxypropyloxy)hexane, 1,6-bis(2,3-epoxypropyloxy)-2-methylhexane, 3,8-bis(2,3-epoxypropyloxy)-3,6-dithiaoctane, 1,2,3-tris(2,3-epoxypropyloxy)propane, 2,2-bis(2,3-epoxypropyloxy)-1,3-bis(2,3-epoxypropyloxymethyl)propane, 2,2-bis(2,3-epoxypropyloxymethyl)-1-(2,3-epoxypropyloxy)butane, 1,5-bis(2,3-epoxypropyloxy)-2-(2,3-epoxypropyloxymethyl)-3-thiapentane, 1,5-bis(2,3-epoxypropyloxy)-2,4-bis(2,3-epoxypropyloxymethyl)-3-thiapentane, 1-(2,3-epoxypropyloxy)-2,2-bis(2,3-epoxypropyloxymethyl)-4-thiahexane, 1,5,6-tris(2,3-epoxypropyloxy)-4-(2,3-epoxypropyloxymethyl)-3-thiahexane, 1,8-bis(2,3-epoxypropyloxy)-4-(2,3-epoxypropyloxymethyl)-3,6-dithiaoctane, 1,8-bis(2,3-epoxypropyloxy)-4,5-bis(2,3-epoxypropyloxymethyl)-3,6-dithiaoctane, 1,8-bis(2,3-epoxypropyloxy)-4,4-bis(2,3-epoxypropyloxymethyl)-3,6-dithiaoctane, 1,8-bis(2,3-epoxypropyloxy)-2,5-bis(2,3-epoxypropyloxymethyl)-3,6-dithiaoctane, 1,8-bis(2,3-epoxypropyloxy)-2,4,5-tris(2,3-epoxypropyloxymethyl)-3,6-dithiaoctane, 1,1,1-tris[[2-(2,3-epoxypropyloxy)ethyl]thiomethyl]-2-(2,3-epoxypropyloxy)ethane, 1,1,2,2-tetrakis[[2-(2,3-epoxypropyloxy)ethyl]thiomethyl]ethane, 1,11-bis(2,3-epoxypropyloxy)-4,8-bis(2,3-epoxypropyloxymethyl)-3,6,9-trithiaundecane, 1,11-bis(2,3-epoxypropyloxy)-4,7-bis(2,3-epoxypropyloxymethyl)-3,6,9-trithiaundecane, 1,11-bis(2,3-epoxypropyloxy)-5,7-bis(2,3-epoxypropyloxymethyl)-3,6,9-trithiaundecane and the like;

cyclic aliphatic 2,3-epoxypropyloxy compounds such as 1,3-bis(2,3-epoxypropyloxy)cyclohexane, 1,4-bis(2,3-epoxypropyloxy)cyclohexane, 1,3-bis(2,3-epoxypropyloxymethyl)cyclohexane, 1,4-bis(2,3-epoxypropyloxymethyl)cyclohexane, 2,5-bis(2,3-epoxypropyloxymethyl)-1,4-dithiane, 2,5-bis[[2-(2,3-epoxypropyloxy)ethyl]thiomethyl]-1,4-dithiane, 2,5-bis(2,3-epoxypropyloxymethyl)-2,5-dimethyl-1,4-dithiane and the like; and aromatic 2,3-epoxypropyloxy compounds such as 1,2-bis(2,3-epoxypropyloxy)benzene, 1,3-bis(2,3-epoxypropyloxy)benzene, 1,4-bis(2,3-epoxypropyloxy)benzene, 1,2-bis(2,3-epoxypropyloxymethyl)benzene, 1,3-bis(2,3-epoxypropyloxymethyl)benzene, 1,4-bis(2,3-epoxypropyloxymethyl)benzene, bis[4-(2,3-epoxypropyloxy)phenyl]methane, 2,2-bis[4-(2,3-epoxypropyloxy)phenyl]propane, bis[4-(2,3-epoxypropyloxy)phenyl]sulfide, bis[4-(2,3-epoxypropyloxy)phenyl]sulfone, 4,4'-bis(2,3-epoxypropyloxy)biphenyl and the like, but are not restricted to these exemplified compounds alone.

Of these exemplified epoxy compounds, preferable examples include phenolic epoxy compounds such as bis(2,3-epoxypropyl)disulfide, 4-vinyl-1-cyclohexane diepoxide, bisphenol A glycidyl ether, bisphenol F glycidyl ether and the like;

alcoholic epoxy compounds such as hydrogenated bisphenol A glycidyl ether, hydrogenated bisphenol F glycidyl ether, ethylene glycol diglycidyl ether, neopentyl glycol diglycidyl ether, 1,4-cyclohexane dimethanol diglycidyl ether, trimethylolpropane triglycidyl ether and the like;

glycidyl ester type epoxy compounds such as 3,4-epoxycyclohexylmethyl-3',4'-epoxycyclohexane carboxylate, 1,2-hexahydrophthalic acid diglycidyl ester and the like; and amine type epoxy compounds such as triglycidyl ether isocyanurate and the like. In addition, other preferable examples include aliphatic polyvalent epoxy compounds such as vinylcyclohexene diepoxide and the like.

The epoxy compound is more preferably bis(2,3-epoxypropyl)disulfide, 1,4-cyclohexane dimethanol diglycidyl ether, bisphenol A glycidyl ether, bisphenol F glycidyl ether, ethylene glycol diglycidyl ether, neopentyl glycol diglycidyl ether, trimethylolpropane triglycidyl ether and triglycidyl ether isocyanurate, and further preferably 1,4-cyclohexane dimethanol diglycidyl ether and bisphenol F glycidyl ether.

Concrete examples of the epithio compound include epithioethylthio compounds such as bis(1,2-epithioethyl)sulfide, bis(1,2-epithioethyl)disulfide, bis(epithioethylthio)methane, bis(epithioethylthio)benzene, bis[4-(epithioethylthio)phenyl]sulfide, bis[4-(epithioethylthio)phenyl]methane and the like;

chained aliphatic 2,3-epithiopropylthio compounds such as bis(2,3-epithiopropyl)sulfide, bis(2,3-epithiopropyl)disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 3,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-

3,6-dithiaoctane, 1,1,1-tris[[2-(2,3-epithiopropylthio)ethyl]thiomethyl]-2-(2,3-epithiopropylthio)ethane, 1,1,2,2-tetrakis[[2-(2,3-epithiopropylthio)ethyl]thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, 1,11-bis(2,3-epithiopropylthio)-5,7-bis(2,3-epithiopropylthiomethyl)-3,6,9-trithiaundecane and the like;

cyclic aliphatic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis[[2-(2,3-epithiopropylthio)ethyl]thiomethyl]-1,4-dithiane, 2,5-bis(2,3-epithiopropylthiomethyl)-2,5-dimethyl-1,4-dithiane and the like;

aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl]sulfide, bis[4-(2,3-epithiopropylthio)phenyl]sulfone, 4,4'-bis(2,3-epithiopropylthio)biphenyl and the like;

compounds each having one epithio group such as ethylene sulfide, propylene sulfide, mercaptopropylene sulfide, mercaptobutene sulfide, epithiochlorohydrin and the like;

chained aliphatic 2,3-epithiopropyloxy compounds such as bis(2,3-epithiopropyl)ether, bis(2,3-epithiopropyloxy)methane, 1,2-bis(2,3-epithiopropyloxy)ethane, 1,2-bis(2,3-epithiopropyloxy)propane, 1,3-bis(2,3-epithiopropyloxy)propane, 1,3-bis(2,3-epithiopropyloxy)-2-methylpropane, 1,4-bis(2,3-epithiopropyloxy)butane, 1,4-bis(2,3-epithiopropyloxy)-2-methylbutane, 1,3-bis(2,3-epithiopropyloxy)butane, 1,5-bis(2,3-epithiopropyloxy)pentane, 1,5-bis(2,3-epithiopropyloxy)-2-methylpentane, 1,5-bis(2,3-epithiopropyloxy)-3-thiapentane, 1,6-bis(2,3-epithiopropyloxy)hexane, 1,6-bis(2,3-epithiopropyloxy)-2-methylhexane, 3,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithiopropyloxymethyl)propane, 2,2-bis(2,3-epithiopropyloxymethyl)-1-(2,3-epithiopropyloxy)butane, 1,5-bis(2,3-epithiopropyloxy)-2-(2,3-epithiopropyloxymethyl)-3-thiapentane, 1,5-bis(2,3-epithiopropyloxy)-2,4-bis(2,3-epithiopropyloxymethyl)-3-thiapentane, 1-(2,3-epithiopropyloxy)-2,2-bis(2,3-epithiopropyloxymethyl)-4-thiahexane, 1,5,6-tris(2,3-epithiopropyloxy)-4-(2,3-epithiopropyloxymethyl)-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymethyl)-3,6-dithiaoctane, 1,8-bis(2,3-epithiopropyloxy)-4,4-bis(2,3-epithiopropyloxymethyl)-3,6-dithiaoctane, 1,8-bis(2,3-epithiopropyloxy)-2,5-bis(2,3-epithiopropyloxymethyl)-3,6-dithiaoctane, 1,8-bis(2,3-epithiopropyloxy)-2,4,5-tris(2,3-epithiopropyloxymethyl)-3,6-dithiaoctane, 1,1,1-tris[[2-(2,3-epithiopropyloxy)ethyl]thiomethyl]-2-(2,3-epithiopropyloxy)ethane, 1,1,2,2-tetrakis[[2-(2,3-epithiopropyloxy)ethyl]thiomethyl]ethane, 1,11-bis(2,3-epithiopropyloxy)-4,8-bis(2,3-epithiopropyloxymethyl)-3,6,9-trithiaundecane, 1,11-bis(2,3-epithiopropyloxy)-4,7-bis(2,3-epithiopropyloxymethyl)-3,6,9-trithiaundecane, 1,11-bis(2,3-epithiopropyloxy)-5,7-bis(2,3-epithiopropyloxymethyl)-3,6,9-trithiaundecane and the like;

cyclic aliphatic 2,3-epithiopropyloxy compounds such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, 2,5-bis[[2-(2,3-epithiopropyloxy)ethyl]thiomethyl]-1,4-dithiane, 2,5-bis(2,3-epithiopropyloxymethyl)-2,5-dimethyl-1,4-dithiane and the like; and aromatic 2,3-epithiopropyloxy compounds such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis[4-(2,3-epithiopropyloxy)phenyl]methane, 2,2-bis[4-(2,3-epithiopropyloxy)phenyl]propane, bis[4-(2,3-epithiopropyloxy)phenyl]sulfide, bis[4-(2,3-epithiopropyloxy)phenyl]sulfone, 4,4'-bis(2,3-epithiopropyloxy)biphenyl and the like, but are not restricted to these exemplified compounds alone.

Of these exemplified compounds, preferable compounds are bis(1,2-epithioethyl)sulfide, bis(1,2-epithioethyl)disulfide, bis(2,3-epithiopropyl)sulfide, bis(2,3-epithiopropylthio)methane and bis(2,3-epithiopropyl)disulfide, and more preferable compounds are bis(1,2-epithioethyl)sulfide, bis(1,2-epithioethyl)disulfide, bis(2,3-epithiopropyl)sulfide and bis(2,3-epithiopropyl)disulfide. Further more preferable compounds are bis(2,3-epithiopropyl)sulfide and bis(2,3-epithiopropyl)disulfide.

The amount of the epoxy compound and/or the epithio compound used is different depending on the structure or the amount of the compound in use. In consideration of the refractive index of the obtained resin, it is preferably not more than 25 weight %, based on the total amount of the polymerizable composition of the present invention. It is more preferably not more than 23 weight % and further preferably not more than 20 weight %. In consideration of the hue and mechanical strength of the obtained resin, it is preferably not less than 2.5 weight %.

Either or both of the epoxy compound and/or the epithio compound may be used, and the amount ratio is not particularly limited.

Furthermore, different epoxy compounds as epoxy compounds, or different epithio compounds as epithio compounds can also be used together. However, in order to obtain a resin having a high refractive index, it is preferable to use epithio compounds.

When the polymerizable composition further contains the epoxy compound and/or the epithio compound, the content of the compound represented by the above general formula (110) (for example, the above general formula (100)) occupied in the total weight of the polymerizable compound contained in the polymerizable composition of the present invention is not particularly limited, and is usually not less than 10 weight %. Furthermore, as the content of the compound represented by the above general formula (110) (for example, the above general formula (100)) increases, a high refractive index material tends to be obtained. From this viewpoint, the content is preferably not less than 30 weight %, more preferably not less than 50 weight % and further preferably not less than 70 weight %.

However, when the content of the compound represented by the above general formula (110) (for example, the above general formula (100)) is excessively high, the content of the thiol compound and the epoxy compound and/or the epithio compound is relatively lowered. Thus, from the viewpoints of improvement of the hue of the resin and suppression of reduction of mechanical strength of the resin, the content of the compound represented by the above general formula (110) (for example, the above general formula (100)) in the polymerizable composition is preferably not more than 95 weight %.

Furthermore, when the thiol compound and the epoxy compound and/or the epithio compound are used together, the amount of the thiol compound used is different depending on the structure of the compound in use, and the structure and amount of use of the epoxy compound and/or the epithio compound. But, the compound represented by the above general formula (110) (for example, the above general formula (100)) provides a resin having a high refractive index so that addition of the thiol compound generally means the decrease of the refractive index of the obtained resin. Accordingly, in consideration of the refractive index of the obtained resin, the amount of the thiol compound is preferably not more than 35 weight %, more preferably not more than 30 weight % and further preferably not more than 25 weight %, based on the total polymerizable composition of the present invention. In consideration of the hue and mechanical strength of the obtained resin, it is preferably not less than 2.5 weight %.

Meanwhile, when the thiol compound and the epoxy compound and/or the epithio compound are used together, as the amount ratio of the thiol compound to the epoxy compound and/or the epithio compound used, the functional group ratio of the thiol group in the thiol compound to the epoxy group in the epoxy compound and/or the epithio group in the epithio compound (SH group/(epoxy group+epithio group)) is preferably not less than 0.7 from the viewpoint of resin hue. It is further preferably equal to or higher than 0.9 and equal to or lower than 5 and more preferably equal to or higher than 0.9 and equal to or lower than 3. When the functional group ratio is excessively small, the mechanical strength of the obtained resin is lowered in some cases; therefore, it is not preferable. When it is excessively high, the heat resistance of the obtained resin is lowered in some cases; therefore, it is not preferable.

Hereinafter, the non-metal thietane compound will be described.

The non-metal thietane compound contains one or more thietanyl groups in a molecule. Furthermore, as the non-metal thietane compound, there can be used any compound having a structure as long as it is compatible with, for example, the compound represented by the above general formula (100) or the above general formula (110), and preferably a compound containing two or more thietanyl groups in total.

Concrete examples of the thietane compound include sulfide type thietane compounds such as bisthietanyl sulfide, bis(thietanylthio)methane, 3-(((thietanylthio)methylthio) methylthio)thietane and the like; and polysulfide type thietane compounds such as bisthietanyl disulfide, bisthietanyl trisulfide, bisthietanyl tetrasulfide, bisthietanyl pentasulfide and the like.

Furthermore, as the non-metal thietane compound, a compound represented by the following general formula (130) (1,3-bis(thietanylthio)-2-propanol) may be used.

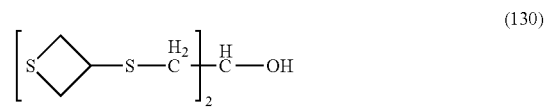

(130)

Further, at this time, the polymerizable composition may contain a metal thietane compound represented by the following formula (4) as the compound represented by the above general formula (120) or (110), or may contain a compound represented by the following formula (12) as other metal thietane compound. The compound represented by the above formula (130) is combined with the compound represented by the above general formula (120) (for example, the compound represented by the following formula (4)), whereby a resin obtained by polymerizing the polymerizable composition can be constructed such that it is further excellent in a balance of high refractive index, mechanical strength and heat resistance.

(4)

(12)

The amount of the non-metal thietane compound used is different depending on the structure or the amount of the compound in use, but in consideration of the refractive index of the obtained resin, it is, for example, not more than 25 weight %, preferably not more than 23 weight % and more preferably not more than 20 weight %, based on the total polymerizable composition of the present invention. On the other hand, in consideration of the hue and mechanical strength of the obtained resin, the amount of the non-metal thietane compound used is, for example, not less than 2.5 weight %.

Furthermore, the polymerizable composition in the present invention may contain the metal thietane compound represented by the above general formula (100) and other metal thietane compounds. Concrete examples of other metal thietane compounds include alkyl(thietanylthio)tin such as methylthio tris(thietanylthio)tin, ethylthio tris(thietanylthio)tin, propylthio tris(thietanylthio)tin, isopropylthio tris(thietanylthio)tin and the like;

bis(alkylthio)bis(thietanylthio)tin such as bis(methylthio)bis(thietanylthio)tin, bis(ethylthio)bis(thietanylthio)tin, bis(propylthio)bis(thietanylthio)tin, bis(isopropylthio)bis(thietanylthio)tin and the like;

alkylthio(alkylthio)bis(thietanylthio)tin such as ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin, isopropylthio(propylthio)bis(thietanylthio)tin and the like;

bis(thietanylthio) cyclic dithiotin compounds such as bis(thietanylthio)dithiastannetane, bis(thietanylthio)dithiastannolane, bis(thietanylthio)dithiastanninane, bis(thietanylthio)trithiastannocane and the like;

alkyltin compounds such as methyltris(thietanylthio)tin, dimethylbis(thietanylthio)tin, butyltris(thietanylthio)tin and the like; and metal thietane compounds such as tetrakis(thietanylthio)tin, tetrakis(thietanylthio)germanium, tris(thietanylthio)bismuth and the like.

Of these exemplified compounds, it is preferable to select one or more compounds selected from the group consisting of bisthietanyl disulfide, bisthietanyl tetrasulfide, bis(thietanylthio)methane, 3-(((thietanylthio)methylthio)methylthio)thietane, tetrakis(thietanylthio)tin, tris(thietanylthio)bismuth and bis(thietanylthio)dithiastannolane.

Further, of these exemplified compounds, preferable examples of the compound include bisthietanyl sulfide, bis(thietanylthio)methane, bis(thietanyl)disulfide, bisthietanyl tetrasulfide, bis(thietanylthio)dithiastannolane and tetrakis(thietanylthio)tin, and more preferable examples of the compound include bisthietanyl disulfide, bis(thietanylthio)dithiastannolane and tetrakis(thietanylthio)tin.

Further, when the polymerizable composition contains the compound represented by the above general formula (110), a concrete example of combination with other polymerizable compounds includes a combination in which the thiol compound is one or more compounds selected from the group consisting of 3-mercaptothietane, 1,2-ethanedithiol, 4-mercaptomethyl-1,8-dimercapto-3,6-dithiaoctane, 4,8-dimercaptomethyl-1,11-dimercapto-3,6,9-trithiaundecane and 2,5-bis(mercaptomethyl)-1,4-dithiane, the epoxy compound is one or more compounds selected from the group consisting of bis(2,3-epoxypropyl)disulfide, ethylene glycol diglycidyl ether, triglycidyl ether isocyanurate, neopentyl glycol diglycidyl ether, 1,4-cyclohexane dimethanol diglycidyl ether, trimethylolpropane triglycidyl ether, bisphenol F diglycidyl ether, bisphenol A diglycidyl ether and 3,4-epoxycyclohexylmethyl-3',4'-epoxycyclohexane carboxylate, the epithio compound is one or more compounds selected from the group consisting of bis(2,3-epithiopropyl)sulfide and bis(2,3-epithiopropyl)disulfide, and the non-metal thietane compound is one or more compounds selected from the group consisting of bisthietanyl disulfide, bisthietanyl tetrasulfide, bis(thietanylthio)methane and 3-(((thietanylthio)methylthio)methylthio)thietane. Further, at this time, the polymerizable composition may contain tetrakis(thietanylthio)tin, tris(thietanylthio)bismuth or bis(thietanylthio)dithiastannolane.

In the polymerizable composition, as the content of the thiol compound, the epoxy compound, the epithio compound and the non-metal thietane compound based on the compound represented by the above general formula (110), it is preferable that the content of the epoxidized product is small while the content of the thiol compound, the epithio compound and the thietane compound is high in some cases from the viewpoint of the refractive index. From the viewpoint of resin hue, the content of the thiol compound is preferably high in some cases.

In the polymerizable composition, the total amount of the thiol compound, the epoxy compound, the epithio compound and the non-metal thietane compound is, for example, equal to or greater than 1 and equal to or smaller than 50 weight parts based on the total 100 weight parts of the compound represented by the above general formula (110), the thiol compound, the epoxy compound, the epithio compound and the non-metal thietane compound.

Meanwhile, examples of other polymerizable compounds contained in the polymerizable composition in the present invention include various known polymerizable monomers or polymerizable oligomers, for example, (meth)acrylic acid ester compounds, vinyl compounds, oxetane compounds and the like.

Furthermore, the polymerizable composition of the present invention may further contain, if necessary, a known or used polymerization catalyst in order to control the polymerization rate.

Furthermore, the polymerizable composition of the present invention may contain, if necessary, a bluing agent. The bluing agent has an absorption band in an orange-yellow wavelength range of the visible light region, and has a function of adjusting the hue of the resin. The bluing agent further specifically contains a substance exhibiting colors from blue to violet.

The bluing agent used for the polymerizable composition of the present invention is not particularly limited, and concrete examples thereof include a dye, a fluorescent whitening agent, a fluorescent pigment, an inorganic pigment and the like. The bluing agent is suitably selected from those which can be used as a bluing agent according to the physical properties required for a lens, the hue of the resin or the like. These bluing agents may be used singly or in combination of two or more kinds.

Of these bluing agents, a dye is preferred from the viewpoints of the solubility into the polymerizable composition and the transparency of the obtained resin. Of dyes, preferably used is a dye containing one or two or more dyes selected from blue based dyes and violet based dyes, but it may be mixed with other color based dyes depending on the situation. For example, gray, brown, red and orange based dyes can also be used in addition to the blue and violet based dyes. Concrete examples of such combination of the bluing agent include a combination of a blue based dye with a red based dye, a combination of a violet based dye with a red based dye, and the like.

From the viewpoint of the absorption wavelength, the wavelength of maximum absorption of the dye is preferably equal to or longer than 520 nm and equal to or shorter than 600 nm and further preferably equal to or longer than 540 nm and equal to or shorter than 580 nm.

From the viewpoint of the structure of the compound, an anthraquinone based dye is preferable.

Concrete examples of the dye include PS Blue RR, PS Violet RC, PET Blue 2000, PS Brilliant Red HEY, MLP RED V-1 (product names each manufactured by DyStar Japan Ltd.) and the like.

The amount of the bluing agent used is different depending on the kind of monomer, existence of various additives to be used, the kind and amount of additives in use, the polymerization method or polymerization conditions. The amount is generally equal to or more than 0.001 ppm and equal to or less than 500 ppm, preferably equal to or more than 0.005 ppm and equal to or less than 100 ppm and further preferably equal to or more than 0.01 ppm and equal to or less than 10 ppm, based on the total amount of monomers, namely, the total weight of the polymerizable compound contained in the polymerizable composition. When the amount of the bluing agent added is excessively high, the entire lens becomes excessively blue in some cases; therefore, it is not preferable. Further, when it is excessively small, the effect of improvement of hue is not fully exhibited in some cases; therefore, it is not preferable.

A method for adding a bluing agent is not particularly limited, and the bluing agent is preferably added to monomers in advance. As a method, there can be adopted various methods such as a method including dissolving the bluing agent in a monomer, or a method including preparing a master solution containing a high density bluing agent and adding it by diluting with a monomer using the master solution or other additives.

Furthermore, in some cases, in order to obtain a good resin, a method or operation generally used for synthesizing an organic compound, such as purification, washing, thermal insulation, cold storage, filtration, reduced-pressure treatment or the like is preferably performed for the polymerizable composition of the present invention, or a known compound is preferably added as a stabilizer or a resin modifier for improving a resin and handleability, for example, for controlling the optical properties such as the refractive index and Abbe's number and the like, for controlling the physical properties such as hue, light resistance, weather resistance, heat resistance, impact resistance, hardness, specific gravity, coefficient of linear expansion, shrinkage rate at polymerization, water absorption, hygroscopicity, chemical resistance, viscoelasticity and the like, or for controlling the transmittance and transparency of a resin produced by curing the polymerizable composition, or for controlling the viscosity of the polymerizable composition, or for controlling the preservation or transport handleability. Examples of the compound added for improving stability such as long-term preservation stability, polymerization stability and thermal stability include a polymerization retardant, a polymerization inhibitor, a deoxidant, an antioxidant and the like.

Purification of the polymerizable composition is a means used for improving the transparency of the resin obtained by curing, improving the hue of the resin or increasing the purity thereof. As a method for purifying the polymerizable composition of the present invention, any known method, for example, recrystallization, column chromatography (a silica gel method, an activated carbon method, an ion-exchange resin method or the like), extraction or the like, may be performed with any timing as long as the transparency and hue of the resin obtained by curing the purified composition are improved.

As a method for washing the polymerizable composition, a method for improving the transparency and hue of the resin obtained by curing may be used with timing when or after the synthesized polymerizable composition is taken out. In this method, the composition is washed with a polar and/or nonpolar solvent to remove or reduce a resin transparency inhibitor, for example, an inorganic salt used for synthesizing the polymerizable composition or by-produced in synthesizing the composition, such as an ammonium salt or the like. Although the solvent used depends on the polymerizable composition to be washed and the polarity of a solution containing the polymerizable composition, and is not limited, a solvent which can dissolve a component to be removed, and which is hardly compatible with the polymerizable composition to be washed and the solution containing the polymerizable composition is preferably used. The solvent may be used singly, or a mixture of two or more solvents may be used. Although the amount of a component to be removed depends on the purpose and application, the content is preferably as low as possible. The content is usually not more than 5,000 ppm and more preferably not more than 1,000 ppm. In this case, good results are produced in some cases.

As thermal insulation, cold storage or filtration method for the polymerizable composition, a method for improving the transparency or hue of the resin obtained by curing is generally used with timing when or after the synthesized polymerizable composition is taken out. In the hot insulation method, for example, when the polymerizable composition is crystallized to deteriorate handleability during storage, the polymerizable composition is melted by heating within a range causing no deterioration in the performance of the polymerizable composition and the resin obtained by curing the polymerizable composition. Although the heating temperature range and heat melting method depend on the structure of the compound constituting the polymerizable composition to be handled and are not limited, the heating temperature is generally in a range of the solidification point +50 degrees centigrade or below and preferably the solidification point +20 degrees centigrade or below. In this method, the composition may be melted by mechanically stirring with a stirring device or bubbling with an inert gas for moving an internal liquid. The cold insulation method is generally performed for improving the preservation stability of the polymerizable composition. However, when the composition has a high melting point, consideration may be given to the storage temperature to improve handleability after crystallization. Although the cold insulation temperature depends on the structure and preservation stability of the compound constituting the polymerizable composition to be handled and is not limited, the polymerizable composition of the present invention needs to be stored at a temperature or below which can maintain the stability thereof.

The polymerizable composition of the present invention used for optical applications is required to have excessively high transparency, and thus the polymerizable composition may be usually filtered with a filter having a small pore size. Although the pore size of the filter used herein is usually equal to or greater than 0.05 µm and equal to or smaller than 10 µm, the pore size is preferably equal to or greater than 0.05 µm and equal to or smaller than 5 µm and more preferably equal to or greater than 0.1 µm and equal to or smaller than 5 µm from the viewpoints of operationality and performance. The polymerizable composition of the present invention is no exception in many cases in that filtration leads to good results. Regarding filtration temperature, Although a low filtration temperature near the solidification temperature produces more desirable results in some cases, filtration is preferably performed at a temperature causing no trouble in the filtration work when solidification proceeds during filtration in some cases.

The reduced-pressure treatment is a means generally for removing a solvent, dissolved gas and odor which deteriorate the performance of the resin produced by curing the polymerizable composition. Since a dissolved solvent generally decreases the refractive index of the resultant resin and deteriorates the heat resistance thereof, the dissolved solvent may be removed as much as possible. Although the allowable amount of the dissolved solvent depends on the structure of the compound constituting the polymerizable composition to be handled and the structure of the dissolved solvent, and is not limited, the allowable amount is usually preferably not more than 1% and more preferably not more than 5,000 ppm. From the point of view suppressing the inhibition of polymerization or preventing the resultant resin from being mixed with bubbles, the dissolved gas is preferably removed. Particularly, a moisture gas such as water vapor or the like is preferably removed by bubbling with a dry gas. The amount of the dissolved gas can be determined depending on the structure of the compound constituting the polymerizable composition, and the physical properties, structure and kind of the dissolved gas.

As a method for producing the polymerizable composition according to the present invention, a mixture of the compound represented by the above general formula (110) (for example, the above general formula (100)) and, if necessary, the aforementioned various other polymerizable compounds, a polymerization catalyst, an additive and the like introduced thereinto all at once may be typically melted by heating and mixed. However, the mixture becomes highly viscous in the course of introducing these materials all at once and heat melting depending on the kinds of the polymerizable compound, the polymerization catalyst, the additive or the like to be used together, and thus it is unable to perform filtration under reduced pressure, degassing and filling into a mold in some cases. For example, when the epoxy compound and the thiol compound are used together as the polymerizable compound, in the method involving the aforementioned introduction all at once, heat melting and mixing, the mixture becomes highly viscous during heat melting in some cases.

In such a case, high viscosity can be avoided by the stepwise mixing method illustrated in, for example, the following items (i) and (ii) at the time of mixing and thus the polymerizable composition can be prepared.

(i) The epoxy compound and the thiol compound are first introduced and mixed. Subsequently, the compound represented by the above general formula (110) (for example, the above general formula (100)) is added thereto and melted by heating.

(ii) The thiol compound and the compound represented by the above general formula (110) (for example, the above general formula (100)) are first introduced and melted by heating, and then cooled to near a temperature at which a monomer is not precipitated. Then, the epoxy compound is added thereto.

The stepwise mixing method is not restricted thereto. However, the monomer feed ratio, heat melting temperature, time condition and the like are optimized according to the physical properties of the polymerizable compound to be used together based on the mixing method in the aforementioned items (i) and (ii), whereby high viscosity at the time of mixing can be avoided and thus the polymerizable composition can be stably prepared.

Furthermore, as a typical method for producing the polymerizable composition containing the compound represented by the above general formula (201), the compound represented by the above general formula (201) and, if necessary, the aforementioned various other polymerizable compounds are used together, and further, if necessary, the aforementioned polymerization catalyst is added thereto, and then the resultant is mixed and melted.

The resultant polymerizable composition is useful, for example, as a raw material monomer composition for use in a transparent resin having an extremely high refractive index.

Furthermore, the resultant polymerizable composition can be usually polymerized and cured by a known method for polymerizing a thietane group-containing compound.

The kind and amount of the polymerization catalyst used for obtaining a cured resin, and the kind and ratio of the monomer are determined depending on the structure of the compound constituting the polymerizable composition.

In curing and molding the polymerizable composition of the present invention, in accordance with a known molding method according to purposes, various substances such as a stabilizer, a resin modifier, a chain extender, a crosslinking agent, a light stabilizer including a typical hindered amine light stabilizer (HALS), an ultraviolet absorber including a typical benzotriazole ultraviolet absorber, an antioxidant including a typical hindered phenol antioxidant, a coloring inhibitor, a filler, an external mold releasing agent including a typical silicone type external mold releasing agent, or an internal mold releasing agent including a typical surface active agent such as acidic phosphate, quaternary ammonium salt, quaternary phosphonium salt internal mold releasing agent or the like, an adhesion improving agent and the like may be added. Herein, the internal mold releasing agent includes those catalysts exhibiting the mold release effect among the aforementioned various catalysts.

Although the amount of each of the aforementioned various additives which can be added is different depending on the kind, structure and effect of each additive, and is not limited, the adding amount is usually in the range of equal to or more than 0.001 weight % and equal to or less than 10 weight % and preferably in the range of 0.01 weight % and equal to or less than 5 weight %, based on the total weight of the polymerizable composition. Within these ranges, a sufficiently cured resin can be produced, and the obtained resin has good transparency and optical properties in some cases.

For example, when a hindered amine light stabilizer (HALS) and a phenolic antioxidant, a phosphite type antioxidant or a thioether type antioxidant are added, the hue of the resin is improved in some cases. In particular, when a hindered amine light stabilizer (HALS) is added, the hue of the resin is greatly improved in some cases. Examples of the hindered amine light stabilizer (HALS) include ADK STAB LA-77, LA-57, LA-52, LA-67, LA-62, LA-68, LA-63P, LA-87, LA-82 and the like manufactured by ADEKA Corporation, but are not restricted thereto.

The resin is obtained by polymerization of the aforementioned polymerizable composition. Examples of the polymerization method include various known methods used when producing plastic lenses. A typical method includes a casting polymerization.

When casting polymerization of the polymerizable composition of the present invention is carried out, the polymerizable composition is degassed under reduced pressure or filtered off using a filter as required, and then the polymerizable composition is filled a mold with, and if necessary, heated for carrying out polymerization. In this case, it is preferable to carry out polymerization by slowly heating from a low temperature to a high temperature.

The aforementioned mold is composed of, for example, two pieces of mirror surface-ground molds via a gasket made of polyethylene, an ethylene vinyl acetate copolymer, polyvinyl chloride and the like. Typical examples of the mold include, though not restricted to, combined molds such as glass and glass, glass and plastic plate, glass and metal plate, and the like. The mold may comprise two pieces of molds fixed by a tape such as a polyester adhesive tape or the like. In addition, a known method such as the mold release process may be performed for the mold, if necessary.

When carrying out the casting polymerization, the polymerization temperature is affected by the polymerization conditions such as the kind of a polymerization initiator and the like, and is not particularly limited. But, it is usually equal to or higher than −50 degrees centigrade and equal to or lower than 200 degrees centigrade, preferably equal to or higher than −20 degrees centigrade and equal to or lower than 170 degrees centigrade and more preferably equal to or higher than 0 degrees centigrade and equal to or lower than 150 degrees centigrade.

The polymerization time is affected by the polymerization temperature, but it is usually equal to or longer than 0.01 hours and equal to or shorter than 200 hours and preferably equal to or longer than 0.05 hours and equal to or shorter than 100 hours. Polymerization can also be carried out in combination of several temperatures by conducting fixed temperature, temperature elevation, temperature dropping and the like as required.

Furthermore, the polymerizable composition of the present invention can also be polymerized by applying the active energy line such as an electron beam, ultraviolet light, visible light or the like. At this time, a radical polymerization catalyst or a cationic polymerization catalyst for initiating polymerization by the active energy line is used as required.

After the thus-obtained resin is cured, it may be subjected to an annealing process as required. Furthermore, for purposes of anti-reflection, high hardness grant, wear resistance improvement, anti-fogging property grant or fashionability grant, various known physical or chemical processes such as surface polishing, antistatic process, hard coat process, non-reflective coat process, tinting process, photochromic process (for example, photochromic lens process and the like) and the like may be performed, if necessary.

The resin obtained by polymerization of the polymerizable composition of the present invention has high transparency, good heat resistance and mechanical strength, and has a high refractive index, for example. The resin is useful, for example, as a resin used for an optical component such as a plastic lens or the like.

Examples of the optical component include various plastic lenses such as a spectacle lens for vision correction, a lens for cameras, a fresnel lens for liquid crystal projectors, a lenticular lens, a contact lens and the like; a sealing material for a light emitting diode (LED); an optical waveguide; an optical adhesive used for the junction of an optical lens and an optical waveguide; an anti-reflection layer to be used for an optical lens or the like; and transparent coating or transparent substrate used for a liquid crystal display member such as a substrate, a light guiding plate, a film, a sheet and the like.

EXAMPLES

The present invention is now illustrated in detail below with reference to Preparation Examples and Examples. However, the present invention is not restricted to these Examples.

Reference Preparation Example 1

According to the method as described in Patent Document 2 (Japanese Patent Laid-open No. 2003-327583), 3-thiethanol was synthesized. Furthermore, the resulting 3-thiethanol was used to synthesize 3-mercaptothietane.

Namely, into a reactor equipped with a stirring device and a thermometer were added 190 g (2.50 moles) of thiourea, 253 g of 35 weight % hydrochloric acid solution and 250 g of water, and the resulting mixture was stirred to give a reaction solution. While the reaction solution was stirred, 156 g (1.73 moles) of 3-thiethanol was added dropwise to the reaction solution over 1 hour. After completion of the dropwise addition, the resulting solution was stirred at 30 degrees centigrade for 24 hours for carrying out the reaction, and then 177 g of 24 weight % ammonia water was added dropwise thereto over 1 hour. Furthermore, the solution was further reacted at 30 degrees centigrade for 15 hours, and then allowed to stand for taking out an organic layer (under layer) to obtain 134 g of a crude product. The resultant crude product was distilled off under reduced pressure to collect a fraction of a boiling point of 40 degrees centigrade under 106 Pa to obtain the desired product of a colorless transparent liquid, that is, 3-mercaptothietane.

Reference Preparation Example 2

In this Preparation Example, dichloro(ethylenediamine) zinc (a compound represented by the following formula (21)) was synthesized.

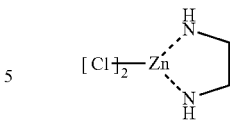

(21)

6.8 g (0.05 moles) of zinc chloride was dissolved in 200 g of methanol, and a solution of 3.0 g (0.05 moles) of ethylenediamine dissolved in 27.0 g of ethanol was added dropwise to the mixture over 30 minutes under stirring. The resulting mixture was allowed to stand overnight at 10 degrees centigrade and crystallized. The precipitated crystal was collected by filtration and washed with methanol. The obtained crystal was dried under reduced pressure to obtain 8.5 g (Yield: 87%) of the compound represented by the above formula (21).

The identification data of the resulting compound is shown below.

$^1$H-NMR (Solvent: DMSO-d6, Internal Standard Substance: TMS): δ2.60(4H), 3.80(4H).

IR (Universal ATR method): 3281, 1573, 1454, 1338, 1128, 1005, 656, 608cm$^{-1}$.

Reference Preparation Example 3

In this Preparation Example, 3-mercaptothietane sodium salt (a compound represented by the following formula (22)) was synthesized.

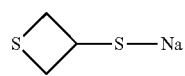

(22)

10.8 g (0.10 moles) of 3-mercaptothietane was mixed with 10.3 g of water, and the mixture was cooled to 10 degrees centigrade under stirring. Subsequently, 13.3 g (0.10 moles) of an aqueous solution of 30 weight % sodium hydroxide was added dropwise to the mixture over 30 minutes. The resulting solution was poured into 350 g of acetone, stirred, and crystallized. The crystal was collected by filtration and washed with 100 g of acetone. The obtained crystal was dried under reduced pressure until weight loss was no longer observed to obtain 10.3 g (Yield: 81%) of the desired compound represented by the above formula (22).

The identification data of the resulting compound is shown below.

$^1$H-NMR (Solvent: DMSO-d6, Internal Standard Substance: TMS): δ3.19(2H), 3.43(2H), 4.57(1H).

Reference Preparation Example 4

In this Preparation Example, 1,3-bis(3-thietanylthio)-2-propanol (a compound represented by the following formula (130)) was synthesized.

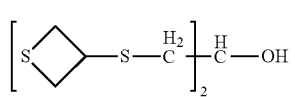

(130)

50 g (0.47 moles) of 3-mercaptothietane prepared in Reference Preparation Example 1 was mixed with 64 g of water, and 26 g (0.20 moles) of an aqueous solution of 31 weight % sodium hydroxide was added dropwise to the mixture. The resulting solution was heated to 35 degrees centigrade and 19 g (0.21 moles) of epichlorohydrin was added dropwise thereto over 2 hours while maintaining the temperature. The mixture was stirred for additional 1 hour. 100 g of toluene was added to extract an organic layer, and then the organic layer was washed twice with 50 g of water. The organic layer was dried by adding magnesium sulfate, filtered for removing a salt, and then concentrated under reduced pressure to remove toluene. The residual solution was filtered for removing the solid material to obtain 25 g of the desired compound represented by the above formula.

The identification data of the resulting compound is shown below.

$^1$H-NMR (Solvent: CDCl$_3$, Internal Standard Substance: TMS): δ2.6~2.8(4H), 2.9(1H), δ3.2~3.5(8H), δ3.8(1H), δ 4.5(2H).

$^{13}$C-NMR (Solvent: CDCl$_3$): δ 34, 37, 43, 70.

IR (Universal ATR method): 3429, 651cm$^{-1}$.

MS (EI method): m/e Calculated Value C$_9$H$_{16}$S$_4$O(M$^+$) 268, Measured Value 268.

Example A1

In this Example, tris(thietanylthio)antimony (tris(3-thietanylthio)antimony, a compound represented by the following formula (4)) was synthesized.

71.3 g (0.66 moles) of 3-mercaptothietane prepared in Reference Preparation Example 1 was added to 106.9 g of pure water, and the mixture was cooled to 15 degrees centigrade. Subsequently, 87.7 g (0.66 moles) of an aqueous solution of 30 weight % sodium hydroxide was added dropwise to the mixture over 1 hour. Thereafter, 250.0 g (corresponding to 0.22 moles of antimony trichloride) of an ethanol solution of 20 weight % antimony trichloride was added dropwise to at the same temperature over 2 hours. After completion of the dropwise addition, the resulting solution was further stirred at the same temperature for 2 hours.

This reaction mixture was filtered, and the solid material was collected by filtration and repeatedly washed with 200 g of water to remove the by-produced salt. After washing was repeated four times, the solid material was further washed with 200 g of methanol and the solid material was collected by filtration. The resultant collected solid material was dried under reduced pressure.

The dried crude product was dissolved in 500 g of chloroform, and the insoluble material was removed by filtration. The filtered organic layer was concentrated and hexane was added thereto. The precipitate was collected by filtration and then dried under reduced pressure to obtain 87.6 g (Yield: 91%) of the compound represented by the following formula (4).

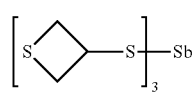

(4)

The identification data of the resulting compound is shown below.

$^1$H-NMR (Solvent: CDCl$_3$, Internal Standard Substance: TMS): δ3.40(6H), 3.54(6H), 4.73(3H).

$^{13}$C-NMR (Solvent: CDCl$_3$): δ39.4, 43.3.

IR (Universal ATR method): 2916, 1444, 1414, 1252, 1227, 1170, 946, 933cm$^{-1}$.

FDMS: m/e Calculated Value C$_9$H$_{15}$S$_6$Sb(M$^+$)436, Measured Value 436.

Elemental Analysis: Calculated Value C, 24.7%; H, 3.5%; S, 44.0%; Sb, 27.8%. Measured Value C, 24.3%; H, 2.8%; S, 43.8%; Sb, 27.5%.

Example A2

In this Example, tris(thietanylthio)antimony (the compound represented by the above formula (4)) was synthesized.

71.3 g (0.66 moles) of 3-mercaptothietane prepared in Reference Preparation Example 1 was added to 106.9 g of pure water, and the mixture was cooled to 15 degrees centigrade. Subsequently, 109.5 g (0.82 moles) of an aqueous solution of 30 weight % sodium hydroxide was added dropwise to the mixture over 1 hour. Thereafter, 83.0 g (corresponding to 0.22 moles of antimony trichloride) of an aqueous solution of 60.2 weight % antimony trichloride was added dropwise thereto at the same temperature over 2 hours. After completion of the dropwise addition, the resulting solution was further stirred at the same temperature for 2 hours.

This reaction mixture was filtered, and the solid material was collected by filtration and repeatedly washed with 200 g of water to remove the by-produced salt. After washing was repeated four times, the solid material was further washed with 200 g of methanol and the solid material was collected by filtration. The resultant collected solid material was dried under reduced pressure.

The dried reaction mixture was dissolved in 700 g of dichloromethane, and the insoluble material was removed by filtration. The filtered organic layer was concentrated and hexane was added thereto. The precipitate was collected by filtration and then dried under reduced pressure to obtain 60.7 g (Yield: 63%) of the compound represented by the above formula (4). The analyzed values of the obtained compound were the same as those of the compound obtained in Example A1.

Example A3

In this Example, tris(thietanylthio)antimony (the compound represented by the above formula (4)) was synthesized.

A mixture of 10 g (0.03 moles) of antimony trioxide, 24 g (0.22 moles) of 3-mercaptothietane prepared in Reference Preparation Example 1 and 1 g (0.02 moles) of acetic acid was stirred at 40 degrees centigrade for 3 hours and further stirred at 50 degrees centigrade for 5 hours. Furthermore, 5 g of 3-mercaptothietane prepared in Reference Preparation Example 1 was added thereto, and the resulting solution was stirred at 50 degrees centigrade for 5 hours.

The reaction mixture was added to 200 ml of chloroform, diluted and then washed by water. The insoluble material in an organic layer was removed by filtration and the filtrate was concentrated under reduced pressure. 10 ml of chloroform and 100 ml of hexane were added to the concentrate and the resulting mixture was crystallized. The precipitate was collected by filtration to obtain 29.3 g (Yield: 97%) of the compound represented by the above formula (4).

The identification data of the resulting compound is shown below.

$^1$H-NMR (Solvent: CDCl$_3$, Internal Standard Substance: TMS): δ3.40(6H), 3.54(6H), 4.73(3H).

Example A4

In this Example, pentakis(thietanylthio)antimony (a compound represented by the following formula (5)) was synthesized.

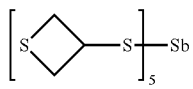

(5)

27.2 g (0.25 moles) of 3-mercaptothietane prepared in Reference Preparation Example 1 was added to 40.8 g of pure water, and the mixture was cooled to 15 degrees centigrade. Subsequently, 33.3 g (0.25 moles) of an aqueous solution of 30 weight % sodium hydroxide was added dropwise to the mixture over 1 hour. Thereafter, 115.0 g (corresponding to 0.05 of antimony (V) chloride) of an ethanol solution of 13.0 weight % antimony (V) chloride was added dropwise thereto at the same temperature over 1.5 hours. After completion of the dropwise addition, the resulting solution was further stirred at the same temperature for 2 hours.

This reaction mixture was filtered, and the solid material was collected by filtration and repeatedly washed with 100 g of water to remove the by-produced salt. After washing was repeated four times, the solid material was further washed with 100 g of methanol and the solid material was collected by filtration. The resultant collected solid material was dried under reduced pressure.

The dried reaction mixture was dissolved in 270 g of chloroform, and the insoluble material was removed by filtration. The filtered organic layer was concentrated and hexane was added thereto. The precipitate was collected by filtration and then dried under reduced pressure to obtain 26.3 g (Yield: 81%) of the compound represented by the above formula (5).

The identification data of the resulting compound is shown below.

$^1$H-NMR (Solvent: CDCl$_3$, Internal Standard Substance: TMS): δ3.20(2H), 3.40(8H)3.54(10H), 4.45(1H), 4.73(4H).

$^{13}$C-NMR (Solvent: CDCl$_3$): δ39.4, 43.2.

IR (Universal ATR method): 2916, 1444, 1414, 1252, 1227, 1170, 946, 933cm$^{-1}$.

Example A5

In this Example, bis(thietanylthio)(ethylenediamine)zinc (a compound represented by the following formula (23)) was synthesized.

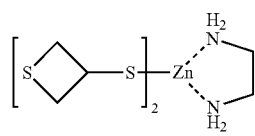

(23)

8.7 g (0.08 moles) of 3-mercaptothietane prepared in Reference Preparation Example 1 was added to 13.0 g of pure water, and the mixture was cooled to 15 degrees centigrade. Subsequently, 10.7 g (0.08 moles) of an aqueous solution of 30 weight % sodium hydroxide was added dropwise to the mixture over 1 hour. Thereafter, 7.9 g (0.04 moles) of dichloro(ethylenediamine)zinc prepared in Reference Preparation Example 2 was added in four portions. After stirring for 5 hours, this reaction mixture was filtered, and the solid material was collected by filtration and repeatedly washed with 50 g of water to remove the by-produced salt. After washing was repeated four times, the solid material was further washed with 50 g of methanol and the solid material was collected by filtration. The resultant collected solid material was dried under reduced pressure to obtain 10.6 g (Yield: 79%) of the desired bisthietanylthio(ethylenediamine)zinc.

The identification data of the resulting compound is shown below.

$^1$H-NMR (Solvent: DMSO-d6, Internal Standard Substance: TMS): δ2.57(4H), 3.12(4H), 3.24(4H), 3.52(4H), 4.45(2H).

$^{13}$C-NMR (Solvent: CDCl$_3$): δ40.4, 40.7.

IR (Universal ATR method): 3250, 1577, 1445, 1155, 1020, 943, 641cm$^{-1}$.

FDMS: m/e Calculated Value $C_8H_{18}N_2S_4Zn(M^+)$334, Measured Value 334.

Example A6

In this Example, tris(thietanylthio)bismuth (a compound represented by the following formula (24)) was synthesized.

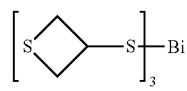

(24)

8.0 g (0.075 moles) of 3-mercaptothietane was added to 12.0 g of pure water, and subsequently 9.8 g (0.075 moles) of an aqueous solution of 30 weight % sodium hydroxide was added dropwise to the mixture at room temperature over 45 minutes. Then, 57.9 g (corresponding to 0.025 moles of bismuth trichloride) of an ethanol solution of 13.6 weight % bismuth trichloride was added dropwise thereto at the same temperature over 1.5 hours. After completion of the dropwise addition, the resulting solution was further stirred at the same temperature for 2 hours.

This reaction mixture was filtered, and the solid material was collected by filtration and dissolved in 500 g of dichloromethane to remove the insoluble material by filtration. The filtered organic layer was washed twice with 100 g of pure water, and then filtered using a Teflon (registered trademark) filter to remove the insoluble material. The solvent was distilled off from the thus-obtained extract and hexane was added to obtain 10.6 g (Yield: 81%) of the compound represented by the above formula (24).

The identification data of the resulting compound is shown below.

$^1$H-NMR (Solvent: DMSO-d6, Internal Standard Substance: TMS): δ3.28(12H), 5.77(3H).

$^{13}$C-NMR (Solvent: DMSO-d6): δ41.5.

IR (Universal ATR method): 2919, 1410, 1196, 931cm$^{-1}$.

FDMS: m/e Calculated Value $C_9H_{15}S_6Bi$ (M$^+$)524, Measured Value 524.

Example A7

In this Example, 2-(3-thietanylthio-1,3-dithiastibolane (a compound represented by the following formula (25)) was synthesized.

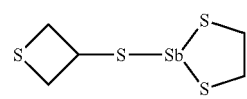

(25)

2.2 g (0.005 moles) of tris(mercaptothietanyl)antimony and 0.5 g (0.005 moles) of 1,2-ethanedithiol were mixed and stirred at room temperature. The insoluble material formed after adding 20 g of chloroform was removed by filtration, and the filtrate was concentrated and then repeatedly washed with methanol to remove the by-produced 3-mercaptothietane. 3.0 g of colorless oil containing the desired 2-thietanylthio-1,3-dithiastibolane as a mixture with unreacted tris(mercaptothietanyl)antimony was obtained.

The identification data of the resulting compound is shown below.

$^1$H-NMR (Solvent: DMSO-d6, Internal Standard Substance: TMS): δ3.17(4H), 3.36(4H), 4.72(1H).

FDMS: m/e Calculated Value $C_5H_9S_4Sb(M^+)$318, Measured Value 318.

Example A8

In this Example, 2,2,2-tris(thietanylthio)-1,3-dithiastibolane (a compound represented by the following formula (26)) was synthesized.

6.5 g (0.01 moles) of penta(mercaptothietanyl)antimony and 0.9 g (0.01 moles) of 1,2-ethanedithiol were mixed and stirred at room temperature. Subsequently, the resulting solution was repeatedly washed with methanol to remove the by-produced 3-mercaptothietane. The residual yellow oil was dried under reduced pressure to obtain 4.5 g of the desired 2,2,2-tris(thietanylthio)-1,3-dithiastibolane.

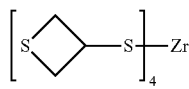
(26)

The identification data of the resulting compound is shown below.

$^1$H-NMR (Solvent: DMSO-d6, Internal Standard Substance: TMS): δ3.40(16H), δ4.80(3H).

IR (Universal ATR method): 2924, 1443, 1408, 1232, 1161, 921,833, 780cm$^{-1}$.

Example A9

In this Example, tetrakis(thietanylthio)zirconium (a compound represented by the following formula (27)) was synthesized.

2.7 g (0.01 moles) of tetrakis dimethylamide zirconium was dissolved in 50 g of dehydrated tetrahydrofuran, and the mixture was cooled to 10 degrees centigrade under nitrogen with stirring.

6.0 g (0.06 moles) of 3-mercaptothietane was added dropwise to the mixture over 30 minutes, the temperature was adjusted to room temperature, and stirring was continued for 5 hours. The precipitated insoluble material was removed by filtration and the solvent was distilled off to obtain 8.3 g of yellow oil containing the desired tetrakis(thietanylthio)zirconium as a mixture with 3-mercaptothietane.

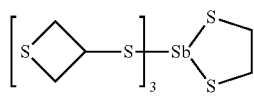
(27)

The identification data of the resulting compound is shown below.

$^1$H-NMR (Solvent: CDCl$_3$, Internal Standard Substance: TMS): δ3.30(8H), 3.42(8H), 4.39(4H).

IR (Universal ATR method): 1448, 1251, 1166, 950, 640 cm$^{-1}$.

FDMS: m/e Calculated Value $C_{12}H_{20}S_8Zr$ (M$^+$)510, Measured Value 509.

Example A10

In this Example, tetrakis(thietanyloxy)titanium (a compound represented by the following formula (28)) was synthesized.

4.05 g (0.045 moles) of 3-thiethanol prepared in Reference Preparation Example 1 was dissolved in 5 ml of tetrahydrofuran, and then a tetrahydrofuran solution (10 ml) of 2.00 g (0.009 moles) of tetrakis(dimethylamino)titanium was added dropwise to the mixture, and the reaction was carried out at room temperature for 12 hours. The reaction mixture was added to hexane, and the precipitated solid was collected by filtration and dried to obtain 2.3 g (Yield: 64%) of the compound represented by the following formula (28).

(28)

The identification data of the resulting compound is shown below.

$^1$H-NMR (Solvent: DMSO-d6, Internal Standard Substance: TMS): δ3.13(8H),3.23(8H),4.64(4H).

IR (Universal ATR method): 1447,1328,1195,1162,1061, 667 cm$^{-1}$.

Elemental Analysis: Calculated Value C, 35.6%; H, 5.0%; S, 31.7%; Ti, 11.8%.

Measured Value C, 33.0%; H, 5.7%; S, 30.0%; Ti, 11.0%.

Example A11

In this Example, tetrakis(thietanyloxy)zirconium (a compound represented by the following formula (29)) was synthesized.

2.7 g (0.01 moles) of tetrakis dimethylamide zirconium was dissolved in 25 g of dehydrated tetrahydrofuran, and the mixture was cooled to 10 degrees centigrade under nitrogen with stirring. 5.6 g (0.08 moles) of 3-hydroxythietane was added dropwise to the mixture over 30 minutes, the temperature was adjusted to room temperature, and stirring was continued for 3 hours. The precipitated insoluble material was removed by filtration and the solvent was distilled off to obtain 6.7 g of light yellow oil containing the desired tetrakis(thietanyloxy)zirconium as a mixture with 3-hydroxythietane.

(29)

The identification data of the resulting compound is shown below.

$^1$H-NMR (Solvent: CDCl$_3$, Internal Standard Substance: TMS): δ3.13(8H), 3.24(8H), 5.03(4H).

Example A12

In this Example, pentakis(thietanylthio)tantalum (a compound represented by the following formula (32)) was synthesized.

2.4 g (0.02 moles) of 3-mercaptothietane and 6.4 g (0.05 moles) of 3-mercaptothietane sodium salt prepared in Reference Preparation Example 3 were mixed into 50 g of dehydrated tetrahydrofuran, and the mixture was cooled to 10 degrees centigrade under nitrogen with stirring. A solution of 3.6 g (0.01 moles) of tantalum chloride dissolved in 50 g of dehydrated tetrahydrofuran was added dropwise to the mixture over 30 minutes, the temperature was adjusted to room temperature, and stirring was continued for 5 hours. The precipitated insoluble material was removed by filtration and the solvent was distilled off to obtain 5.1 g of colorless oil containing the desired pentakis(thietanylthio)tantalum as a mixture with 3-mercaptothietane.

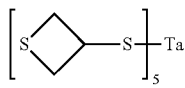

(32)

The identification data of the resulting compound is shown below.

$^1$H-NMR (Solvent: CDCl$_3$, Internal Standard Substance: TMS); δ3.42(20H), 4.37(5H).

Example A13

In this Example, tetrakis(3-thietanylthio)tin (a compound represented by the following formula (12)) was synthesized.

11.2 g (0.11 moles) of 3-mercaptothietane prepared in Reference Preparation Example 1 was added to 50 g of pure water, and subsequently 41.2 g (0.10 moles) of an aqueous solution of 10% sodium hydroxide was added dropwise to the mixture at room temperature over 40 minutes. Next, the reaction solution was heated to 30 degrees centigrade, and 65.2 g (corresponding to 0.025 moles of tin tetrachloride) of an aqueous solution of 10% tin tetrachloride was added dropwise thereto at the same temperature over 4 hours. After completion of the dropwise addition, the resulting solution was further stirred at the same temperature for 2 hours. 100 ml of chloroform was added to this reaction mixture for separating an organic layer and an aqueous layer. The organic layer was washed twice with 100 ml of pure water, and then dried using anhydrous sodium sulfate. The solvent was distilled off from this extract to obtain 13.4 g (Yield: 99%) of the compound represented by the following formula (12).

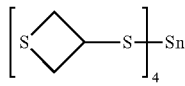

(12)

Example A14

In this Example, (3-thietanylthio)bis[2-(3-thietanylthio)ethylthio]antimony(III) (a compound represented by the following formula (33)) was synthesized in the following procedures (A14-1) to (A14-4).

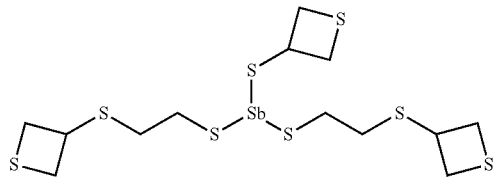

(33)

(A14-1) Synthesis of 2-(3-thietanylthio)ethanol

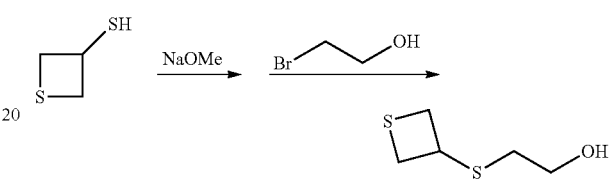

A methanol solution (152 g) of 28% sodium methoxide was added to a methanol (400 ml) solution of 3-mercaptothietane (84.7 g) under cooling (5 degrees centigrade). Next, 2-bromoethanol (98.6 g) was added dropwise to the mixture, and the reaction was further carried out for 5 hours. The reaction mixture was concentrated under reduced pressure to remove the solvent (methanol), and then partitioned between ethyl acetate and water. The organic layer was washed with water and then dried by adding magnesium sulfate. The resultant was filtered and then concentrated under reduced pressure to obtain a desired oily product (100 g).

The identification data of the resulting compound is shown below.

$^1$H-NMR (Solvent: CDCl$_3$, Internal Standard Substance: TMS) δ: 2.76(2H),3.26(2H),3.46(2H),3.73(2H),4.42(1H).

EI-MS: m/Z150(M$^+$).

(A14-2) Synthesis of 2-(3-thietanylthio)ethyl thioacetate

Triethylamine (Et$_3$N) (18 g) was added to a dichloromethane (130 ml) solution of 2-(3-thietanylthio)ethanol (21 g). A dichloromethane (30 ml) solution of methanesulfonyl chloride (MsCl) (18 g) was added dropwise to the mixture under cooling (−15 degrees centigrade), and the reaction was carried out at 0 degree centigrade for 1 hour. Cold water was added to the reaction mixture for partition, and then the organic layer (dichloromethane solution) was added dropwise to a methanol (200 ml) solution of potassium thioacetate (AcSK) (21 g) under cooling (5 degrees centigrade), and the reaction was carried out for 10 hours. Ethyl acetate and water were added to the reaction mixture for carrying out extraction. The organic layer was washed with water and dried with magnesium sulfate. The resultant was filtered and then concentrated under reduced pressure to obtain a desired oily product (27 g).

The identification data of the resulting compound is shown below.

$^1$H-NMR (Solvent: CDCl$_3$, Internal Standard Substance: TMS) δ: 2.36(3H),2.70(2H),3.03(2H),3.28(2H),3.46(2H), 4.48(1H).

IR (Universal ATR method): 2933,1685,1417,1352,1130,1101,953,620 cm$^{-1}$.

EI-MS: m/Z208(M$^+$).

(A14-3) Synthesis of 2-(3-thietanylthio)ethanethiol

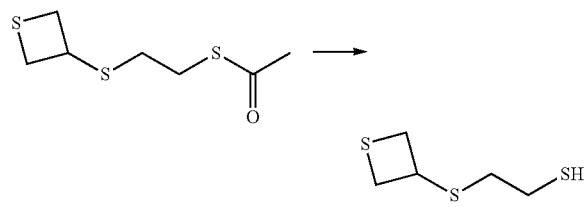

Sodium hydroxide (1.6 g) was dissolved in methanol (35 ml) and the mixture was cooled to 5 degrees centigrade. A tetrahydrofuran (10 ml) solution of 2-(3-thietanylthio)ethyl thioacetate (7 g) was added dropwise to the mixture, and the reaction was further carried out for 1 hour. The reaction mixture was once concentrated under reduced pressure and then dichloromethane and water were added thereto, and 1 N hydrochloric acid was further added to neutralize the resulting reaction mixture. After partition, the organic layer was washed with water and dried over magnesium sulfate. The resultant was filtered and then concentrated under reduced pressure to obtain a desired oily product (5.6 g).

The identification data of the resulting compound is shown below.

$^1$H-NMR (Solvent: CDCl$_3$, Internal Standard Substance: TMS) δ: 1.72(1H), 2.72(2H),2.80(2H),3.25(2H),3.46(2H), 4.41(1H).

IR (Universal ATR method): 2932, 2540, 1426, 1250, 1210, 1168, 951, 697, 650 cm$^{-1}$.

EI-MS: m/Z166(M$^+$).

(A14-4) Synthesis of (3-thietanylthio)bis[2-(3-thietanylthio)ethylthio]antimony(III)

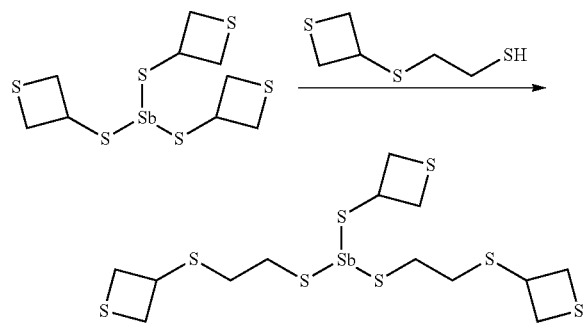

Tris(3-thietanylthio)antimony(III) (the compound prepared in the same manner as in Example A1; 2 g) was added to a dichloromethane (10 ml) solution of 2-(3-thietanylthio) ethanethiol (2 g) under ice water cooling and the reaction was carried out for 1 hour. The obtained solution was once concentrated under reduced pressure to remove dichloromethane by distillation, and then hexane (10 ml) was added and stirred. Decantation separation was repeatedly carried out four times and the resultant was further dried under reduced pressure to remove the solvent by distillation to obtain a desired yellow oily product (2.7 g).

The identification data of the resulting compound is shown below.

$^1$H-NMR (Solvent: CDCl$_3$, Internal Standard Substance: TMS) δ: 2.90(4H),3.18(4H),3.29(4H),3.50(8H),4.45(2H), 4.75(1H).

IR (Universal ATR method): 2928,1420,1247,1165,948, 642 cm$^{-1}$.

FD-MS: m/Z451 [(M-C$_3$H$_5$S$_2$)$^+$], 393 [(M-C$_5$H$_9$S$_3$)$^+$].

Example A15

In this Example, tris[2-(3-thietanylthio)ethylthio]antimony(III) (a compound represented by the following formula (34)) was synthesized.

(34)

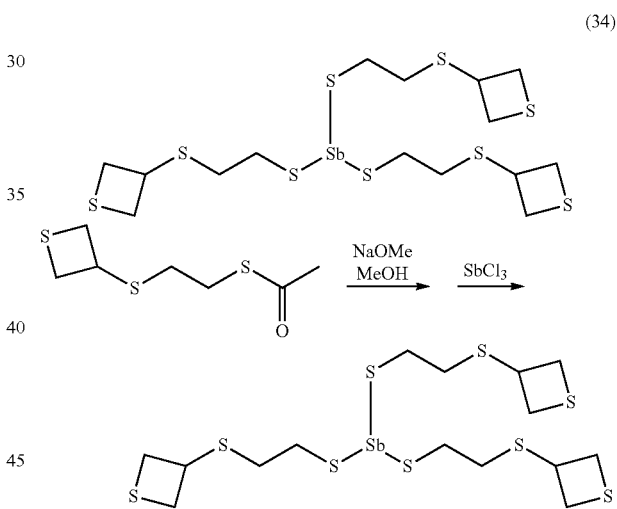

2-(3-thietanylthio)ethyl thioacetate (26.6 g; prepared in the same manner as in Example A14) was dissolved in tetrahydrofuran (140 ml) and methanol (70 ml). A methanol (MeOH) solution (24.6 g) of 28% sodium methoxide (NaOMe) was added dropwise to the mixture under ice water cooling, and the reaction was carried out for 12 hours. The solvent (tetrahydrofuran and methanol) was once distilled off by concentration under reduced pressure, and then water (190 g) was added thereto. An ethanol (30 g) solution of antimony chloride (SbCl$_3$; 9.9 g) was added dropwise to the mixture under ice water cooling, and the reaction was further carried out for 4 hours. After removing the supernatant (water to be discharged) by decantation, the residue was dissolved in chloroform (500 ml) and further washed with water. The chloroform extract was filtered to remove the insoluble material and then concentrated under reduced pressure to obtain a desired yellow oily product (20.3 g).

The identification data of the resulting compound is shown below.

$^1$H-NMR (Solvent: CDCl$_3$, Internal Standard Substance: TMS) δ: 2.90(6H),3.18(6H),3.29(6H),3.49(6H),4.47(3H).

IR (Universal ATR method): 2930,1417,1168,950,690,648.

FD-MS: m/Z618(M$^+$).

Example A16

In this Example, 2-(3-thietanylthio)-1,3-dithiastibolane (a compound represented by the following formula (25)) was synthesized.

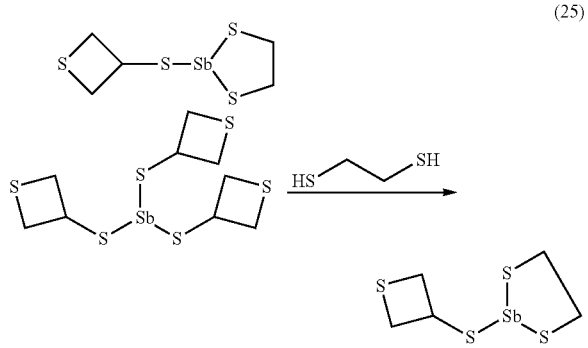

(25)

1,2-ethanedithiol (6.5 g) was added dropwise to a chloroform (420 g) solution of tris(3-thietanylthio)antimony(III) (30 g; prepared in the same manner as in Example A1) under ice water cooling, and the reaction was further carried out for 1 hour. The solvent (chloroform) was distilled off by concentration under reduced pressure, and then methanol (200 ml) was added. The resulting mixture was stirred and decanted. Methanol (100 ml) was added again and stirred under ice water cooling, and the precipitated solid was collected by filtration and dried under reduced pressure to obtain a desired product (22 g).

The identification data of the resulting compound is shown below.

$^1$H-NMR (Solvent: CDCl$_3$, Internal Standard Substance: TMS) δ: 3.25(2H),3.56(4H),3.74(2H),4.46(1H).

FT-IR (Universal ATR method): 2927,2897,1407,1257,1154,944,917,835,785,639 cm$^{-1}$.

FD-MS: m/Z320(M$^+$).

Example A17

In this Example, tris(3-thietanyloxy)antimony(III) (a compound represented by the following formula (35)) was synthesized.

(35)

15.4 g (0.15 moles) of triethylamine was added to a solution of 11.6 g (0.05 moles) of antimony trichloride dissolved in 50 g of tetrahydrofuran, and the resulting mixture was stirred and dispersed. 16.8 g (0.17 moles) of 3-thiethanol was added dropwise to this solution over 1 hour and then stirred for additional 3 hrs. The precipitated triethylamine hydrochloric acid salt was removed by filtration, and tetrahydrofuran in the solvent was distilled off under reduced pressure to obtain 21.8 g of oil, that is, a mixture of 64 weight % of the desired compound represented by the above formula (35) and 36 weight % of 3-thiethanol.

The identification data of the resulting compound is shown below.

$^1$H-NMR (Solvent: pyridine-d5) δ: 3.28(6H),3.58(6H), 5.48(3H).

$^{13}$H-NMR (Solvent: pyridine-d5) δ: 42,69

IR (Universal ATR method): 1445,1194,1156,1040,890, 726,601 cm$^{-1}$.

(Preparation of Polymerizable Composition and Resin Cured Product Obtained by Polymerization Thereof)

In the following Examples, using the thietane compound prepared in the above Example, a polymerizable composition was prepared and a resin cured by polymerization of the polymerization composition was obtained.

The physical properties of the obtained resin and the optical component (lens) were evaluated in the following manner.

Appearance: Transparency was visually confirmed.

Refractive Index: It was measured at 20 degrees centigrade using a Pulfrich refractometer.

Meanwhile, the optical properties (refractive index, Abbe's number), heat resistance, hue and mechanical properties of the resins prepared in Examples B1 to B29 to be described below were evaluated in the following test methods.

Refractive Index (ne), Abbe's Number (ve): They were respectively measured at 20 degrees centigrade using a Pulfrich refractometer.

Heat Resistance: The deformation starting temperature of the inflection point in the chart measured by the TMA penetration method (load: 50 g, pin tip: 0.5 mmΦ, heating rate: 10 degree centigrade/min) was taken as the temparature at which thermal deformation begins, while the intersection of the tangent before and after deformation was taken as Tg (degrees centigrade).

Hue: Using a colorimeter (CR-200) manufactured by Minolta, the yellowness index (YI) of the resin was measured. The YI value was measured by preparing a plate having a thickness of 5 mm.

Flexural Strength: It was measured by the use of Autograph AGS-J manufactured by Shimadzu Corp. A resin plate of 3 mm in thickness, 25 mm in width and about 70 mm in length was placed on a supporting base of the distance between both supporting points of 34 mm and a load was applied from the top at a rate of 1.2 mm/min. The stress and displacement when the resin was broken were respectively taken as the maximum point stress and the maximum point displacement to give test values.

Static Pressure Load Test: A static pressure load was measured by the used of Autograph AGS-J manufactured by Shimadzu Corp. A load was placed on the resin in a lens shape having a center thickness of 1.0 mm and a diameter of about 80 mm at a rate of 100 mm/min at up to 100 N, while a load was placed thereon at a rate of 2.0 mm/min at 100 N or greater. The load (N) when the resin was broken was measured to give the test value.

Example B1

0.20 g of the compound prepared in Example A5 was weighed in a glass beaker at room temperature (25 degrees centigrade), and subsequently 0.52 g of 3-mercaptothietane and 1.25 g of the compound prepared in Example A13 were weighed. Without adding a polymerization catalyst, the resulting solution was heated to 60 degrees centigrade and dissolved to obtain a polymerizable composition. After a mold composed of a glass mold and a tape was filled with the obtained polymerizable composition, the resultant was put into a heating oven, and polymerized at 70 degrees centigrade for 2 hours, at 80 degrees centigrade for 20 hours, at 90 degrees centigrade for 2 hours and at 100 degrees centigrade for 4 days.

A molding sample piece of the transparent resin was obtained and its refractive index was measured and as a result, the refractive index ne was 1.767.

Example B2

5 g of the compound prepared in Example A1 was weighed in a glass beaker at room temperature (25 degrees centigrade). Without adding a polymerization catalyst, the resulting solution was heated to 75 degrees centigrade and dissolved. The solution was thoroughly degassed under reduced pressure of not more than 3.9 kPa until no bubble was observed to obtain a polymerizable composition.

Subsequently, after a mold composed of a glass mold and a tape was filled with the obtained polymerizable composition, the resultant was put into a heating oven and polymerized at 100 degrees centigrade for 60 hours.

A molding sample piece of the obtained resin was excellent in transparency and had good appearance with no distortion.

Furthermore, the refractive index of the obtained resin was measured and as a result, the refractive index ne was 1.853.

Example B3

7.2 g of the compound prepared in Example A1 was weighed in a glass beaker at room temperature (25 degrees centigrade), and subsequently 0.8 g of 3-mercaptothietane prepared in Reference Preparation Example 1 as a thiol compound was weighed and added. Without adding a polymerization catalyst, the resulting solution was heated to 70 degrees centigrade and dissolved. The solution was thoroughly degassed under reduced pressure of not more than 3.9 kPa until no bubble was observed and then filtered using a Teflon (registered trademark) filter to obtain a polymerizable composition.

Subsequently, after a mold composed of a glass mold and a tape was filled with the obtained polymerizable composition, the resultant was put into a heating oven and polymerized at 100 degrees centigrade for 23 hours.

A molding sample piece of the obtained resin was excellent in transparency and had good appearance with no distortion.

Furthermore, the refractive index of the obtained resin was measured and as a result, the refractive index ne was 1.834.

Example B4

6.90 g of the compound prepared in Example A1 was weighed in a glass beaker at room temperature (25 degrees centigrade), and subsequently 0.77 g of 1,2-ethanedithiol as a thiol compound was weighed and added. Without adding a polymerization catalyst, the resulting solution was heated to 70 degrees centigrade and dissolved. The resulting mixture was filtered using a Teflon (registered trademark) filter, and then thoroughly degassed under reduced pressure of not more than 3.9 kPa until no bubble was observed to obtain a polymerizable composition.

Subsequently, after a mold composed of a glass mold and a tape was filled with the obtained polymerizable composition, the resultant was put into a heating oven and polymerized for 24 hours. During polymerization, the inside of the oven was heated from 90 to 120 degrees centigrade in multiple stages.

A molding sample piece of the obtained resin was excellent in transparency and had good appearance with no distortion.

Furthermore, the refractive index of the obtained resin was measured and as a result, the refractive index ne was 1.838.

Example B5

75 weight parts of tris(thietanylthio)bismuth prepared in Example A6 and 25 weight parts of 3-mercaptothietane as a thiol compound were heated, mixed and dissolved at 85 degrees centigrade. Then, the resulting mixture was thoroughly degassed under reduced pressure of not more than 3.9 kPa until no bubble was observed. Subsequently, after a mold composed of a glass mold and a tape was filled with the degassed polymerizable composition, the resultant was put into a heating oven and polymerized at 70 degrees centigrade for 46 hours.

A molding sample piece of the obtained resin was excellent in transparency and had good appearance with no distortion.

Furthermore, the refractive index of the obtained resin was measured and as a result, the refractive index ne was 1.855.

Example B6

A mixture of 37 weight parts of 2-thietanylthio-1,3-dithiastibolane prepared in Example A7, 60 weight parts of tris(3-thietanylthio)antimony and 3 weight parts of 3-mercaptothietane was heated, mixed and dissolved at 60 degrees centigrade. Then, the resulting mixture was thoroughly degassed under reduced pressure of not more than 3.9 kPa until no bubble was observed. Subsequently, after a mold composed of a glass mold and a tape was filled with the degassed polymerizable composition, the resultant was put into a heating oven and polymerized at 100 degrees centigrade for 48 hours.

A molding sample piece of the obtained resin was excellent in transparency and had good appearance with no distortion.

Furthermore, the refractive index of the obtained resin was measured and as a result, the refractive index ne was 1.870.

Example B7

The compound represented by the above formula (26) prepared in Example A8 was heated, mixed and dissolved at 75 degrees centigrade. Then, the resulting mixture was thoroughly degassed under reduced pressure of not more than 3.9 kPa until no bubble was observed. Subsequently, after a mold composed of a glass mold and a tape was filled with the degassed polymerizable composition, the resultant was put into a heating oven and polymerized at 100 degrees centigrade for 48 hours.

A molding sample piece of the obtained resin was excellent in transparency and had good appearance with no distortion.

Furthermore, the refractive index of the obtained resin was measured and as a result, the refractive index ne was 1.865.

Example B8

0.33 g of the compound prepared in Example A10 was weighed in a glass beaker at room temperature (25 degrees centigrade), and subsequently 0.52 g of 3-mercaptothietane and 1.25 g of the compound prepared in Example A13 were weighed. Without adding a polymerization catalyst, the resulting solution was heated to 60 degrees centigrade and dissolved to obtain a polymerizable composition. After a mold composed of a glass mold and a tape was filled with the obtained polymerizable composition, the resultant was put into a heating oven, and polymerized at 70 degrees centigrade for 6 hours, 80 degrees centigrade for 8 hours, at 100 degrees centigrade for 5 hours and at 110 degrees centigrade for 5 hours.

A molding sample piece of the transparent resin was obtained and the refractive index was measured and as a result, the refractive index ne was 1.758.

Example B9

A mixture of 31 weight parts of tetrakis(thietanyloxy)zirconium prepared in Example A11 and 69 weight parts of 3-thiethanol was heated and dissolved at 60 degrees centigrade. Then, the resulting solution was thoroughly degassed under reduced pressure of not more than 3.9 kPa until no bubble was observed. Subsequently, after a mold composed of a glass mold and a tape was filled with the degassed polymerizable composition, the resultant was put into a heating oven and polymerized at 130 degrees centigrade for 48 hours.

A molding sample piece of the obtained resin was excellent in transparency and had good appearance with no distortion.

Furthermore, the refractive index of the obtained resin was measured and as a result, the refractive index ne was 1.658.

Example B10

1.2 g of the compound prepared in Example A4 was weighed in a glass beaker at room temperature (25 degrees centigrade), and subsequently 0.8 g of 3-mercaptothietane prepared in Reference Preparation Example 1 as a thiol compound was weighed and added. Without adding a polymerization catalyst, the resulting solution was heated to 70 degrees centigrade and dissolved. The solution was filtered using a Teflon (registered trademark) filter, and then thoroughly degassed under reduced pressure of not more than 3.9 kPa until no bubble was observed to obtain a polymerizable composition.

Subsequently, after a mold composed of a glass mold and a tape was filled with the obtained polymerizable composition, the resultant was put into a heating oven and polymerized for 1 week. During polymerization, the inside of the oven was heated from 80 to 130 degrees centigrade in multiple stages.

A molding sample piece of the obtained resin was excellent in transparency and had good appearance with no distortion.

Furthermore, the refractive index of the obtained resin was measured and as a result, the refractive index ne was 1.769.

Example B11

0.50 g of the compound prepared in Example A14 ((3-thietanylthio)bis[2-(3-thietanylthio)ethylthio]antimony(III)) was weighed in a glass beaker, and subsequently 0.50 g of 3-mercaptothietane and 2.00 g of the compound prepared in Example A13 (tetrakis(3-thietanylthio)tin) were weighed. The resulting solution was heated to 60 degrees centigrade and dissolved. Then, the solution was thoroughly degassed under reduced pressure of not more than 3.9 kPa until no bubble was observed to obtain a polymerizable composition. After a mold composed of a glass mold and a tape was filled with the obtained polymerizable composition, the resultant was put into a heating oven, and polymerized at 80 degrees centigrade for 12 hours, at 100 degrees centigrade for 12 hours and at 120 degrees centigrade for 8 hours.

A molding sample piece of the transparent resin was obtained and the refractive index was measured and as a result, the refractive index ne was 1.777.

Example B12

1.09 g of the compound prepared in Example A15 (tris[2-(3-thietanylthio)ethylthio]antimony(III)) was weighed in a glass beaker, and subsequently 0.51 g of 3-mercaptothietane and 2.01 g of the compound prepared in Example A13 (tetrakis(3-thietanylthio)tin) were weighed. The resulting solution was heated to 60 degrees centigrade and dissolved. Then, the solution was thoroughly degassed under reduced pressure of not more than 3.9 kPa until no bubble was observed to obtain a polymerizable composition. After a mold composed of a glass mold and a tape was filled with the obtained polymerizable composition, the resultant was put into a heating oven, and polymerized at 80 degrees centigrade for 12 hours, at 100 degrees centigrade for 12 hours, at 120 degrees centigrade for 24 hours and at 130 degrees centigrade for 9 hours.

A molding sample piece of the transparent resin was obtained and the refractive index was measured and as a result, the refractive index ne was 1.772.

Example B13

12.0 g of the compound prepared in Example A16 (2-(3-thietanylthio)-1,3-dithiastibolane) was weighed in a glass beaker, and subsequently 0.17 g of antimony trichloride was weighed. The resulting solution was heated to 70 degrees centigrade and dissolved. Then, the solution was thoroughly degassed under reduced pressure of not more than 3.9 kPa until no bubble was observed to obtain a polymerizable composition. After a mold composed of a glass mold and a tape was filled with the obtained polymerizable composition, the resultant was put into a heating oven, and polymerized at 100 degrees centigrade for 12 hours, at 120 degrees centigrade for 10 hours and at 130 degrees centigrade for 10 hours.

A molding sample piece of the transparent resin was obtained and the refractive index was measured and as a result, the refractive index ne was 1.916.

Example B14

2.40 g of the mixture prepared in Example A17 and 1.60 g of the compound prepared in Example A13 (tetrakis(3-thietanylthio)tin) were weighed in a glass beaker. The resulting solution was heated to 70 degrees centigrade, stirred and dissolved until the solution became uniform to obtain a polymerizable composition. A mold composed of a glass mold and a tape was filled with the obtained polymerizable composition. The resultant was put into a heating oven and polymerized for 20 hours while raising the temperature from 60 to 110 degrees centigrade in multiple stages.

A molding sample piece of the transparent resin was obtained and the refractive index was measured and as a result, the refractive index ne was 1.720.

Example B15

An aqueous solution of 30% sodium hydroxide (6.7 g) was added dropwise to a mixed solution of 3-mercaptothietane (5.4 g) and water (5.4 g) at 10 degrees centigrade. Next, antimony oxychloride (8.7 g) was added thereto and the reaction was carried out for 12 hours. The precipitated light yellow solid was collected by filtration, washed with water, further washed with methanol (50 g), and then dried under reduced pressure to obtain a light yellow solid (9.7 g).

1.08 g of 3-mercaptothietane was weighed in a glass beaker, and 0.40 g of the above light yellow solid was weighed. The resulting solution was heated to 70 degrees centigrade and dissolved. Then, 2.52 g of the compound prepared in Example A13 (tetrakis(3-thietanylthio)tin) was added thereto. The solution was stirred and dissolved until the solution became uniform to obtain a polymerizable composition. A mold composed of a glass mold and a tape was filled with the obtained polymerizable composition. The resultant was put into a heating oven, and polymerized at 60 degrees centigrade for 12 hours and for 5 hours while raising the temperature from 70 to 100 degrees centigrade in multiple stages.

A molding sample piece of the transparent resin was obtained and the refractive index was measured and as a result, the refractive index ne was 1.788.

Example B16

An aqueous solution of 30% sodium hydroxide (6.7 g) was added dropwise to a mixed solution of 3-mercaptothietane (5.4 g) and water (5.4 g), bismuth oxychloride (13.0 g) was subsequently added to the mixture, and the reaction was carried out for 6 hours. The precipitated light green solid was collected by filtration, washed with water, subsequently washed with methanol (50 g), and then dried under reduced pressure to obtain a light green solid (15.5 g).

1.14 g of 3-mercaptothietane was weighed in a glass beaker, and 0.20 g of the above light green solid was weighed. The resulting solution was heated to 60 degrees centigrade and dissolved, and then 2.66 g of the compound prepared in Example A13 (tetrakis(3-thietanylthio)tin) was added thereto. The solution was stirred and dissolved until the solution became uniform to obtain a polymerizable composition. A mold composed of a glass mold and a tape was filled with the obtained polymerizable composition. The resultant was put into a heating oven, and polymerized at 55 degrees centigrade for 18 hours and for 3 hours while raising the temperature from 65 to 100 degrees centigrade in multiple stages.

A molding sample piece of the transparent resin was obtained and the refractive index was measured and as a result, the refractive index ne was 1.778.

Example B17

28 weight parts of the compound prepared in Example A1 (tris(3-thietanylthio)antimony), 60 weight parts of the compound prepared in Example A13 (tetrakis(3-thietanylthio)tin) and 12 weight parts of 3-mercaptothietane were heated, mixed and dissolved at 75 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 60 to 150 degrees centigrade and polymerized for 16 hours.

A molding sample piece of the obtained resin was excellent in transparency and had good appearance with no distortion. The evaluation results of physical properties of the resin are shown in Table 1.

Example B18

40 weight parts of the compound prepared in Example A1, 50 weight parts of the compound prepared in Example A13, 4.3 weight parts of bis(2-mercaptoethyl)sulfide and 5.7 weight parts of 2,5-bis(isocyanatomethyl)bicyclo-[2,2,1]-heptane were heated, mixed and dissolved at 75 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 70 to 120 degrees centigrade and polymerized for 22 hours.

A molding sample piece of the obtained resin was excellent in transparency and had good appearance with no distortion. The evaluation results of physical properties of the resin are shown in Table 1.

Example B19

1.8 weight parts of 3-mercaptothietane, 3.6 weight parts of 2,5-bis(isocyanatomethyl)bicyclo-[2,2,1]-heptane and 0.005 weight parts of di-n-butyltin dichloride were reacted at 60 degrees centigrade for 6 hours, and then 4.6 weight parts of bis(2-mercaptoethyl)sulfide and 0.004 weight parts of di-n-butyltin dichloride were added thereto. The resulting mixture was further reacted at 60 degrees centigrade for 6 hours. The NCO conversion of the obtained thiourethane prepolymer was 98.6%. 40 weight parts of the compound prepared in Example A1 and 50 weight parts of the compound prepared in Example A13 were added thereto, and the resultant was heated, mixed and dissolved at 75 degrees centigrade. Then, the resulting solution was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 70 to 120 degrees centigrade and polymerized for 22 hours.

A molding sample piece of the obtained resin was excellent in transparency and had good appearance with no distortion. The evaluation results of physical properties of the resin are shown in Table 1.

Example B20

45.7 weight parts of the compound prepared in Example A1, 38.2 weight parts of the compound prepared in Example A13 and 5.1 weight parts of 3-mercaptothietane were heated, mixed and dissolved at 75 degrees centigrade. Then, the resulting mixture was degassed under reduced pressure of not more than 3.9 kPa and then cooled to 40 degrees centigrade. Subsequently, 11 weight parts of the compound having 1,8-bis(2,3-epoxypropylthio)-4-(2,3-epoxypropylthiomethyl)-3,6-dithiaoctane as a main component as described in Japanese Patent Laid-open No. 1998-130250 was added thereto, and the resulting solution was degassed at 50 degrees centigrade under reduced pressure of not more than 3.9 kPa to obtain a polymerizable composition. A mold composed of a glass mold and a tape was filled with the obtained polymerizable composition. Then, the resultant was put into a heating oven, slowly heated from 50 to 130 degrees centigrade and polymerized for 78 hours.

A molding sample piece of the obtained resin was excellent in transparency and had good appearance with no distortion. The evaluation results of physical properties of the resin are shown in Table 1.

Example B21

39.7 weight parts of the compound prepared in Example A1, 46.5 weight parts of the compound prepared in Example A13 and 4.8 weight parts of 4-mercaptomethyl-1,8-dimercapto-3,6-dithiaoctane were heated, mixed and dissolved at 75 degrees centigrade. Then, the resulting mixture was degassed under reduced pressure of not more than 3.9 kPa and then cooled to 40 degrees centigrade. Subsequently, 9 weight parts of the compound having 1,8-bis(2,3-epoxypropylthio)-4-(2,3-epoxypropylthiomethyl)-3,6-dithiaoctane as a main component as described in Japanese Patent Laid-open No. 1998-130250 was added thereto, and the resulting solution was degassed at 50 degrees centigrade under reduced pressure of not more than 3.9 kPa to obtain a polymerizable composition. After a mold composed of a glass mold and a tape was filled with the obtained polymerizable composition, the resultant was put into a heating oven, slowly heated from 50 to 130 degrees centigrade and polymerized for 78 hours.

A molding sample piece of the obtained resin was excellent in transparency and had good appearance with no distortion. The evaluation results of physical properties of the resin are shown in Table 1.

Example B22

62.2 weight parts of the compound prepared in Example A1, 17.7 weight parts of the compound prepared in Example A13, 9.1 weight parts of 3-mercaptothietane and 11 weight parts of bis(2,3-epoxypropyl)disulfide were heated, mixed and dissolved at 70 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 60 to 110 degrees centigrade and polymerized for 67 hours.

A molding sample piece of the obtained resin was excellent in transparency and had good appearance with no distortion. The evaluation results of physical properties of the resin are shown in Table 1.

Example B23

58.4 weight parts of the compound prepared in Example A1, 23.6 weight parts of the compound prepared in Example A13, 7 weight parts of 4-mercaptomethyl-1,8-dimercapto-3,6-dithiaoctane and 11 weight parts of bis(2,3-epoxypropyl)disulfide were heated, mixed and dissolved at 70 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 20 to 110 degrees centigrade and polymerized for 70 hours.

A molding sample piece of the obtained resin was excellent in transparency and had good appearance with no distortion. The evaluation results of physical properties of the resin are shown in Table 1.

Example B24

42.8 weight parts of the compound prepared in Example A1, 26.9 weight parts of the compound prepared in Example A13, 8.3 weight parts of 3-mercaptothietane and 22 weight parts of bis(2,3-epithiopropyl)disulfide were heated, mixed and dissolved at 65 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 50 to 130 degrees centigrade and polymerized for 80 hours.

A molding sample piece of the obtained resin was excellent in transparency and had good appearance with no distortion. The evaluation results of physical properties of the resin are shown in Table 1.

Example B25

29.2 weight parts of the compound prepared in Example A1, 51.4 weight parts of the compound prepared in Example A13, 7.4 weight parts of 4-mercaptomethyl-1,8-dimercapto-3,6-dithiaoctane and 12 weight parts of bis(2,3-epithiopropyl)disulfide were heated, mixed and dissolved at 75 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 50 to 130 degrees centigrade and polymerized for 104 hours.

A molding sample piece of the obtained resin was excellent in transparency and had good appearance with no distortion. The evaluation results of physical properties of the resin are shown in Table 1.

TABLE 1

| | | Evaluation Items | | | | | |
|---|---|---|---|---|---|---|---|
| | | Optical Properties | | | Heat Resistance | Flexural Strength (Plate of 3 mm in Thickness) | |
| | Composition (weight parts in parenthesis) | Refractive Index ne | Abbe's Number ve | Tg (° C.) | Temperature at which thermal deformation begins (° C.) | Maximum Point Stress (N/mm$^2$) | Maximum Point Displacement (mm) | Static Pressure Load Test (N) |
| Example B17 | A1 (28), A13 (60), C1 (12) | 1.798 | 24.6 | 114.0 | 99.5 | 49.6 | 0.60 | — |
| Example B18 | A1 (40), A13 (50), C2 (4.3), F1 (5.7) | 1.793 | 24.0 | 127.7 | 114.8 | 63.4 | 0.74 | — |
| Example B19 | A1 (40), A13 (50), C1 (1.8), C2 (4.6), F1 (3.6) | 1.798 | 23.8 | 117.0 | 106.7 | 51.6 | 0.62 | — |
| Example B20 | A1 (45.7), A13 (38.2), C1 (5.1), D1 (11) | 1.793 | 24.2 | 102.2 | 86.8 | 99.5 | 1.42 | 206 |

TABLE 1-continued

| | Composition (weight parts in parenthesis) | Optical Properties | | | Heat Resistance Temperature at which thermal deformation begins (° C.) | Flexural Strength (Plate of 3 mm in Thickness) | | Static Pressure Load Test (N) |
|---|---|---|---|---|---|---|---|---|
| | | Refractive Index ne | Abbe's Number ve | Tg (° C.) | | Maximum Point Stress (N/mm$^2$) | Maximum Point Displacement (mm) | |
| Example B21 | A1 (39.7), A13 (46.5), C3 (4.8), D1 (9) | 1.796 | 24.3 | 110.8 | 88.1 | 94.6 | 1.67 | 199 |
| Example B22 | A1 (62.2), A13 (17.7), C1 (9.1), D2 (11) | 1.797 | 24.1 | 109.4 | 85.8 | 94.4 | 1.41 | 85 |
| Example B23 | A1 (58.4), A13 (23.6), C3 (7), D2 (11) | 1.796 | 24.2 | 112.1 | 100.6 | 110.6 | 1.86 | 174 |
| Example B24 | A1 (42.8), A13 (26.9), C1 (8.3), E1 (22) | 1.795 | 24.9 | 105.2 | 91.8 | 141.1 | 2.08 | 430 |
| Example B25 | A1 (29.2), A13 (51.4), C3 (7.4), E1 (12) | 1.794 | 24.8 | 109.1 | 98.0 | 151.1 | 2.26 | — |

A1: tris (3-thietanylthio)antimony
A13: tetrakis (3-thietanylthio)tin
C1: 3-mercaptothietane
C2: bis (2-mercaptoethyl)sulfide
C3: 4-mercaptomethyl-1,8-dimercapto-3,6-dithiaoctane
D1: 1,8-bis (2,3-epoxypropylthio)-4- (2,3-epoxypropylthiomethyl)-3,6-dithiaoctane
D2: bis (2,3-epoxypropyl)disulfide
E1: bis (2,3-epithiopropyl)disulfide
F1: 2,5-bis (isocyanatomethyl)bicyclo-[2,2,1]-heptane Example B26

42.8 weight parts of the compound prepared in Example A1, 26.9 weight parts of the compound prepared in Example A13, 8.3 weight parts of 3-mercaptothietane, 22 weight parts of bis(2,3-epithiopropyl)disulfide and 0.5 weight parts of hindered amine manufactured by ADEKA Corporation (Product name: ADK STAB LA-63P) were heated, mixed and dissolved at 75 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 50 to 130 degrees centigrade and polymerized for 42 hours.

A molding sample piece of the obtained resin was excellent in transparency and had good appearance with no distortion. The evaluation results of physical properties of the resin are shown in Table 2.

Example B27

42.8 weight parts of the compound prepared in Example A1, 26.9 weight parts of the compound prepared in Example A13, 8.3 weight parts of 3-mercaptothietane and 22 weight parts of bis(2,3-epithiopropyl)disulfide were heated, mixed and dissolved at 75 degrees centigrade. Then, the resulting mixture was thoroughly degassed under reduced pressure of not more than 3.9 kPa until no bubble was observed to obtain a polymerizable composition. Subsequently, after a mold composed of a glass mold and a tape was filled with the obtained polymerizable composition, the resultant was put into a heating oven, slowly heated from 50 to 130 degrees centigrade and polymerized for 42 hours.

A molding sample piece of the obtained resin was excellent in transparency and had good appearance with no distortion. The evaluation results of physical properties of the resin are shown in Table 2.

TABLE 2

| | Composition (weight parts in parenthesis) | Optical Properties | | | Heat Resistance Temperature at which thermal deformation begins (° C.) | Resin Hue (Plate of 5 mm in Thickness) ΔYI |
|---|---|---|---|---|---|---|
| | | Refractive Index ne | Abbe's Number ve | Tg (° C.) | | |
| Example B26 | A1 (42.8), A13 (26.9), C1 (8.3), E1 (22), G1 (5000 ppm) | 1.794 | 24.8 | 97.1 | 85.6 | −8.5 |

TABLE 2-continued

| | | Evaluation Items | | | |
| --- | --- | --- | --- | --- | --- |
| | | Optical Properties | | Heat Resistance | Resin Hue (Plate of 5 mm in Thickness) ΔYI |
| | Composition (weight parts in parenthesis) | Refractive Index ne | Abbe's Number ve | Tg (°C.) | Temparature at which thermal deformation begins (°C.) | |
| Example B27 | A1 (42.8), A13 (26.9), C1 (8.3), E1 (22) | 1.794 | 24.8 | 102.3 | 90.4 | — |

A1: tris(3-thietanylthio)antimony
A13: tetrakis(3-thietanylthio)tin
C1: 3-mercaptothietane
E1: bis(2,3-epithiopropyl)disulfide
G1: ADK STAB LA-63P

Example B28

60 weight parts of the compound prepared in Example A13, 28 weight parts of the compound prepared in Example A1 and 12 weight parts of 1,3-bis(3-thietanylthio)-2-propanol (the compound prepared in Reference Preparation Example 4) were heated, mixed and dissolved at 75 degrees centigrade. Then, the resulting mixture was degassed under reduced pressure of not more than 3.9 kPa and then degassed at 75 degrees centigrade under reduced pressure of not more than 3.9 kPa to obtain a polymerizable composition. After a mold composed of a glass mold and a tape was filled with the obtained polymerizable composition, the resultant was put into a heating oven, slowly heated from 70 to 130 degrees centigrade and polymerized for 86 hours.

A molding sample piece of the obtained resin was excellent in transparency and had good appearance with no distortion. The evaluation results of physical properties of the resin are shown in the following.

Refractive Index ne: 1.797
Abbe's Number ve: 24.4
Tg: 149.9 degrees centigrade
Temparature at which thermal deformation begins: 138.7 degrees centigrade
Maximum Point Stress of Flexural Strength: 101.7 N/mm$^2$
Maximum Point Displacement of Flexural Strength: 1.37 mm Furthermore, the YI value of the resin obtained in Example B26 was lower than that of the resin obtained in Example B27 by 8.5 (ΔYI (YI of Example B26 to YI of Example B27)=−8.5).

Example B29

45 weight parts of the compound prepared in Example A13, 40 weight parts of the compound prepared in Example A1 and 15 weight parts of 1,3-bis(3-thietanylthio)-2-propanol were heated, mixed and dissolved at 75 degrees centigrade. Then, the resulting mixture was degassed under reduced pressure of not more than 3.9 kPa and then degassed at 75 degrees centigrade under reduced pressure of not more than 3.9 kPa. After a mold composed of a glass mold and a tape was filled with the obtained polymerizable composition, the resultant was put into a heating oven, slowly heated from 70 to 130 degrees centigrade and polymerized for 86 hours.

A molding sample piece of the obtained resin was excellent in transparency and had good appearance with no distortion. The evaluation results of physical properties of the resin are shown in the following.

Refractive Index ne: 1.798
Abbe's Number ve: 24.2
Tg: 133.9 degrees centigrade
Temparature at which thermal deformation begins: 119.6 degrees centigrade
Maximum Point Stress of Flexural Strength: 122.8 N/mm$^2$
Maximum Point Displacement of Flexural Strength: 1.86 mm

The invention claimed is:

1. A metal thietane compound represented by the following general formula (120),

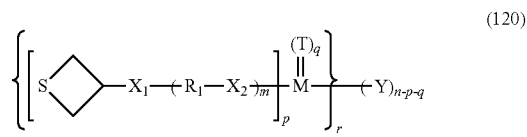

(wherein, in the above general formula (120), M is one metal atom selected from the group consisting of Bi and Sb; $X_1$ and $X_2$ are each independently a sulfur atom or an oxygen atom; $R_1$ is a divalent organic group;

the bond between M and T shown by a dotted line and a solid line represents a single or double bond, provided that when the bond between M and T shown by a dotted line and a solid line is a single bond, T is a monovalent inorganic or organic group, q is an integer of 0 or equal to or more than 1 and equal to or less than n-2 and r is 1 or 2; and when the bond between M and T shown by a dotted line and a solid line is a double bond, T is an oxygen atom or a sulfur atom, q is 1 and r is 1;

m is an integer of 0 or 1 or more;

n is the number of valence of M; and p is an integer of equal to or more than 1 and equal to or less than n, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing M; when r is 2, n-p-q is 1 or 2 and Y is a divalent group; when r is 2 and n-p-q is 2, two Ys may form a ring together with two Ms; and when r is 2 and q is 2, a plurality of Ts contained are each independently selected from inorganic or organic groups).

2. A metal thietane compound represented by the following general formula (110),

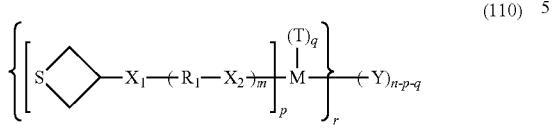

(wherein, in the above general formula (110), M is one metal atom selected from the group consisting of Bi and Sb; $X_1$ and $X_2$ are each independently a sulfur atom or an oxygen atom; $R_1$ is a divalent organic group; m is an integer of 0 or 1 or more; n is the number of valence of M; p is an integer of equal to or more than 1 and equal to or less than n; q is an integer of 0 or equal to or more than 1 and equal to or less than n-2; Y is a monovalent or divalent group; T is an inorganic or organic group; and r is 1 or 2, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing a metal atom M; when r is 2, n-p-q is 1 or 2 and Y is a divalent group; when r is 2 and n-p-q is 2, two Ys may form a ring together with two metal atoms Ms; and when r is 2 and q is 2, a plurality of Ts contained are each independently selected from inorganic or organic groups).

3. A metal thietane compound represented by the following general formula (100),

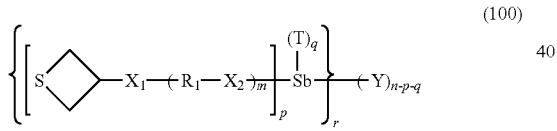

(wherein, in the above general formula (100), $X_1$ and $X_2$ are each independently a sulfur atom or an oxygen atom; $R_1$ is a divalent organic group; m is an integer of 0 or 1 or more; n is 3 or 5, provided that when n is 3, p is an integer of equal to or more than 1 and equal to or less than 3; and when n is 5, p is an integer of equal to or more than 1 and equal to or less than 5; q is an integer of 0 or equal to or more than 1 and equal to or less than n-2; Y is a monovalent or divalent group; T is an inorganic or organic group; and r is 1 or 2, provided that when r is 1, q is 0 and Y is a monovalent inorganic or organic group; when r is 1 and n-p-q is 2 or more, a plurality of Ys contained are each independently selected from monovalent inorganic or organic groups; when r is 1 and n-p-q is 2 or more, a plurality of Ys may be bonded to each other to form a ring containing a Sb atom; when r is 2, n-p-q is 1 or 2 and Y is a divalent group; when r is 2 and n-p-q is 2, two Ys may form a ring together with two Sb atoms; and when r is 2 and q is 2, a plurality of Ts contained are each independently selected from inorganic or organic groups).

4. A metal thietane compound represented by the following general formula (1),

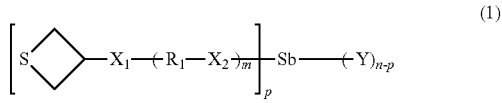

(wherein, in the above general formula (1), $X_1$ and $X_2$ are each independently a sulfur atom or an oxygen atom; $R_1$ is a divalent organic group; m is an integer of 0 or 1 or more; n is 3 or 5, provided that when n is 3, p is an integer of equal to or more than 1 and equal to or less than 3; and when n is 5, p is an integer of equal to or more than 1 and equal to or less than 5; and Y is a monovalent inorganic or organic group, provided that when n-p is 2 or more, a plurality of Ys contained are each independently selected from monovalent inorganic or organic groups; and when n-p is 2 or more, a plurality of Ys may be bonded to each other to form a ring containing a Sb atom).

5. The metal thietane compound as set forth in claim 2, wherein m is 0.

6. The metal thietane compound as set forth in claim 2, wherein $X_1$ is a sulfur atom.

7. The metal thietane compound as set forth in claim 4, represented by the following general formula (3),

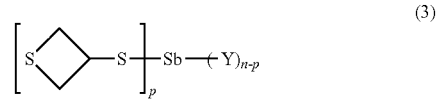

(wherein, in the above general formula (3), Y, n and p are each the same as those in Y, n and p in said general formula (1)).

8. The metal thietane compound as set forth in claim 2, wherein n and p are each 3.

9. The metal thietane compound as set forth in claim 8, represented by the following formula (4)

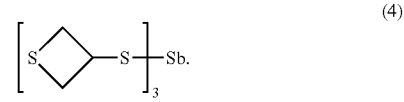

10. The metal thietane compound as set forth in claim 2, wherein n and p are each 5.

11. The metal thietane compound as set forth in claim 10, represented by the following formula (5)

12. A thietane compound represented by the following general formula (201),

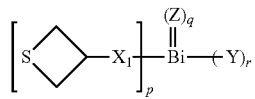 (201)

(wherein, in the above general formula (201), $X_1$ represents a sulfur atom or an oxygen atom; Z represents a sulfur atom or an oxygen atom; p represents an integer of equal to or more than 1 and equal to or less than 5; q is an integer of equal to or more than 0 and equal to or less than 2; r represents an integer of equal to or more than 0 and equal to or less than 4; and p+r+2q is 5 or 3, provided that when r is an integer of 2 or more, a plurality of Ys contained are each independently selected from monovalent inorganic or organic residues, or a plurality of Ys may be bonded to each other to form a ring containing a Bi atom).

13. The thietane compound as set forth in claim 12, wherein, in said general formula (201), q is 0.

14. The thietane compound as set forth in claim 12, wherein, in said general formula (201), p is 3, q is 0 and r is 0.

15. The thietane compound as set forth in claim 12, wherein, in said general formula (201), q is 1.

16. The thietane compound as set forth in claim 12, wherein, in said general formula (201), Z is an oxygen atom.

17. The thietane compound as set forth in claim 12, wherein, in said general formula (201), $X_1$ is a sulfur atom.

* * * * *